United States Patent
Mumick et al.

(10) Patent No.: US 12,167,302 B2
(45) Date of Patent: Dec. 10, 2024

(54) SYSTEM AND METHOD FOR RICH SHORT MESSAGING SERVICE

(71) Applicants: Inderpal Singh Mumick, Berkeley Heights, NJ (US); Surinder Singh Anand, Highland Park, NJ (US)

(72) Inventors: Inderpal Singh Mumick, Berkeley Heights, NJ (US); Surinder Singh Anand, Highland Park, NJ (US)

(73) Assignee: GUPSHUP INC., Fremont, CA (US)

( * ) Notice: Subject to any disclaimer, the term of this patent is extended or adjusted under 35 U.S.C. 154(b) by 336 days.

(21) Appl. No.: 17/855,228

(22) Filed: Jun. 30, 2022

(65) Prior Publication Data

US 2023/0007449 A1 Jan. 5, 2023

Related U.S. Application Data

(60) Provisional application No. 63/216,921, filed on Jun. 30, 2021.

(51) Int. Cl.
*H04W 4/14* (2009.01)
(52) U.S. Cl.
CPC ..................... *H04W 4/14* (2013.01)
(58) Field of Classification Search
CPC ....................................................... H04W 4/14
See application file for complete search history.

(56) References Cited

U.S. PATENT DOCUMENTS

| 8,195,509 | B1 | 6/2012 | Mhatre et al. | |
|---|---|---|---|---|
| 8,238,891 | B1* | 8/2012 | Tam | H04M 3/4878 455/418 |
| 2008/0188251 | A1* | 8/2008 | Weinrib | H04W 4/14 455/466 |
| 2009/0234935 | A1* | 9/2009 | Watson | H04L 12/1831 709/219 |
| 2013/0303210 | A1* | 11/2013 | Weinrib | H04W 4/14 455/466 |
| 2015/0081813 | A1 | 3/2015 | Berry et al. | |
| 2015/0134448 | A1 | 5/2015 | Tung et al. | |
| 2021/0359991 | A1* | 11/2021 | Mumick | H04W 12/06 |

FOREIGN PATENT DOCUMENTS

WO WO-2011070584 A1 * 6/2011 ............... G09B 5/00

* cited by examiner

*Primary Examiner* — Kevin Kim
(74) *Attorney, Agent, or Firm* — Ashok Tankha

(57) ABSTRACT

A method and system employing a rich short message service application (RSAPP) for creating and transmitting a rich message are provided. The rich message includes a message and a brand identity. The RSAPP receives a request to send a short message service (SMS) message to a mobile number of a user (MNU). The RSAPP processes the request to send the SMS message and determines whether the MNU is enabled on one or more rich messaging channels (RMCs). Upon determining that the MNU is enabled on the RMCs, the RSAPP creates and transmits the rich message to the MNU on the enabled RMCs. Upon determining that the MNU is not enabled on the RMCs, the RSAPP confirms whether a setting specifies transmission of the received SMS message to the MNU as a SMS message if the MNU is not enabled on the RMCs. and the RSAPP transmits the received SMS message as a SMS message to the MNU.

24 Claims, 31 Drawing Sheets

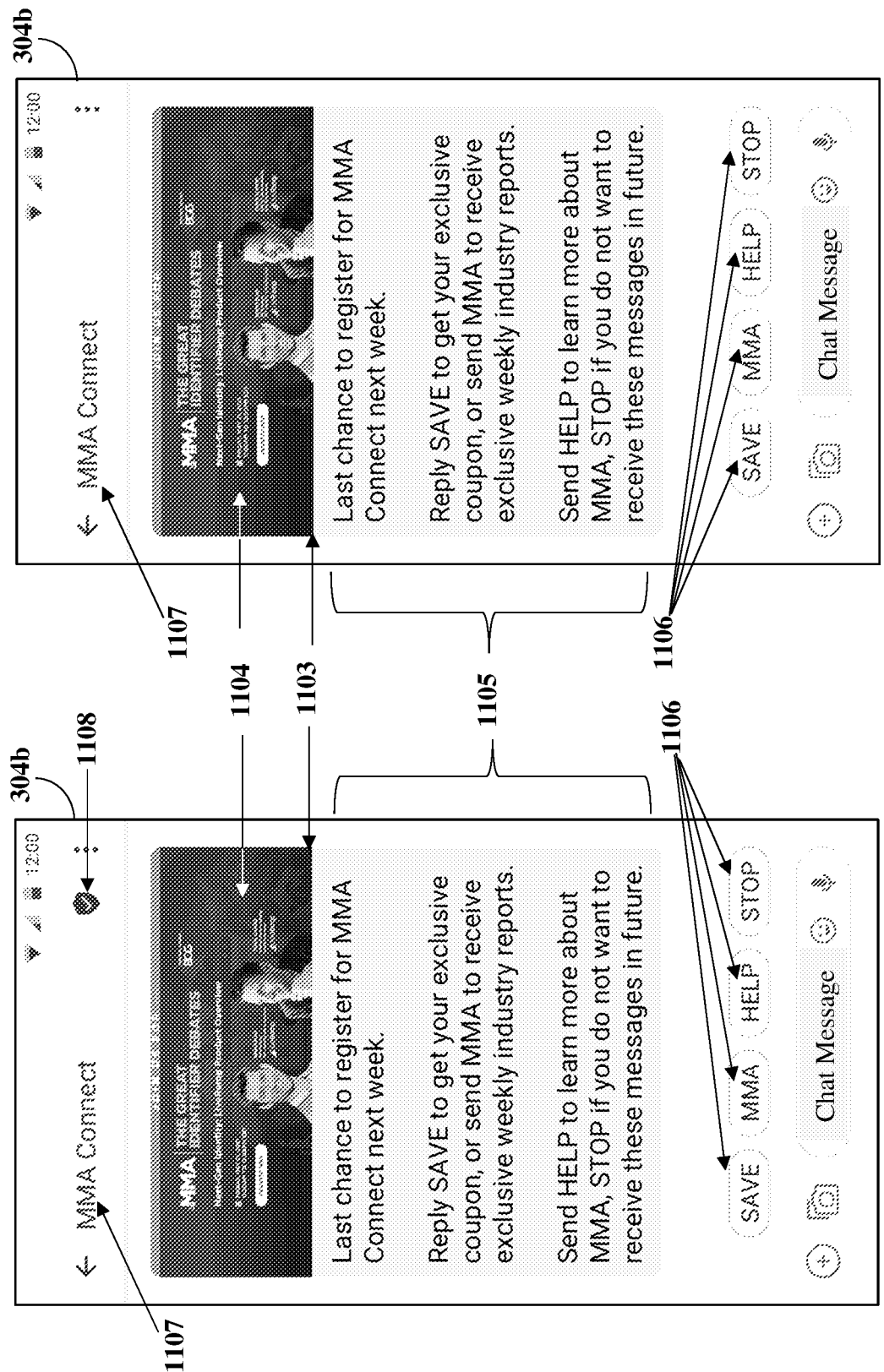

FIG. 14A

Rich SMS Template

| | |
|---|---|
| Brand Name | ALDI |
| Brand Logo | https://www.aldi.us/images/aldi-logo.jpg |

SMS Senders

| Sender Id Type | Sender Id |
|---|---|
| Short Code | 32043 |
| Sender Mask | DL-ALD-01 |

Rich Messaging Senders

| Rich Messaging Channel | Sender Id |
|---|---|
| RCS | ALDI <aldi_us@maap.dotgo.com> |
| WhatsApp | ALDI <+1-912-321-6239> |

Fallback Routing

| | |
|---|---|
| Send as SMS if user is not enabled on any Rich Messaging Channel? | <True/False> |

Additional Enhancements

Images for Rich Card

| Criteria | Rich Card File |
|---|---|
| Round robin, 60% | https://www.aldi.us/images/weekly-ad.jpg |
| Round robin, 40% | https://www.aldi.us/images/low-prices.jpg |
| Keyword: Delivery | https://www.aldi.us/images/delivery.jpg |

Suggested Actions

| Name | Action Type | Value |
|---|---|---|
| Weekly Ad | OpenURL | https://www.aldi.us/weekly-ad.html |
| Download App | OpenURL | https://tinyurl.com/223nkrss |
| Call Store | DialNumber | +1-844-460-7063 |

| Account Configuration | |
|---|---|
| Account Id | Messaging Partner ABC |
| Fallback Routing | |
| Send as SMS if Sender ID is not configured in Rich SMS Template? | <True/False> |

SYSTEM AND METHOD FOR RICH SHORT MESSAGING SERVICE

CROSS-REFERENCE TO RELATED APPLICATIONS

This application claims priority to and the benefit of the provisional patent application titled "Rich Short Messaging Service", application No. 63/216,921, filed in the United States Patent and Trademark Office on Jun. 30, 2021. The specification of the above referenced patent application is incorporated herein by reference in its entirety.

BACKGROUND

A brand, that is, an enterprise or an organization, typically sends one or more of notifications, promotional messages, transactional messages, etc., to a mobile number of a user by a short message service (SMS) message to inform the user about transactions, coupons, promotions, news, updates, emergencies, etc. Typically, the notifications or the promotional messages sent via an SMS contain a text description regarding the transactions, coupons, promotions, news, updates, emergencies, etc. Moreover, SMS notifications or SMS promotions may comprise a uniform resource locator (URL) link that directs the user to a specific web page corresponding to the transactions, coupons, promotions, news, updates, emergencies, etc. Conventional SMS notifications or SMS promotions do not contain rich elements, for example, rich cards, carousels, quick response (QR) codes, rich media, graphics interchange formats (GIFs), suggested replies, and suggested actions shown as interactive buttons, etc., for the user to interact with or take necessary action.

Typically, the user receives one or more of the SMS notifications, the SMS promotions, SMS transactions, etc., on a user device from a short number, a long number, or from an alphanumeric sender mask. Often the user does not recognize the short number, the long number, or the sender mask as belonging to a brand. Conventional SMS notifications or SMS promotional messages can, therefore, sometimes be confusing to the user, and may also not be trustworthy. Furthermore, if a user does not recognize the sender, there is no easy way for the user to verify the authenticity of the SMS notifications or the SMS promotions. Therefore, there is a long-felt need for increasing trustworthiness of the SMS notifications or the SMS promotional messages by adding a brand identity, for example, a brand name, a brand icon, and/or a brand logo of the sender, optionally along with a verification mark, for example, a checkmark or a trust mark, to indicate that the brand identity has been verified and can be trusted by the recipient.

In general, messages comprising rich elements such as image content, audio content, video content, contacts, other rich media content, etc., and verified sender identities are referred to as rich messages. These rich messages are sent to a user device directly using one or more of application programming interfaces (APIs), protocols, and other tools, for example, a campaign manager, designed specific to different rich messaging channels, for example, Rich Communication Services (RCS), WhatsApp® of WhatsApp LLC, iMessage® of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, etc. However, these APIs are not designed for processing a typical short message service (SMS) to create a rich message. Furthermore, existing methods of sending rich messages require special techniques, APIs, and protocols. These existing methods can be expensive for conventional applications and current users of the SMS. For example, sending rich messages may require making extensive changes to the existing SMS applications that send messages to users using SMS APIs, protocols, or tools. As used herein, "SMS applications" refer to messaging applications that allow users to send SMS messages from various platforms.

Hence, there is a long-felt need for a method and a system for creating and transmitting a rich short message service (SMS) message comprising rich elements. Furthermore, there is a long-felt need for a method and a system for creating a rich message with a brand identity of a sender, and optionally with a verification mark. Furthermore, there is a long-felt need for a method and a system for processing messages sent as SMS messages to create rich messages and automatically sending the created rich messages over a rich messaging channel, if a user is available on the rich messaging channel. Furthermore, there is a long-felt need for a solution that allows existing SMS applications to benefit from rich messaging.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above-recited need for creating and transmitting a rich short message service (SMS) message comprising rich elements, for example, a verified sender identifier (ID), image content, audio content, video content, contacts, rich cards, carousels, interactive buttons, and other rich media content. The rich SMS messages are hereinafter referred to as rich messages. Furthermore, the method and the system disclosed herein address the need for creating a rich message with a brand identity, for example, a brand name, a brand icon, and/or a brand logo, of a sender, and optionally with a verification mark, for example, a checkmark, a trust mark, etc., for increasing trustworthiness of the rich message and indicating that the brand identity has been verified and can be trusted by the recipient. Furthermore, the method and the system disclosed herein address the above-recited need for processing messages sent as SMS messages to create rich messages and automatically sending the created rich messages over a rich messaging channel, if a user is available on the rich messaging channel. Furthermore, the method and the system disclosed herein address the above-recited need for a solution that allows existing SMS applications to benefit from rich messaging.

The method disclosed herein comprises sending rich messages on one or more data messaging channels or rich messaging channels, for example, Rich Communication Services (RCS), WhatsApp® of WhatsApp LLC, iMessage® of Apple, Inc., Business Chat of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, or any other messaging channels that use data to communicate a message or that support rich messaging features and rich elements comprising, for example, images, videos, rich cards, carousels, interactive buttons, etc. The interactive buttons, for example, buttons for suggested replies, suggested actions, etc., are buttons that a user can select or tap to send a response message or to take an action on a user device. A suggested reply allows the user to select or tap on the interactive button displayed on the user device to communicate a response to the brand. A suggested action allows the user to select or tap on the interactive button to take an action on the user device, for example, make a phone call, open a website, share a location, etc. On RCS, the suggested replies and the suggested actions are sent as part of a suggested chiplist, or along with a standalone rich card, or with a rich card as part of a carousel. Other messaging channels also support sending of the interactive buttons in the form of suggested replies and suggested actions, though these rich interactive elements may be referred to by a different term. For example, on the WhatsApp® instant messaging application, a suggested reply is called a quick reply and a suggested action is called a call-to-action, and on the Facebook® Messenger, a suggested reply is called a quick reply and a suggested action is called a button.

The data messaging channels or the rich messaging channels disclosed above are supported by a data messaging application on the user device, and a data messaging platform, for example, RCS, WhatsApp®, iMessage®, Viber®, etc. Most of these data messaging platforms support business messaging that enables a brand, or a developer on behalf of a brand, or an application on behalf of a brand, to send and receive messages over a data network to and from users of the data messaging applications. Some data messaging platforms such as Signal® do not currently support business messaging but may do so in the future. Some of the rich messaging platforms, for example, RCS, WhatsApp®, iMessage®, Viber®, etc., identify the user by their mobile number. Other rich messaging platforms, for example, Facebook® Messenger, not only allow users to use an identifier other than a mobile number, but also permit users to link a mobile number with their account. Some other rich messaging platforms, for example, Google Business Messages, use an identifier other than mobile number and do not currently support a mechanism to link their channel identifier with a mobile number at the platform level, but enable users that interact with a brand to provide and validate a mobile number to a chatbot, thereby establishing a mapping between an identifier used by the rich messaging platform and the mobile number of the user. As used herein, "channel" exemplarily refers to SMS, RCS, WhatsApp®, iMessage®, Viber®, etc. Also, as used herein, "rich messaging channel", "data messaging channel", "data messaging application", "data messaging platform", and "rich messaging platform", exemplarily refer to RCS, WhatsApp®, iMessage®, Viber®, etc.

The method and the system disclosed herein employ a rich short message service (SMS) application (RSAPP) configured to define computer program instructions executable by at least one processor for creating and transmitting a rich message. The rich message comprises a message and a brand identity. In an embodiment, the rich message further comprises a verification mark. The brand identity comprises, for example, one or more of a brand name, a brand icon, and a brand logo of a brand requesting to transmit the rich message to a mobile number of a user. In the method and the system disclosed herein, the RSAPP receives a request to send an SMS message from a brand, that is, a sender, to a mobile number of a user. The RSAPP checks whether the sender of the SMS message has signed up for a rich messaging service provided by the method and the system disclosed herein. If the sender has signed up for the rich messaging service, the RSAPP processes the request to send the SMS message, and determines whether the mobile number of the user, that is, a recipient, is enabled on one or more of multiple rich messaging channels by executing a channel specific command on each of the rich messaging channels. For example, the RSAPP executes the rich communication services contacts capability check command for the mobile number of the user to determine if the mobile number of the user is enabled for rich communication services (RCS). In an embodiment, the RSAPP determines whether the mobile number of the user is enabled on one or more other rich messaging channels by executing an equivalent command specific to the other rich messaging channel(s). For example, the RSAPP executes a contacts method of the WhatsApp Business application programing interface (API) for determining whether the mobile number of the user is enabled on the WhatsApp rich messaging channel.

In an embodiment, the rich short message service (SMS) application (RSAPP) creates and transmits the rich message to the mobile number of the user, that is, the recipient, without explicitly checking whether the mobile number of the user is enabled on one or more of the rich messaging channels. The RSAPP executes a command to transmit the rich message to the mobile number of the user. If the mobile number of the user is enabled on the rich messaging channel(s), the command to transmit the rich message receives a status response indicating status of transmission as successfully sent. If the mobile number of the user is not enabled on one or more of the rich messaging channels, the status response to the command to transmit the rich message indicates that the mobile number of the user is not enabled on the rich messaging channel(s).

In another embodiment, the rich short message service (SMS) application (RSAPP) determines whether the mobile number of the user is enabled on one or more of the rich messaging channels, by searching for the mobile number of the user in a local cache created by the RSAPP. The RSAPP creates the local cache by saving the enabled status for each mobile number based on the status response to the explicit or implicit capability check command for RCS or to an equivalent command on other rich messaging channels.

Upon determining that the mobile number of the user is enabled on one or more of the rich messaging channels, the rich short message service (SMS) application (RSAPP) creates a rich message comprising a message and a brand identity, and transmits the created rich message to the mobile number of the user on the enabled rich messaging channel(s). In an embodiment, a service provider verifies the brand identity. In an embodiment, the rich message further comprises one or more of multiple interactive buttons. The interactive buttons comprise, for example, a suggested reply button, a suggested action button, and a brand-specific action button. The selection of the suggested reply button using a user device of the user allows the user to respond to the brand or send a user response to the brand. The selection of the suggested action button or the brand-specific action button allows the user to execute an action on the user device. In an embodiment, the RSAPP delivers the created rich message from a trusted sender identifier (ID). In another embodiment, the RSAPP delivers the created rich message from a sender-id of the brand. Upon determining that the mobile number of the user is not enabled on one or more of the rich messaging channels, the RSAPP confirms whether a setting specifies transmission of the received SMS message to the mobile number of the user as a SMS message if the mobile number of the user is not enabled on one or more of the rich messaging channels. The RSAPP transmits the received SMS message as a SMS message to the mobile number of the user. In an embodiment, the RSAPP sends a status message comprising one or more of a delivery receipt and a read receipt to the brand.

In an embodiment, the rich short message service (SMS) application (RSAPP) monitors delivery of the created rich message to the mobile number of the user. As part of monitoring the delivery, the RSAPP delivers the created rich message to the mobile number of the user via one or more additional messaging platforms in case of a failure of the delivery or a delay in the delivery of the created rich message to the mobile number of the user via a first messaging platform. The additional messaging platforms comprise, for example, alternative data messaging platforms and short message service platforms. In another embodiment, the RSAPP concurrently sends the created rich message over the rich messaging channels that are enabled to increase chances of delivery of the created rich message. In this embodiment, the RSAPP revokes the created rich message from the other rich messaging channels that are enabled as soon as the created rich message is delivered via one of the rich messaging channels.

In an embodiment, a brand enterprise or a developer registers for the rich SMS with a service provider. In executing the registration, the service provider receives information about the brand identity from the brand enterprise, and verifies the brand identity. In an embodiment, the brand enterprise or the developer specifies to the service provider one of multiple rich message templates to be used for sending rich messages. The service provider sends the rich messages to a user device of a user using the specified rich message template.

In an embodiment, the rich short message service (SMS) application (RSAPP) determines whether the mobile number of the user is enabled for rich communication services. Furthermore, the RSAPP determines whether the mobile number of the user is enabled for one or more of multiple messaging applications, for example, WhatsApp® or other instant messaging applications. In an embodiment, the RSAPP determines whether the mobile number of the user is linked to a user profile. In another embodiment, the RSAPP determines whether the mobile number of the user is linked to a chatbot created by the brand or a messaging platform. The RSAPP transmits the created rich message to the user profile or the chatbot of the brand on one or more of multiple messaging platforms comprising, for example, Facebook® Messenger, Google Business Messages, and Apple Business Chat. In an embodiment, the user profile is a part of a profile stored by one or more entities comprising, for example, Facebook, Google, and Apple.

In an embodiment, the rich short message service (SMS) application (RSAPP) selects one or more of the rich messaging channels based on one or more of multiple parameters. The parameters comprise, for example, size of the SMS message; capabilities of multiple messaging platforms; cost of sending the SMS message via one or more of the rich messaging channels in terms of standard pricing and dynamic pricing based on traffic patterns; history of a recipient of the SMS message in terms of message delivery status and time, message read status and time, and user response; and maintenance of consistency by sending the SMS message on a single rich messaging channel instead of switching between multiple rich messaging channels.

In an embodiment, the rich short message service (SMS) application (RSAPP) enhances the rich message through one or more of multiple automatic enhancements comprising, for example, replacing uniform resource locator (URL) links within the SMS message with one or more of an image, a video, and other rich media; and automatically adding suggested replies or suggested actions to the SMS message based on content of the SMS message.

In an embodiment of the method disclosed herein, the rich short message service (SMS) application (RSAPP) receives an SMS message from a brand, that is, a sender, to a mobile number of a user. The RSAPP checks whether the sender of the SMS has signed up for the rich SMS provided by the RSAPP. If the sender has signed up for the rich SMS, the RSAPP processes the received SMS message and creates a rich message comprising a message and a brand identity. In an embodiment, the rich message further comprises a verification mark, thereby rendering a verified brand identity. In an embodiment, the sender identifier (ID) of the SMS message is configured for the RSAPP by a messaging partner, an aggregator, or an RSAPP provider, without an explicit registration or sign up by the brand owning the sender ID. The RSAPP transmits the created rich message to the mobile number of the user over a network. In an embodiment, the RSAPP transmits the rich message over a data link, for example, a mobile data link or a Wi-Fi® data link of Wi-Fi Alliance Corporation. The RSAPP determines whether the mobile number is enabled for data messaging through a data messaging application, for example, Rich Communication Services (RCS), WhatsApp®, iMessage®, Viber®, or any other data messaging application that can support rich messages to be transmitted to the mobile number of the user via RCS, WhatsApp®, iMessage®, Viber®, or any other data messaging application. For some data messaging applications, for example, Facebook® Messenger, that allow an identifier other than a mobile number for identification of the user, the RSAPP determines whether the mobile number of the user is linked to the data messaging application. The mobile number of the user receives the rich message transmitted by the RSAPP. The RSAPP delivers the rich message into a data messaging application, for example, Android® Messages of Google LLC, Samsung® Messages of Samsung Electronics Co. Ltd., etc., on a user device with a subscriber identity module (SIM) that represents the mobile number of the user, or on another data messaging application such as iMessage®, WhatsApp®, Viber®, etc., on the user device where the data messaging application is registered with the mobile number of the user.

The above-disclosed embodiments of the method disclosed herein are executed using one or more of an application programming interface (API) configured for sending a short message service (SMS) message; a protocol configured for sending the SMS message, for example, a Short Message Peer-to-Peer (SMPP) protocol; an application configured for sending the SMS message; an API configured for sending the rich message; a protocol configured for sending the rich message, and an application configured for sending the rich message. In an embodiment, the API for sending SMS messages is a pre-existing API for SMS messaging that is already in use. In another embodiment, the API is a new API configured for sending SMS messages comprising features that make it easier or efficient to send rich messages. For example, a new API for sending SMS messages comprises an attribute to select a specific template to use for creating a rich message from an SMS message. Another example of a new SMS API supports a callback method that allows the sender to get notified when a user clicks on a suggested action button. Similarly, in an embodiment, the protocol for sending SMS messages is a pre-existing protocol, for example, a Short Message Peer-to-Peer (SMPP) protocol, that is already in use for SMS messaging. In another embodiment, the protocol for sending SMS messages is a new protocol, for example, a variant of the SMPP protocol with extensions that allow the brand, that is, the sender, to be notified when a user clicks on a suggested action button. In an embodiment, the RSAPP provides the rich message to the brand at the same cost or a lower cost as a conventional SMS message.

In an embodiment, the rich message further comprises one or more of suggested replies and suggested actions displayed as interactive buttons on the user device. These interactive buttons enable the user to convey a response to the brand when the user selects, taps, or clicks on the suggested reply button, or enable the user to take certain actions, for example, calling a number, opening a website, or sharing a location, on the user device when the user clicks on the suggested action button. The RSAPP receives a selection of one of the suggested replies from the user device, or an indication of the user taking an action by clicking on the suggested action button on the user device and informs the brand and/or the developer.

In one or more embodiments, related systems comprise circuitry and/or programming for executing the methods disclosed herein. The circuitry and/or programming comprise one or any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

FIG. 11B exemplarily illustrates a screenshot of the graphical user interface rendered by the messaging client on the user device, displaying another embodiment of a rich message received by the user from a verified sender ID of a brand.

FIG. 11C exemplarily illustrates a screenshot of the graphical user interface rendered by the messaging client on the user device, displaying another embodiment of the rich message received by the user via a rich messaging channel from a sender ID of the brand.

FIGS. 14A-14C exemplarily illustrate screenshots of user interfaces provided by a rich short message service (SMS) application provider for rich SMS registration.

DETAILED DESCRIPTION OF THE INVENTION

Various aspects of the disclosure herein are embodied as a system, a method, or a non-transitory, computer-readable storage medium having one or more computer-readable program codes stored thereon. Accordingly, various embodiments of the disclosure herein take the form of an entirely hardware embodiment, an entirely software embodiment comprising, for example, microcode, firmware, software, etc., or an embodiment combining software and hardware aspects that are referred to herein as a "system", a "module", an "engine", a "circuit", or a "unit".

Figure 1A:
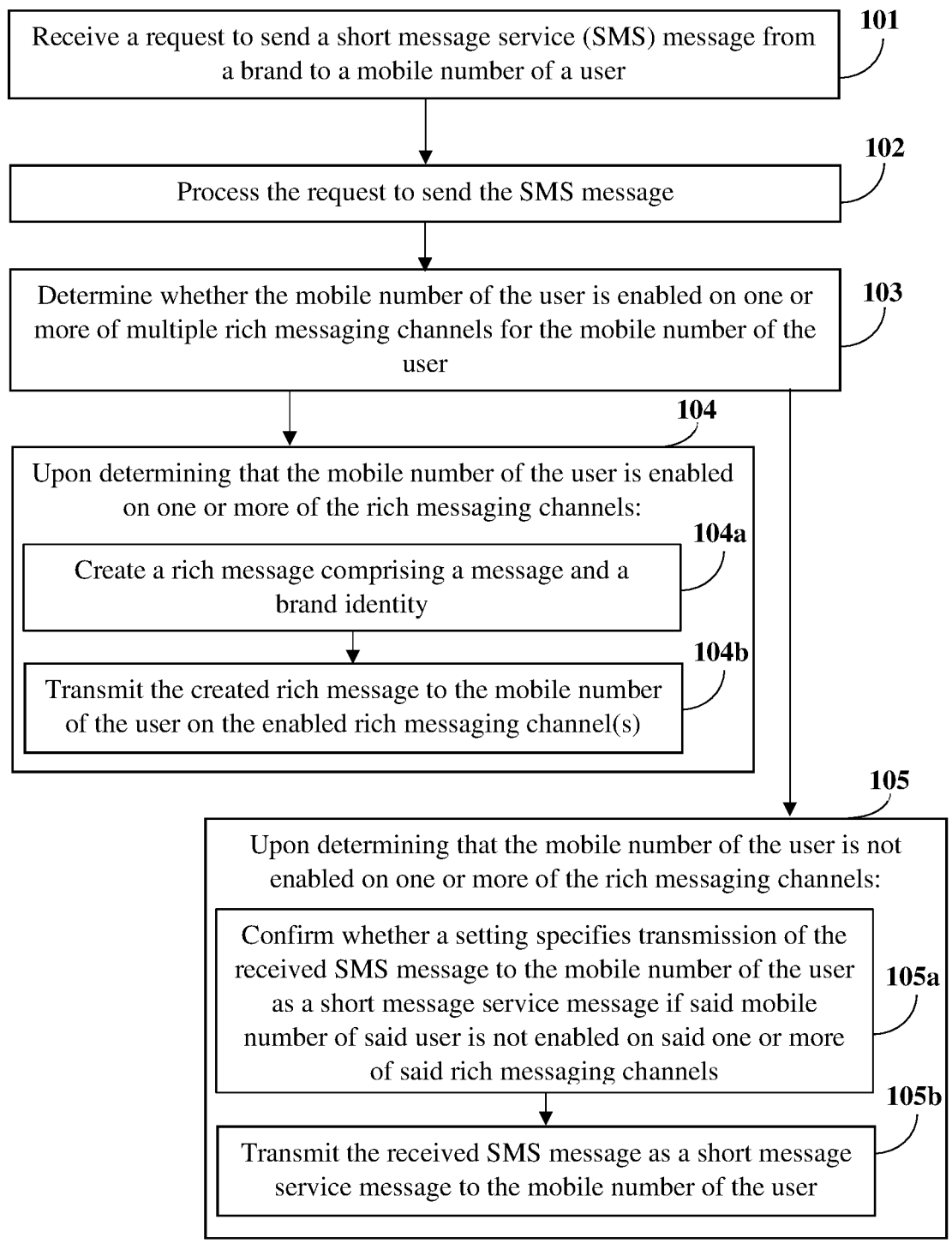
FIG. 1A illustrates a flowchart of an embodiment of a method for creating and transmitting a rich message.
Figure 1B:
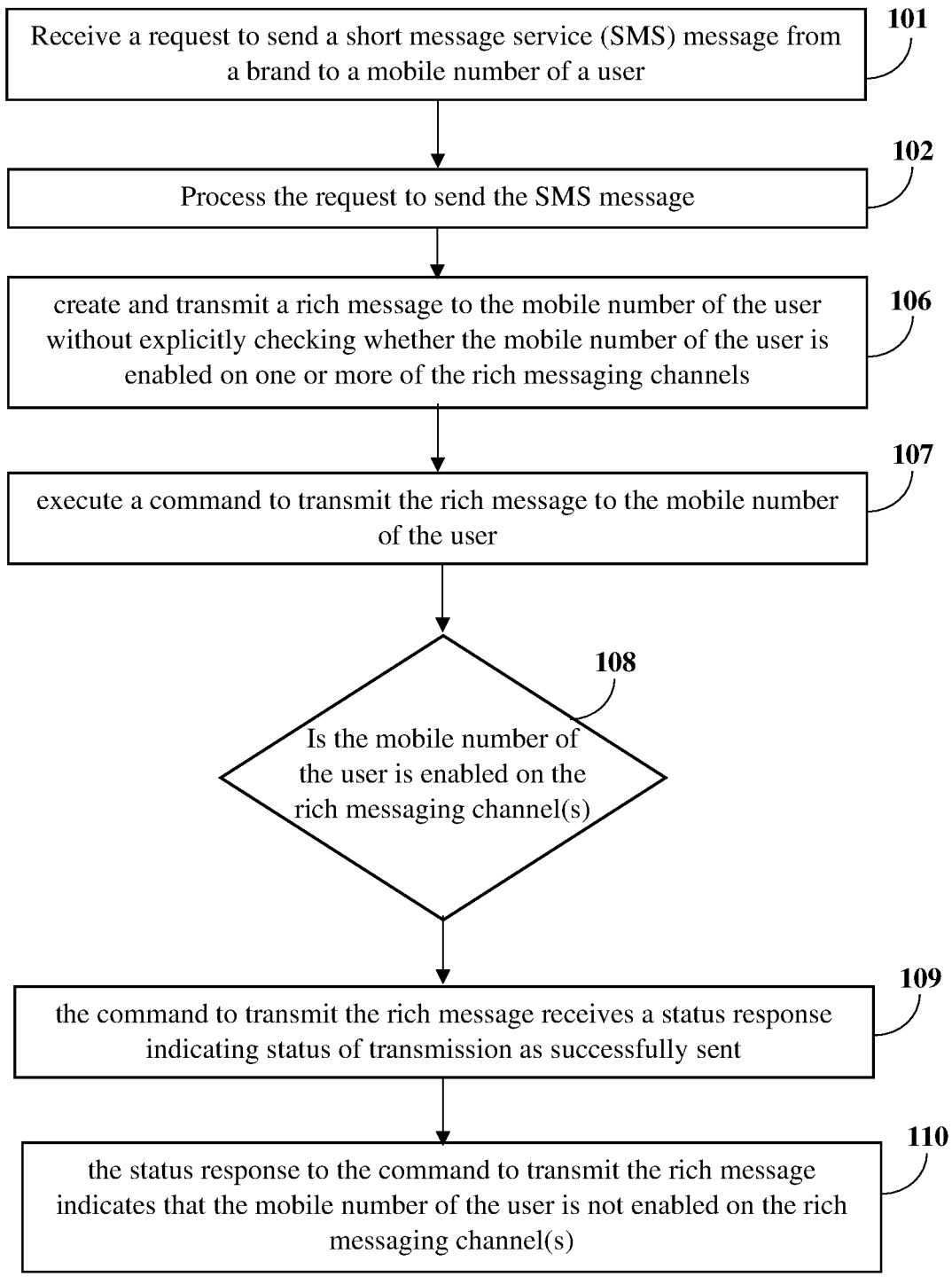
FIG. 1B illustrates a flowchart of another embodiment of a method for creating and transmitting a rich message.
Figure 1C:
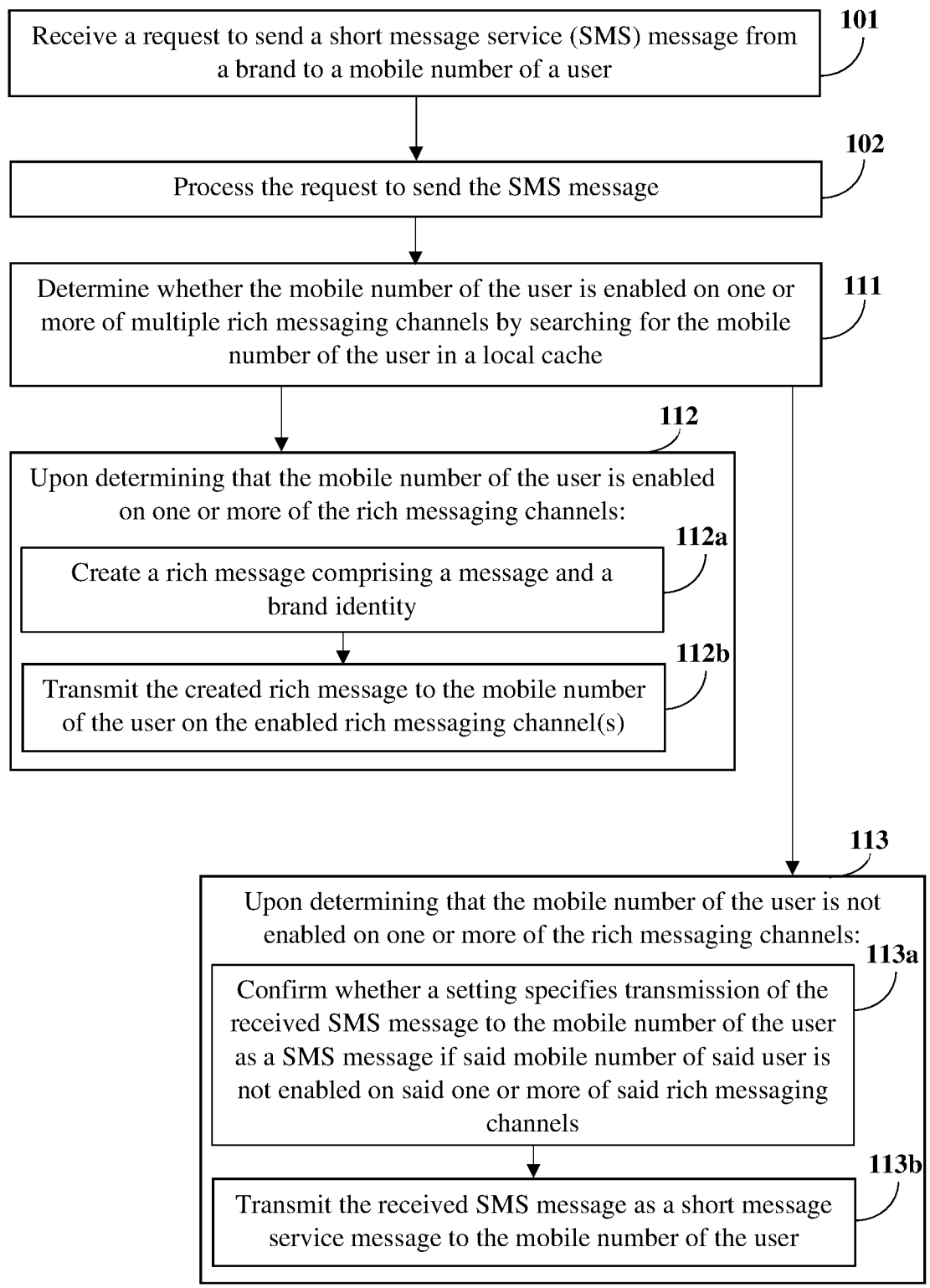
FIG. 1C illustrates a flowchart of another embodiment of a method for creating and transmitting a rich message.

FIG. 1 illustrates a flowchart of an embodiment of a method for creating and transmitting a rich message. As used herein, "rich message" refers to a message that comprises a text message, a brand identity, an optional verification mark, an optional rich card, and optional interactive buttons. The method disclosed herein employs a rich short message service (SMS) application (RSAPP) configured to define computer program instructions executable by at least one processor for creating and transmitting a rich message. In an embodiment, the RSAPP is implemented as a web-based platform hosted on a server or a network of servers accessible via a network. In another embodiment, the RSAPP is implemented in a cloud computing environment. As used herein, "cloud computing environment" refers to a processing environment comprising configurable, computing, physical, and logical resources, for example, networks, servers, storage media, virtual machines, applications, services, etc., and data distributed over a network, for example, the internet. The cloud computing environment provides an on-demand network access to a shared pool of the configurable computing physical and logical resources. In an embodiment, the RSAPP is a cloud computing-based platform implemented as a service for creating and transmitting a rich message. For example, the RSAPP is configured as a software as a service (SaaS) platform or a cloud-based software as a service (CSaaS) platform that creates and transmits a rich message. In another embodiment, the RSAPP is implemented as a cloud platform service also known as Platform as a Service (PaaS). In another embodiment, the RSAPP is implemented as an on-premise software installed and run on computers on the premises of an organization. The RSAPP receives 101 a request to send a short message service (SMS) message from a brand, that is, a sender, to a mobile number of a user. As used herein, the term "brand" refers to an enterprise or a division of an enterprise, or a brand used by the enterprise or an organization, that intends to send an SMS message to a user. Wherever reference is made to a brand taking or receiving an action, the reference refers to a developer or another person who takes or receives the action on behalf of the brand, or an application that takes or receives the action on behalf of the brand.

In an embodiment, the rich message comprises a text and a brand identity. The brand identity comprises, for example, one or more of a brand name, a brand icon, and a brand logo of the brand requesting to transmit the rich message to the mobile number of the user, as exemplarily illustrated in FIGS. 8A-13. In an embodiment, a service provider verifies the brand identity as disclosed in the description of FIG. 7. On successful verification of the brand identity, a verification mark, for example, a checkmark, is disposed next to one or more of the brand name, the brand icon, and the brand logo, for indicating that the brand is verified and can be trusted by a recipient of the rich message. In another embodiment, the rich message comprises images, for example, where a uniform resource locator (URL) link to a webpage is enhanced with an image of the webpage. In another embodiment, the rich message further comprises one or more interactive buttons as exemplarily illustrated in FIG. 8C, FIG. 9C, FIGS. 11B-11C, FIG. 12B, and FIG. 13. The interactive buttons comprise, for example, suggested replies and/or suggested action buttons that a user can select, click, or tap to send a response message and/or take an action on a user device of the user, respectively. The interactive buttons allow the user to convey suggested replies to the brand or to take one or more suggested actions. The user can respond to the brand by selecting one of the suggested replies, or can take an action on the user device by selecting one of the suggested actions. A suggested reply allows the user to select, click, or tap on the interactive button displayed on a graphical user interface (GUI) of a messaging client to communicate a response to the brand as exemplarily illustrated in FIGS. 11B-11C, and FIG. 12B. A suggested action allows the user to select, click, or tap on the interactive button to take an action on the user device, for example, make a phone call, open a website, share a location, etc., as exemplarily illustrated in FIG. 8C, FIG. 9C, and FIG. 13. The rich short message service (SMS) application (RSAPP) receives a selection of one of the suggested replies or an indication of the user selecting a suggested action from the user device, and informs the brand and/or the developer.

The rich short message service application (RSAPP) processes 102 the request to send the short message service (SMS) message, and determines 103 whether the mobile number of the user, that is, the recipient, is enabled on one or more of multiple rich messaging channels by executing a channel specific command for each of the rich messaging channels. For example, a rich communication services contacts capability check command, a WhatsApp Business API Contacts command, and an equivalent command for other channels for the mobile number of the user. The RSAPP 102 determines whether the mobile number of the user is enabled on one or more of multiple rich messaging channels by one of executing a command, calling an application programming interface (API) method, and searching from a database. The method for determining if the mobile number of the user is enabled on a particular rich messaging channel may vary depending on the rich messaging channel. In an embodiment the RSAPP executes a rich communication services contacts capability check command for the mobile number of the user to determine if the mobile number of the user is enabled for rich communication services (RCS). In another embodiment, the RSAPP executes a WhatsApp Business API contacts command of the WhatsApp Business On-Premise API to verify if the mobile number of the user belongs to a valid WhatsApp account and to get the WhatsApp identifier (ID) for the mobile number in order to send a message. The rich messaging channels comprise, for example, Rich Communication Services (RCS), WhatsApp® of WhatsApp LLC, iMessage® of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, or any other messaging channels that use data to communicate a message or that support rich messaging features and rich elements comprising, for example, one or more of images, videos, rich cards, carousels, and interactive buttons. In an embodiment, the RSAPP checks whether the sender, that is, the brand, of the SMS message has registered or signed up for a rich messaging service, and if so, processes 102 the request to send the SMS message, and determines 103 whether the mobile number of the user is enabled on one or more of the rich messaging channels. Upon determining 104 that the mobile number of the user is enabled on one or more of the rich messaging channels, the RSAPP creates 104*a* a rich message comprising a message and a brand entity with an optional verification mark, and transmits 104*b* the created rich message to the mobile number of the user on the enabled rich messaging channel(s). In an embodiment, the RSAPP delivers the rich message from a trusted sender identifier (ID). In another embodiment, the RSAPP delivers the rich message from a sender identifier of the brand. Upon determining 105 that the mobile number of the user is not enabled on one or more of the rich messaging channels, the RSAPP confirms 105*a* whether a setting specifies transmission of the received SMS message to the mobile number of the user as a SMS message if the mobile number of the user is not enabled on one or more of the rich messaging channels, as exemplarily illustrated as "Fallback Routing" in FIG. 14B. The "Fallback Routing" section of the rich message template 1402 enables the brand to one of send or don't send the received SMS message to the mobile number of the user if the mobile number is not enabled on one or more of the rich messaging channels. The RSAPP transmits 105*b* the received SMS message as a SMS message to the mobile number of the user. In an embodiment, the RSAPP sends a status message comprising one or more of a delivery receipt and a read receipt to the brand.

In an embodiment, the rich short message service (SMS) application (RSAPP) creates and transmits 106 the rich message to the mobile number of the user, that is, the recipient, without explicitly checking whether the mobile number of the user is enabled on one or more of the rich messaging channels, as exemplarily illustrated in FIG. 1B. The RSAPP executes 107 a command to transmit the rich message to the mobile number of the user. Determine 108 if the mobile number of the user is enabled on the rich messaging channel(s). If the mobile number of the user is enabled on the rich messaging channel(s), the command to transmit the rich message receives 109 a status response indicating status of transmission as successfully sent. If the mobile number of the user is not enabled on one or more of the rich messaging channels, the status response 110 to the command to transmit the rich message indicates that the mobile number of the user is not enabled on the rich messaging channel(s).

In another embodiment, the rich short message service application (RSAPP) receives 101 a request to send a short message service (SMS) message from a brand to a mobile number of a user. The RSAPP processes 102 the request to send the short message service (SMS) message, and determines 111 whether the mobile number of the user is enabled on one or more of the rich messaging channels, by searching for the mobile number of the user in a local cache created by the RSAPP. The RSAPP creates the local cache by saving the enabled status for each mobile number based on the status response to the explicit or implicit capability check command for RCS or to an equivalent command on other rich messaging channels. Upon determining 112 that the mobile number of the user is enabled on one or more of the rich messaging channels, the RSAPP creates 112*a* a rich message comprising a message and a brand entity with an optional verification mark, and transmits 112*b* the created rich message to the mobile number of the user on the enabled rich messaging channel(s). Upon determining 1113 that the mobile number of the user is not enabled on one or more of the rich messaging channels, the RSAPP confirms 113*a* whether a setting specifies transmission of the received SMS message to the mobile number of the user as a SMS message if the mobile number of the user is not enabled on one or more of the rich messaging channels, as exemplarily illustrated as "Fallback Routing" in FIG. 14B. The "Fallback Routing" section of the rich message template 1402 enables the brand to one of send or don't send the received SMS message to the mobile number of the user if the mobile number is not enabled on one or more of the rich messaging channels. If the setting is enabled, the RSAPP transmits 113*b* the received SMS message as a SMS message to the mobile number of the user. If the setting is not enabled, that is, don't send the SMS, the RSAPP sends a responds backs to the brand indicating that the message cannot be sent.

Figure 2A:
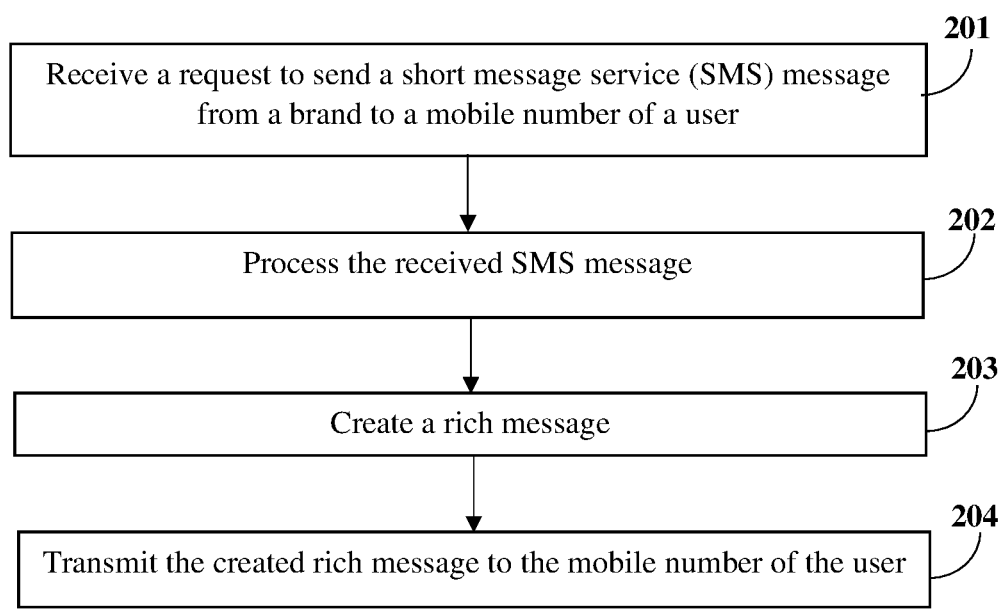
FIG. 2A exemplarily illustrates another embodiment of the method for creating and transmitting a rich message.

FIG. 2A exemplarily illustrates another embodiment of the method for creating and transmitting a rich short message service (SMS) message, hereinafter referred to as a "rich message". The method employs the rich SMS application (RSAPP) defining computer program instructions executable by at least one processor for creating and transmitting the rich message. Exemplary implementations of the RSAPP are disclosed in the description of FIG. 1. The RSAPP receives a request 201 to send an SMS message from a brand to a mobile number of a user. In an embodiment, the RSAPP receives the SMS message in the request. The RSAPP processes 202 the received SMS message and creates 203 a rich message. In an embodiment, the RSAPP determines whether the brand requests for a rich SMS, and if so, processes 202 the received SMS message and creates 203 the rich message. The RSAPP transmits 204 the created rich message to the mobile number of the user. In an embodiment, the RSAPP determines whether the mobile number of the user is enabled for rich communication services (RCS) and creates the rich message to be transmitted to the mobile number via the RCS. The mobile number is considered as enabled for the RCS, if the user has an RCS-capable client application installed on a user device of the user, which is configured to receive RCS messages sent to the mobile number. In another embodiment, the RSAPP determines whether the mobile number is enabled for one or more of multiple messaging applications, for example, the WhatsApp® instant messaging application of WhatsApp LLC or other instant messaging applications. For example, the RSAPP determines whether the mobile number is enabled for instant messages, for example, WhatsApp® messages, and creates a rich message to be transmitted to the mobile number via the WhatsApp® instant messaging application. The mobile number is considered as enabled for WhatsApp®, if the user has the WhatsApp® instant messaging application installed on the user device, which is configured to receive WhatsApp® messages sent to the mobile number. In another embodiment, the RSAPP determines whether the mobile number is enabled for one or more rich messaging platforms, that is, data messaging applications, for example, RCS, WhatsApp®, iMessage® of Apple, Inc., Viber® of Viber Media SARL, etc., and determines the type of rich message to be transmitted to the mobile number via the rich messaging platforms for which the mobile number is enabled. The RSAPP sends the rich message over a data link, for example, a mobile data link or Wi-Fi® of Wi-Fi Alliance Corporation. The RSAPP delivers the rich message to the RCS client, the WhatsApp® instant messaging application, or another data messaging application that is registered with the mobile number of the user.

In an embodiment, the rich short message service (SMS) application (RSAPP) determines whether the mobile number of the user is linked to a user profile. The RSAPP transmits the created rich message to the user profile on one or more of multiple rich messaging platforms, for example, Facebook® Messenger, Google Business Messages, Apple Business Chat, etc., if the mobile number of the user is linked to the user profile. In an embodiment, the user profile is a part of a profile stored by one or more entities comprising, for example, Facebook, Google, and Apple. In another embodiment, the RSAPP determines whether the mobile number of the user is linked to a chatbot created by the brand or a rich messaging platform, for example, Facebook® Messenger, Google Business Messages, Apple Business Chat, etc., where the user has linked their mobile number with their account. The RSAPP transmits the created rich message to the chatbot of the brand on one or more of the rich messaging platforms, for example, Facebook® Messenger, Google Business Messages, Apple Business Chat, etc.

In another embodiment, the rich short message service (SMS) application (RSAPP) determines whether the mobile number of the user is linked to the user profile on a rich messaging platform, for example, Google Business Messages, where the user has linked their user profile to their mobile number, by providing a validated mobile number while interacting with a chatbot belonging to the brand, and transmits the created rich message to the user profile on the rich messaging platform if the mobile number of the user is linked to the user profile.

Figure 12B:
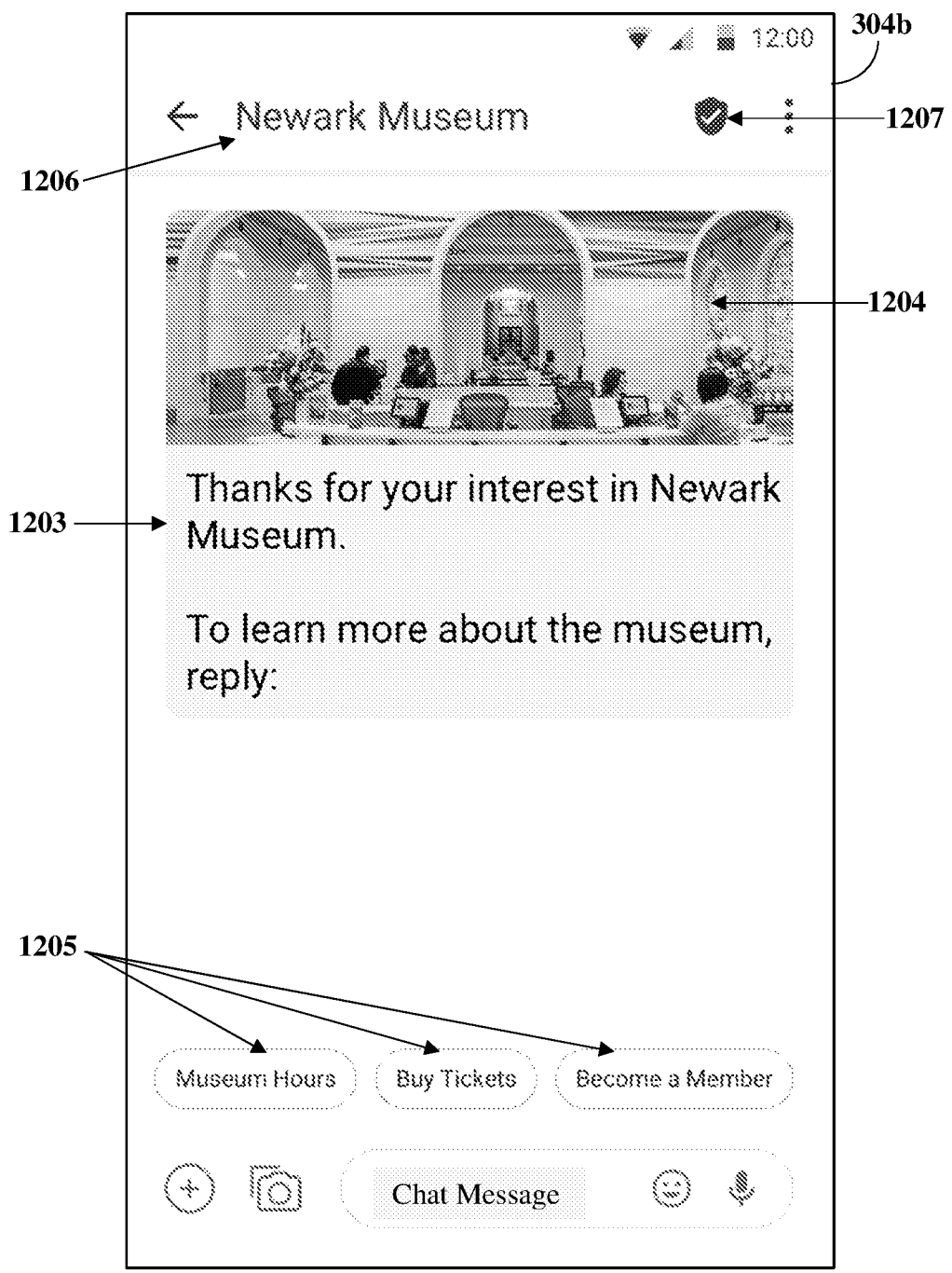
FIG. 12B exemplarily illustrates a screenshot of the graphical user interface rendered by the messaging client on the user device, displaying another embodiment of a rich message received by a user via a rich messaging channel from a verified sender ID of a brand.
Figure 13:
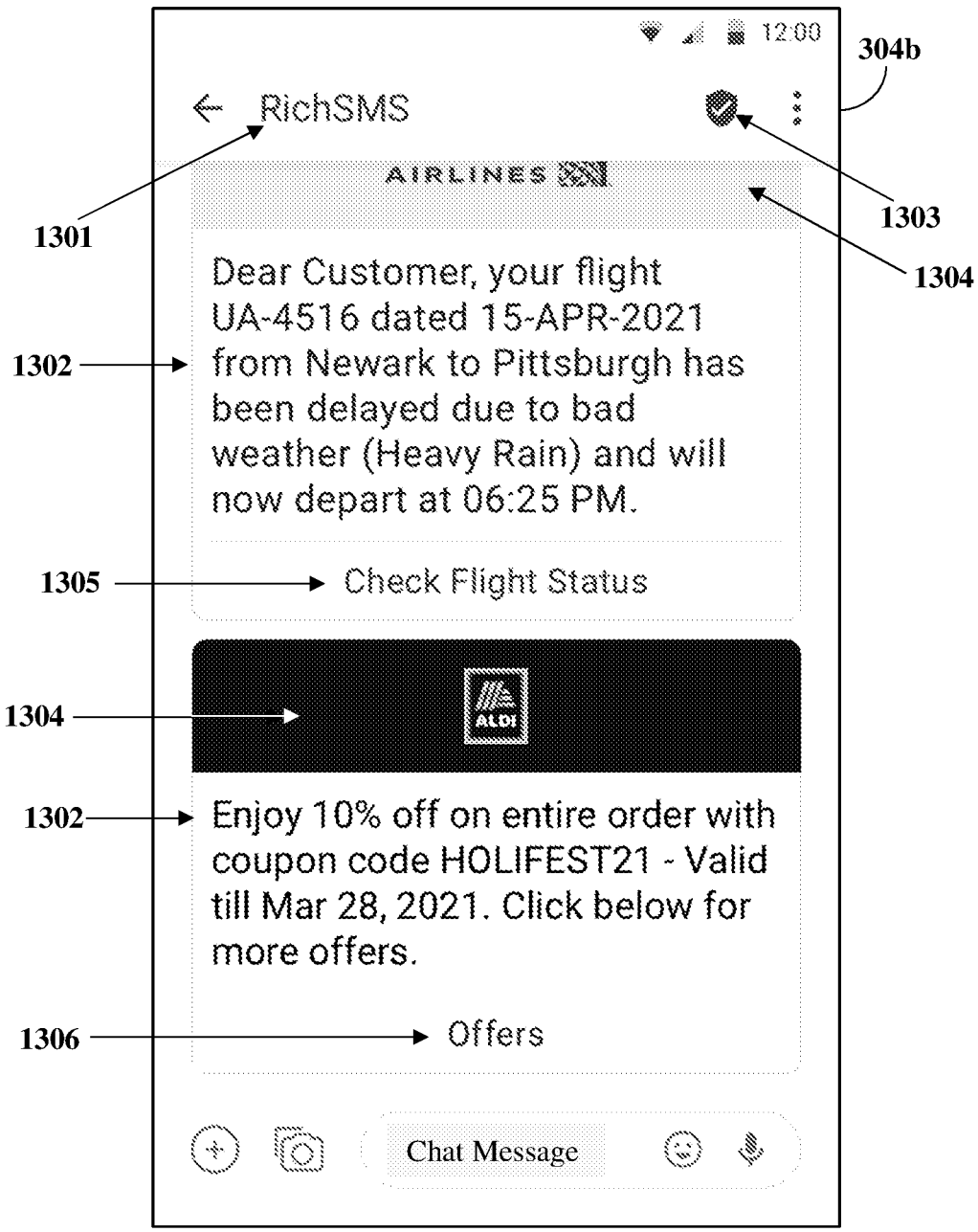
FIG. 13 exemplarily illustrates a screenshot of a graphical user interface rendered by a messaging client on a user device, displaying an embodiment of rich messages received by a user from a verified sender ID with a brand identity of each brand sending their rich message.

The user device associated with the mobile number of the user receives the transmitted rich message as exemplarily illustrated in FIG. 13. In an embodiment, the user receives the rich message from a sender identifier (ID), for example, a sender named "RichSMS", as exemplarily illustrated in FIG. 13. In another embodiment, the user receives the rich message from a sender ID of the brand, for example, "United Airlines", "ALDI", "MMA Connect", "Newark Museum", etc., as exemplarily illustrated in FIGS. 8B-8D, FIGS. 9B-9C, FIGS. 10B-10D, FIGS. 11B-11C, FIG. 12B, and FIG. 13. In another embodiment, if the user is not enabled for rich channels, the rich short message service (SMS) application (RSAPP) sends a message as a short message service (SMS) message.

The various embodiments of the method disclosed above are executed using one or more of an application programming interface (API) configured for sending a short message service (SMS) message; a protocol configured for sending the SMS message, for example, a Short Message Peer-to-Peer (SMPP) protocol; an application configured for sending the SMS message; an API configured for sending rich messages; a protocol configured for sending rich messages; and an application configured for sending the rich messages. In an embodiment, the API for sending SMS messages is a pre-existing API for SMS messaging that is already in use. In another embodiment, the API is a new API configured for sending SMS messages. For example, a new API for sending SMS messages comprises an attribute to select a specific template to use for creating a rich message from an SMS message. Another example of a new SMS API supports a callback method that allows the sender to get notified when a user clicks on a suggested action button. Similarly, in an embodiment, the protocol for sending SMS messages is a pre-existing protocol, for example, a Short Message Peer-to-Peer (SMPP) protocol that is already in use for SMS messaging. In another embodiment, the protocol for sending SMS messages is a new protocol, for example, a variant of the SMPP protocol with extensions that allow the brand, that is, the sender, to be notified when a user clicks on a suggested action button. In an embodiment, the RSAPP provides the rich message to the brand at the same cost or a lower cost as a conventional SMS message.

Figure 2B:
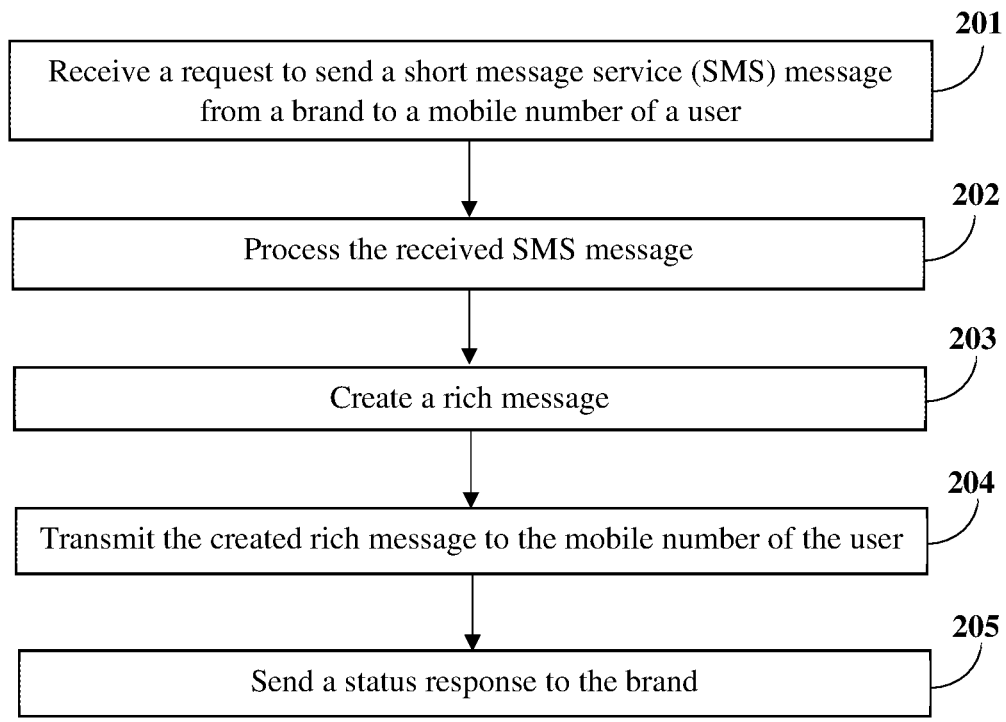
FIG. 2B exemplarily illustrates another embodiment of the method for creating and transmitting a rich message.

FIG. 2B exemplarily illustrates another embodiment of the method for creating and transmitting a rich message. The rich short message service (SMS) application (RSAPP) receives 201 a request to send an SMS message from a brand or developer on behalf of the brand, to a mobile number of a user. In an embodiment, the RSAPP receives the SMS message in the request. The RSAPP processes 202 the received SMS message and creates 203 a rich message as disclosed in the description of FIG. 1 and FIG. 2A. The RSAPP transmits 204 the created rich message to the mobile number of the user. The RSAPP sends 205 a status response to the brand or the developer on behalf of the brand. The status response indicates, for example, one or more of a delivery of the rich message to the user, a timeout without delivery of the rich message, a confirmation of the rich message having been read, the rich messaging platform used to transmit the rich message, etc. The status response further indicates, for example, that the mobile number of the user is not enabled for any of the rich messaging platforms, or whether a message is sent as short message service (SMS) message.

Figure 2C:
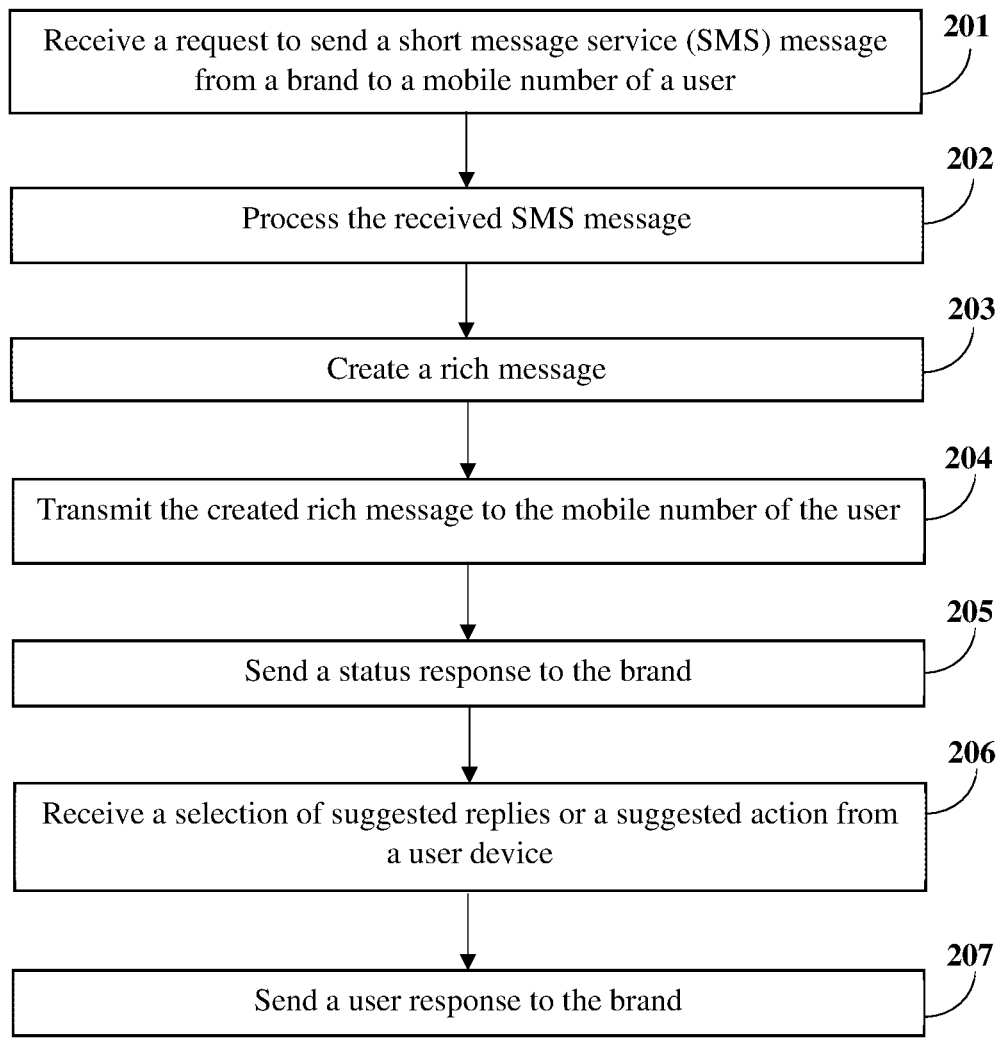
FIG. 2C exemplarily illustrates another embodiment of the method for creating and transmitting a rich message.

FIG. 2C exemplarily illustrates another embodiment of the method for creating and transmitting a rich message. The rich short message service (SMS) application (RSAPP) receives 201 a request to send an SMS message from a brand or a developer on behalf of the brand, to a mobile number of a user. In an embodiment, the RSAPP receives the SMS message in the request. The RSAPP processes 202 the received short message service message and creates 203 a rich message comprising a message, a brand identity, and in an embodiment, one or more of multiple interactive buttons. The RSAPP transmits 204 the created rich message to the mobile number of the user. The RSAPP sends 205 a status response to the brand or the developer on behalf of the brand. The interactive buttons in the rich message comprise, for example, a suggested reply button, a suggested action button, and a brand-specific action button. The suggested reply button allows the user to convey a response to the brand. The suggested action button or the brand-specific action button allows the user to take or execute an action suggested by the brand on a user device. The user responds back to the brand or the developer on behalf of the brand, by selecting one of the suggested replies or the suggested actions. The RSAPP receives 206 a selection of the suggested replies or an indication of the user selecting a suggested action from the user device. The RSAPP sends 207 a user response, that is, a suggested reply or a suggested action selected by the user, to the brand or the developer on behalf of the brand. In an embodiment, the RSAPP sends the status response and the user response together to the brand or the developer on behalf of the brand.

Figure 2D:
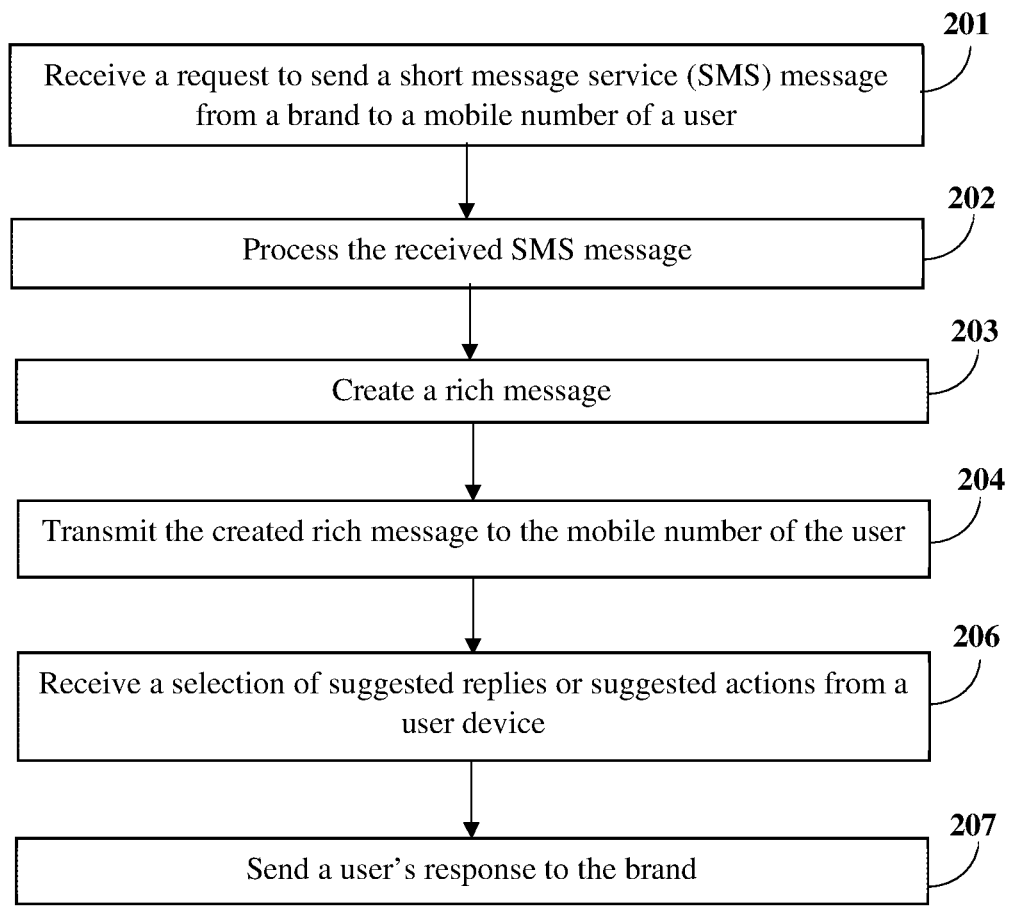
FIG. 2D exemplarily illustrates another embodiment of the method for creating and transmitting a rich message.

FIG. 2D exemplarily illustrates another embodiment of the method for creating and transmitting a rich message. The rich short message service (SMS) application (RSAPP) receives 201 a request to send an SMS message from a brand or a developer on behalf of the brand, to a mobile number of a user. In an embodiment, the RSAPP receives the SMS message in the request. The RSAPP processes 202 the received SMS message and creates 203 a rich message comprising a message, a brand identity, and in an embodiment, one or more of multiple interactive buttons. The RSAPP transmits 204 the created rich message to the mobile number of the user. The interactive buttons in the rich message comprise, for example, suggested replies and/or suggested action buttons as disclosed in the description of FIG. 2C. A selection of a suggested reply button using a user device of the user allows the user to respond to the brand or the developer on behalf of the brand. The selection of the suggested action button or the brand-specific action button allows the user to execute an action on the user device. The user responds to the brand or the developer on behalf of the brand, by selecting the suggested replies or the suggested actions. The RSAPP receives 206 a selection of the suggested replies or an indication of the user selecting a suggested action from the user device. The RSAPP sends 207 a user response, that is, one of the suggested replies or suggested actions selected by the user, to the brand or the developer on behalf of the brand. In an embodiment, the RSAPP sends a status response and the user response together to the brand or the developer on behalf of the brand.

Figure 3:
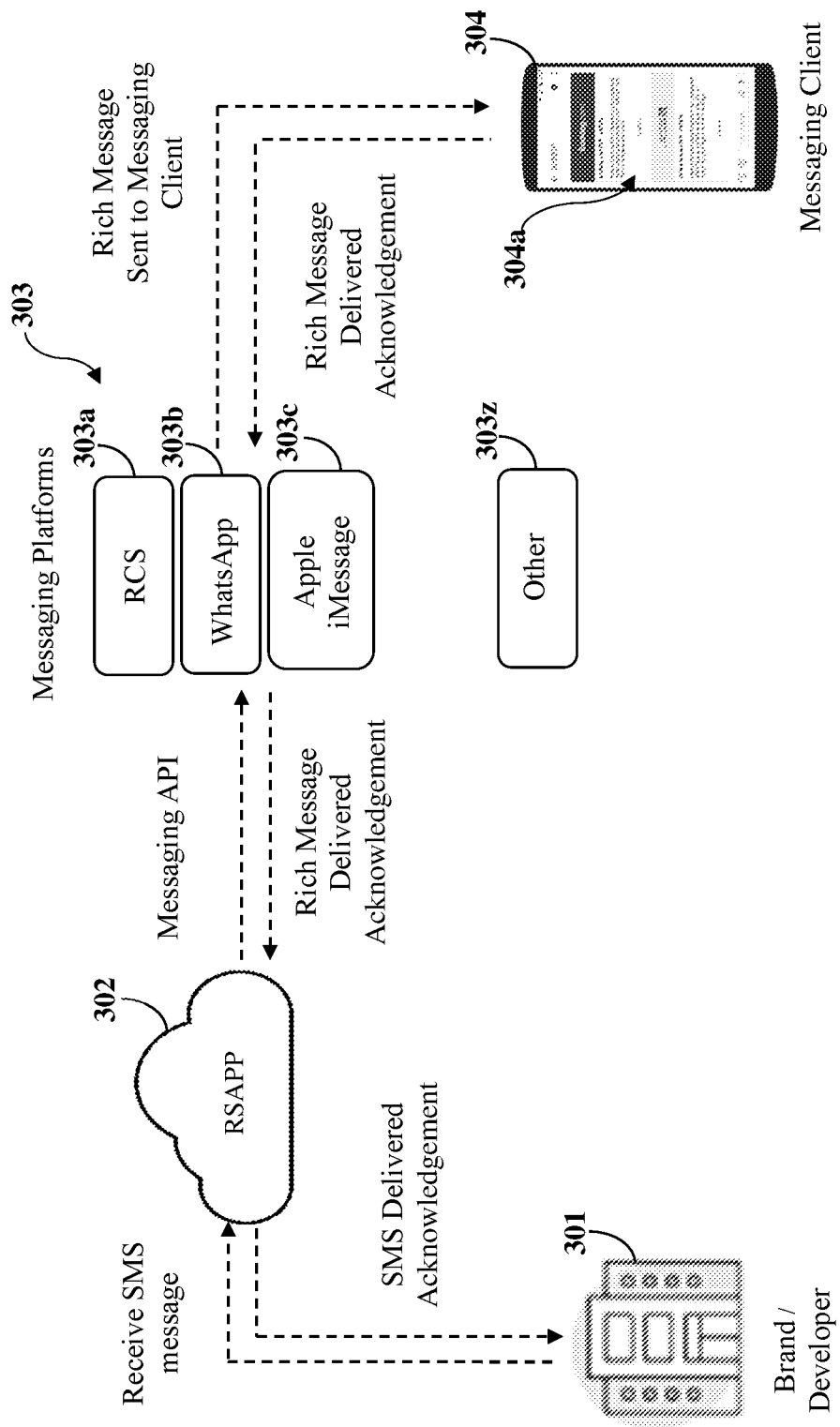
FIG. 3 exemplarily illustrates a schematic showing a process flow for creating and transmitting a rich message triggered by a brand or a developer on behalf of the brand.

FIG. 3 exemplarily illustrates a schematic showing a process flow for creating and transmitting a rich message triggered by a brand or a developer 301 on behalf of the brand. A brand/developer 301 accesses a rich short message service (SMS) application (RSAPP) 302 to create and transmit a rich message to a mobile number of a user. In an embodiment as exemplarily illustrated in FIG. 3, the RSAPP 302 is configured as a cloud platform implemented as a service, accessible by using application programing interfaces (APIs). The brand/developer 301 can choose transmission of the rich message from a verified sender identifier (ID), for example, "RichSMS" as exemplified in FIG. 13, without the need to use the brand's own sender ID. In an embodiment, one or more brands can choose transmission of the rich message from a verified sender ID, for example, "RichSMS", whereas one or more other brands can choose transmission of the rich message from another verified sender ID, for example, "United Airlines", "ALDI", "Newark Museum", etc., as exemplarily illustrated in FIGS. 8B-8D, FIGS. 9B-9C, FIGS. 10B-10C, FIG. 11B, and FIG. 12B, whereas one or more other brands can choose transmission of the rich message from another non-verified sender ID, for example, "MMA Connect", "United Airlines", etc., as exemplarily illustrated in FIG. 10D and FIG. 11C.

The brand/developer 301 can also choose transmission of the rich message from its own sender ID, such as its own brand name, as exemplarily illustrated in FIGS. 8B-8D, FIGS. 9B-9C, FIGS. 10B-10C, FIGS. 11B-11C, and FIG. 12B. In another embodiment, the brand's own sender ID is a verified sender ID as exemplarily illustrated in FIGS. 8B-8D, FIGS. 9B-9C, FIGS. 10B-10C, FIG. 11B, and FIG. 12B. In another embodiment, the brand's own sender ID is not a verified sender ID as exemplarily illustrated in FIG. 10D and FIG. 11C. In an embodiment, the sender ID that the rich short message service (SMS) application (RSAPP) 302 uses to transmit the rich message is visible to the user, for example, as an alphanumeric string, as a phone number, as a short code, or any combination thereof. The RSAPP 302 receives a request to send an SMS message from a brand/developer 301 to a mobile number of a user as exemplarily illustrated in FIG. 3. The RSAPP 302 processes the request to send the SMS message and creates the rich message. The RSAPP 302 transmits the created rich message from the sender ID specified by the developer, to the mobile number of the user using one of multiple messaging platforms 303, for example, Rich Communication Services (RCS) 303a, WhatsApp® 303b, Apple's iMessage® 303c, or other platforms 303z. The RSAPP 302 communicates with the messaging platforms 303 via one or more messaging application programming interfaces (APIs).

The rich short message service (SMS) application (RSAPP) 302 determines rich data messaging capabilities of one or more of the messaging platforms 303a to 303z for which the mobile number of the user is enabled and maps a request for a rich message from the brand/developer 301 to messaging platform-specific capabilities, to create and transmit the rich message to the mobile number of the user. A user device 304 of the user is associated with the mobile number of the user. The user device 304 comprises a messaging client 304a installed thereon for receiving messages. In an embodiment, the RSAPP 302 determines whether the mobile number of the user is enabled for rich communication services (RCS) and creates the rich message to be transmitted to the mobile number of the user via the RCS channel. For example, a channel such as RCS supports rich elements comprising a carousel, suggested responses, and a suggested chiplist that are configured to be used to implement interactive buttons for user actions or replies such as copy, confirm, complete transaction, report potential fraud, unauthorized access, did not request, unrecognized transaction, open a website, open a map location, share a location, select a menu option where a user can tap on an interactive button exemplarily illustrated in FIG. 8C, FIG. 9C, FIGS. 11B-11C, FIG. 12B, and FIG. 13, to complete an action without leaving the messaging client 304a or having to type a reply as in person-to-application (P2A) messaging, etc. In an embodiment, the RSAPP 302 processes text in the received SMS message to add one or more interactive buttons for users to select or tap, for example, by taking an existing two-way interactive SMS channel and adding richness of suggested reply buttons thereto to make it easier for the user to engage with the brand or the developer 301 on behalf of the brand. In another embodiment, the RSAPP 302 adds interactive buttons for suggested replies and suggested actions over and above the text in the received SMS message, based on details specified in a rich message template by the brand or the developer 301 on behalf of the brand, to add interactivity that was previously not supported in the SMS interaction.

In another embodiment, the rich short message service (SMS) application (RSAPP) 302 determines whether the mobile number of the user is enabled for the WhatsApp® instant messaging application, hereinafter referred to as "WhatsApp", and creates the rich message to be transmitted to the mobile number of the user via WhatsApp. In an example, messaging channels such as WhatsApp may support delivery of images for the brand's logo, but may not support other rich elements to implement interactive buttons that users can click to complete an action as exemplarily illustrated in FIG. 8D and FIG. 10C. For such channels, the RSAPP 302 sends a menu of options for suggested replies and suggested actions, for example, "send or type 1 to confirm, 2 to report fraud". A user types the response to complete the action. Furthermore, in an embodiment, the RSAPP 302 sends weblinks in the rich message to confirm and to report fraud actions. The user clicks on the weblink to complete the action, leading to a web browser being opened. If the WhatsApp channel evolves to include rich elements such as interactive buttons, then the RSAPP 302 incorporates the interactive buttons into the rich message.

In another embodiment, the rich short message service (SMS) application (RSAPP) 302 determines whether the mobile number of the user is enabled for one or more rich messaging platforms 303, for example, RCS, WhatsApp®, iMessage®, Viber®, etc., and determines a type of the rich message to be transmitted to the mobile number of the user via the enabled rich messaging platform(s). The RSAPP 302 allows the brand/developer 301 to transmit the rich message to the mobile number of the user over data, to a data messaging client 304a, for example, a Rich Communication Services (RCS) client, a WhatsApp® client, an iMessage® client, a Viber® client, etc. The RSAPP 302 sends the rich message over a data link comprising, for example, mobile data link or a Wi-Fi® data link. The RSAPP 302 delivers the rich message into the messaging client 304a, that is, a data messaging application, on the user device 304 associated with the mobile number of the user. The RSAPP 302 monitors the delivery of the rich message to the mobile number of the user. In an embodiment, depending on the preference of the brand/developer 301, the RSAPP 302 transmits/delivers the rich message to the mobile number of the user via one or more additional messaging platforms in case of a delivery failure or a delay in transmission/delivery of the rich message to the mobile number of the user via a first messaging platform. In another embodiment, the RSAPP 302 transmits the rich message to the user device 304 via more than one additional messaging platform to increase the reliability of delivery of the rich message. The additional messaging platforms comprise, for example, SMS platforms and alternative data messaging platforms that permit rich messages. In an embodiment, the RSAPP 302 revokes the rich message from the first rich messaging channel(s) before transmitting the message via a second rich messaging channel.

In an embodiment, the routing logic of the rich short message service (SMS) application (RSAPP) 302 comprises determining whether the user identified by the mobile number is available on one or more rich messaging channels, for example, RCS, WhatsApp®, Viber®, etc. The RSAPP 302 selects one or more of the rich messaging channels based on one or more of multiple parameters comprising, for example: size of the SMS message; capabilities of multiple messaging platforms; cost of sending the SMS message via one or more of the rich messaging channels in terms of standard pricing as well as dynamic pricing based on traffic patterns; history of a recipient of the SMS message in terms of message delivery status and time, message read status and time, and user response; and maintenance of consistency by sending the SMS message on a single rich messaging channel instead of switching between multiple rich messaging channels. In an embodiment, the RSAPP 302 sends the rich message concurrently over multiple rich messaging channels that are enabled to increase chances of delivery of the rich message. Furthermore, the RSAPP 302 revokes the rich message from other rich messaging channels that are enabled as soon as the rich message is delivered via one of the rich messaging channels. Furthermore, in an embodiment, the RSAPP 302 determines the developer's preference in terms of the order of the rich messaging channels to be used to transmit the rich message, and the user's availability on one or more rich messaging channels. Furthermore, in an embodiment, the RSAPP 302 enhances the rich message through one or more of multiple automatic enhancements comprising, for example, replacing the uniform resource locator (URL) links within the SMS message with one or more of an image, a video, and other rich media; and automatically adding interactive buttons to convey suggested replies or suggested actions to the SMS message based on content of the SMS message. For example, (1) in case of a one-time-password (OTP), the RSAPP 302 adds a suggested action of Copy to the SMS message; (2) in case of a message with a URL, the RSAPP 302 adds a suggested action to open a website, to the SMS message; and (3) based on some other content, the RSAPP 302 adds a suggested action to open a map location, share a location, select a menu option, etc. The creation of the rich message, therefore, comprises addition of the automatic enhancements to the SMS message received from the brand/developer 301.

The rich short message service (SMS) application (RSAPP) 302 receives an acknowledgement of the rich message being delivered to the messaging client 304a on the user device 304 via one or more of the messaging platforms 303 and associated messaging application programming interfaces (APIs). Furthermore, where interactive buttons to convey one or more of suggested replies and suggested actions are provided in the rich message, the RSAPP 302 receives an acknowledgement regarding selection of one of the options from the user device 304 of the user. The RSAPP 302 conveys the received selection of one of the suggested replies and the suggested actions from the user device 304 of the user to the brand/developer 301. In an embodiment, the RSAPP 302 conveys the received selection of one of the suggested replies and the suggested actions from the user device 304 of the user to the brand/developer 301 by sending a person-to-application (P2A) message back on an SMS application programming interface (API) or by using a Short Message Peer-to-Peer (SMPP) protocol. Upon determining that the mobile number of the user is not enabled on one or more of the messaging platforms 303, the RSAPP 302 confirms whether a setting from the brand/developer 301 specifies transmission of the received SMS message to the mobile number of the user, and transmits the received SMS message to the mobile number of the user. The RSAPP 302 sends an acknowledgement of the fallback SMS message being delivered to the brand/developer 301.

In an embodiment, the method disclosed above is executed using an application programming interface (API) provided to the developer 301 by the RSAPP 302.

Figure 4:
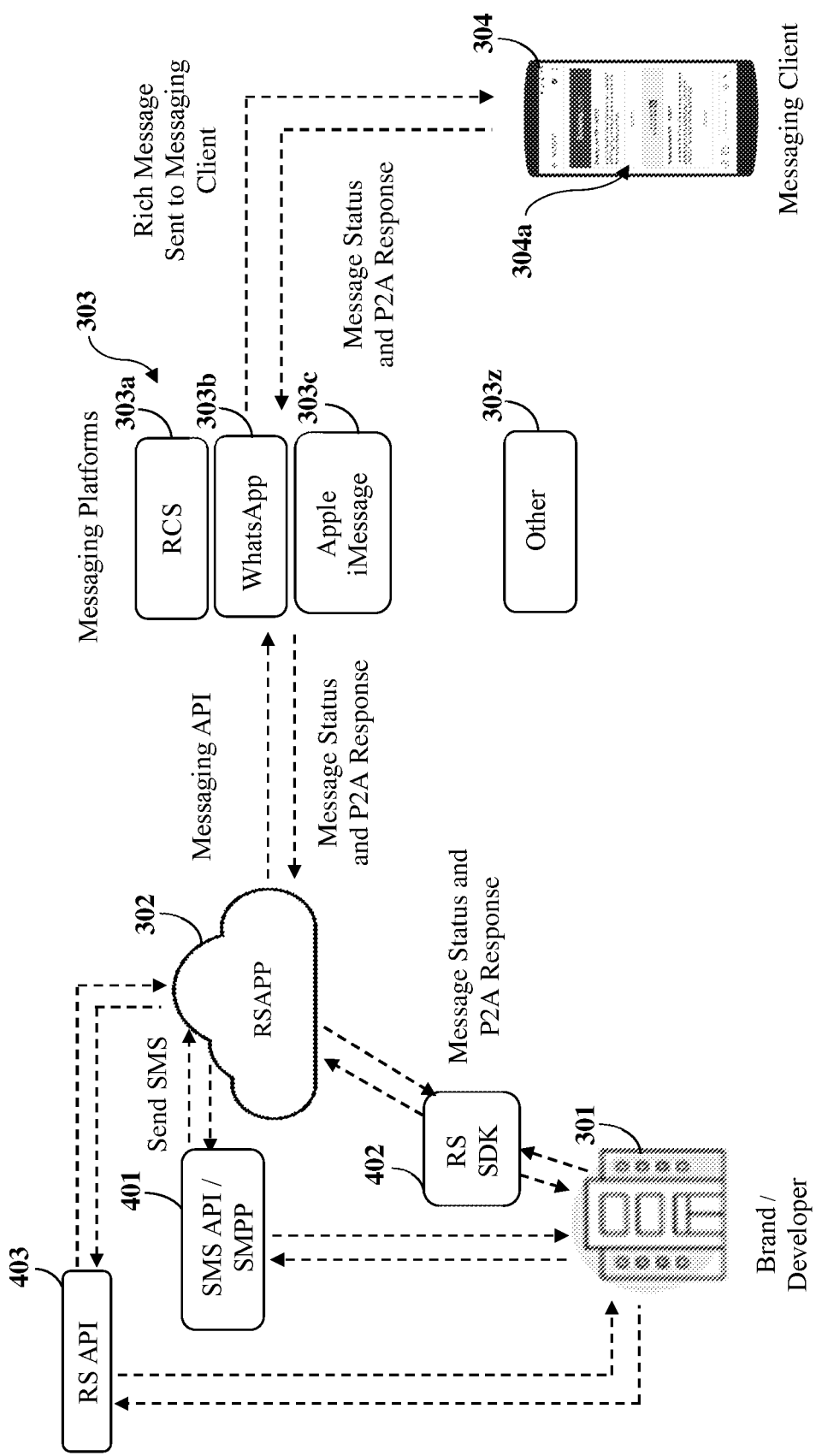
FIG. 4 exemplarily illustrates a schematic showing a process flow for creating and transmitting a rich message triggered by a brand or a developer on behalf of the brand using one or more application programming interfaces (APIs), protocols, applications, and software tools.

FIG. 4 exemplarily illustrates a schematic showing a process flow for creating and transmitting a rich message triggered by a brand or a developer 301 on behalf of the brand using one or more application programming interfaces (APIs), protocols, applications, and software tools. The method disclosed herein is executed using, for example, one or more of an API configured for sending a rich message, for example, a rich short message service (SMS) (RS) API 403; an API configured for sending SMS messages; a protocol configured for sending SMS messages, for example, a Short Message Peer-to-Peer (SMPP) protocol; web services; representational state transfer (REST) (API); and a software development kit (SDK) configured for rich messages. Consider an example where a brand or a developer 301 on behalf of the brand uses one of an SMS API and an SMPP protocol 401 for sending an SMS message. The rich SMS application (RSAPP) 302 receives the request to send the SMS message using one of the SMS API and the SMPP protocol 401. The RSAPP 302 parses the content of the SMS message received, for example, from the SMS API 401, and identifies the type of content of the received SMS message. The RSAPP 302 performs the identification of the type of content of the received SMS message by analyzing the received SMS message to determine whether the SMS message is used to send, for example, one of a notification, a promotion, and transaction. In an embodiment, the RSAPP 302 performs the analysis based on pattern matching or on machine learning techniques.

The rich short message service (SMS) application (RSAPP) 302 creates a rich message and transmits the created rich message to a mobile number of a user. A messaging client 304a on a user device 304 of the user receives the rich message and transmits an acknowledgement of the rich message being received, to the RSAPP 302, via one or more of the messaging platforms 303, for example, Rich Communication Services (RCS) 303a, WhatsApp® 303b, Apple's iMessage® 303c, other platforms 303z, etc., and associated messaging application programming interfaces (APIs). After transmitting the created rich message to the mobile number of the user, the RSAPP 302 receives the acknowledgement regarding the rich message being received, from the messaging client 304a. In an embodiment, the RSAPP 302 transmits a delivery receipt, that is, an acknowledgement regarding delivery of the rich message to the mobile number of the user, to the brand or the developer 301 on behalf of the brand, in the form of an SMS delivery receipt status sent over the SMS API 401 or as a message type short message service center (SMSC) delivery receipt, for example, in a DELIVER_SM message or a DATA_SM message sent over the Short Message Peer-to-Peer (SMPP) protocol 401, depending on the API or the protocol over which the RSAPP 302 received the SMS message. In another embodiment, the RSAPP 302 transmits the delivery receipt, that is, an acknowledgement regarding delivery of the message, by invoking a callback uniform resource locator (URL) specified in a rich message template by the brand or the developer 301 on behalf of the brand along with required parameter(s) as relevant.

In an embodiment, the rich short message service (SMS) application (RSAPP) 302 receives a read receipt indicating that the rich message has been read or seen by the user from the messaging client 304a on the user device 304 via one or more of the messaging platforms 303 and associated messaging application programming interfaces (APIs). In an embodiment, the RSAPP 302 transmits the read receipt indicating that the message has been read or seen by the user to the brand or the developer 301 on behalf of the brand, in the form of a read receipt status message sent on the SMS API 401 or as a message type short message entity (SME) Delivery Acknowledgement in a DELIVER_SM message or a DATA_SM message sent over the Short Message Peer-to-Peer (SMPP) protocol 401. In another embodiment, the RSAPP 302 transmits the read receipt by setting a message_status field in a short_message parameter to "ACCEPTD" in the DELIVER_SM message sent over the SMPP protocol 401. In another embodiment, the RSAPP 302 transmits the read receipt by sending a person-two-application (P2A) SMS message from the mobile number of the user to the brand with a text, for example, "MESSAGE READ". In another embodiment, the RSAPP 302 transmits the read receipt by invoking a callback uniform resource locator (URL) specified in a rich message template by the brand or the developer 301 on behalf of the brand, along with required parameter(s) as relevant.

Furthermore, in an embodiment, the rich short message service (SMS) application (RSAPP) 302 determines whether the mobile number of the user supports delivery of rich messages or does not support delivery of rich messages, and accordingly transmits the received SMS message as a rich message or as a standard SMS message, respectively. In an embodiment, the brand or the developer 301 on behalf of the brand, can add optional support for suggested replies and/or suggested actions, by implementing callback methods for these actions, even when using an existing SMS application programming interface (API). The RSAPP 302 receives an acknowledgement regarding selection of one of the suggested replies from the user device 304 of the user. In an embodiment, the RSAPP 302 transmits an acknowledgement regarding the user selecting suggested replies or suggested actions to the brand or the developer 301 on behalf of the brand by sending a person-to-application (P2A) SMS message from the user's mobile number to the brand 301 with a text that specifies the suggested reply or the suggested action selected by the user, along with additional optional parameters as relevant. In another embodiment, the RSAPP 302 transmits an acknowledgement regarding the user selecting a suggested reply or a suggested action to the brand or the developer 301 on behalf of the brand by sending a P2A SMS message from the user's mobile number to the brand invoking a callback uniform resource locator (URL) specified in the rich message template, along with required parameter(s) as relevant. In another embodiment, the RSAPP 302 transmits an acknowledgement regarding the user selecting a suggested reply but does not transmit an acknowledgement regarding the user selecting a suggested action, as specified in the rich message template.

Furthermore, in an embodiment, a brand or a developer 301 on behalf of the brand uses one of a short message service (SMS) application programming interface (API) and a Short Message Peer-to-Peer (SMPP) protocol 401, a rich SMS (RS) software development kit (SDK) 402 and a RS API 403 for sending an SMS message. The rich SMS application (RSAPP) 302 receives the request to send an SMS message using one of the SMS API and the SMPP protocol 401, RS SDK 402, and the RS API 403. The RSAPP 302 parses the content of the SMS message received from one of the SMS API 401, RS SDK 402, and the RS API 403, and identifies the content of the received SMS message. The RSAPP 302 performs the identification of the content by analyzing the received SMS message to determine whether the SMS message is used to send one of a notification, a promotion, and a transaction. The RSAPP 302 performs the analysis based on pattern matching or on machine learning techniques. The RSAPP 302 creates a rich message and transmits the created rich message to the mobile number of the user.

Figure 5:
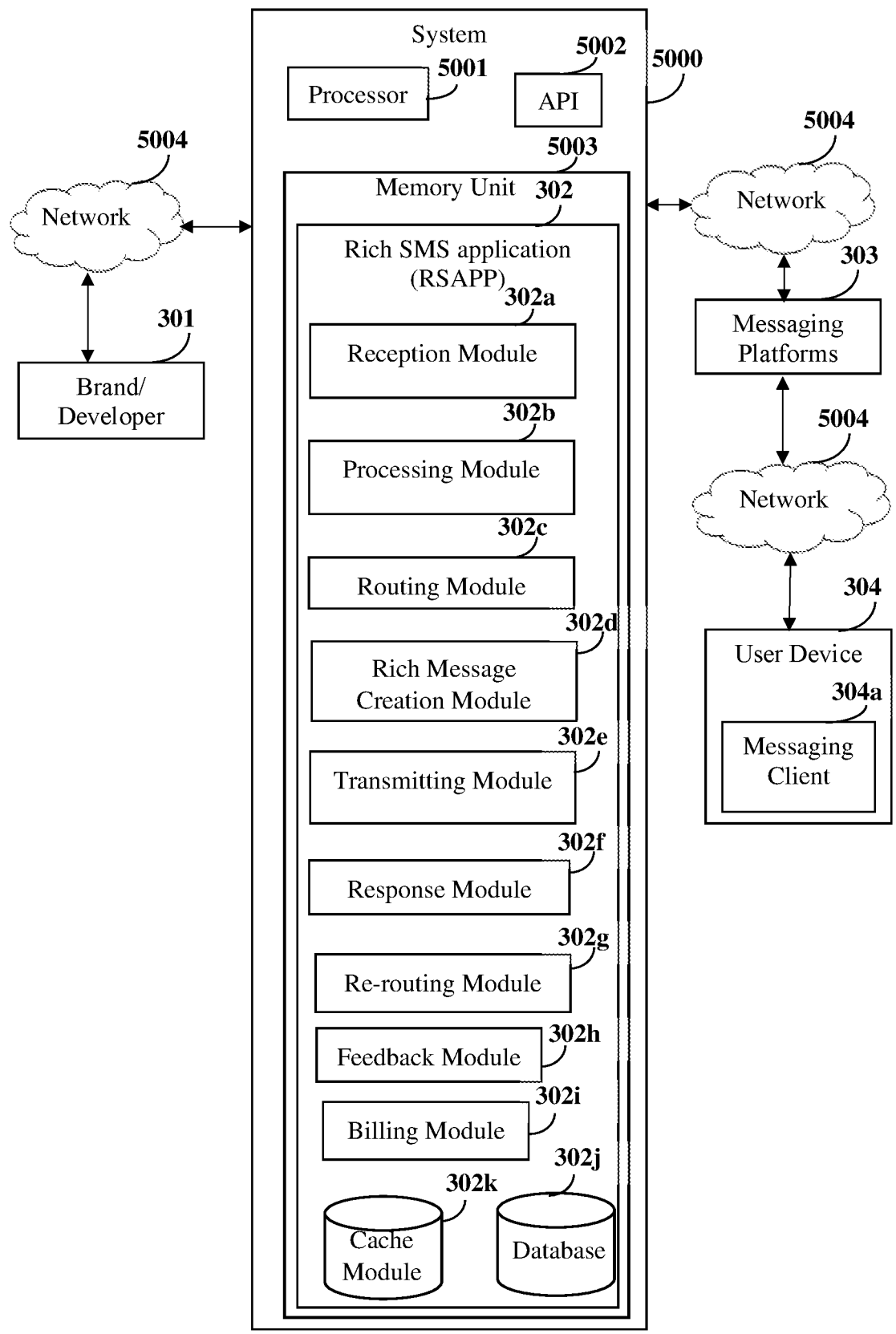
FIG. 5 exemplarily illustrates an architectural block diagram of an exemplary implementation of a system for creating and transmitting a rich message.
Figure 6A:
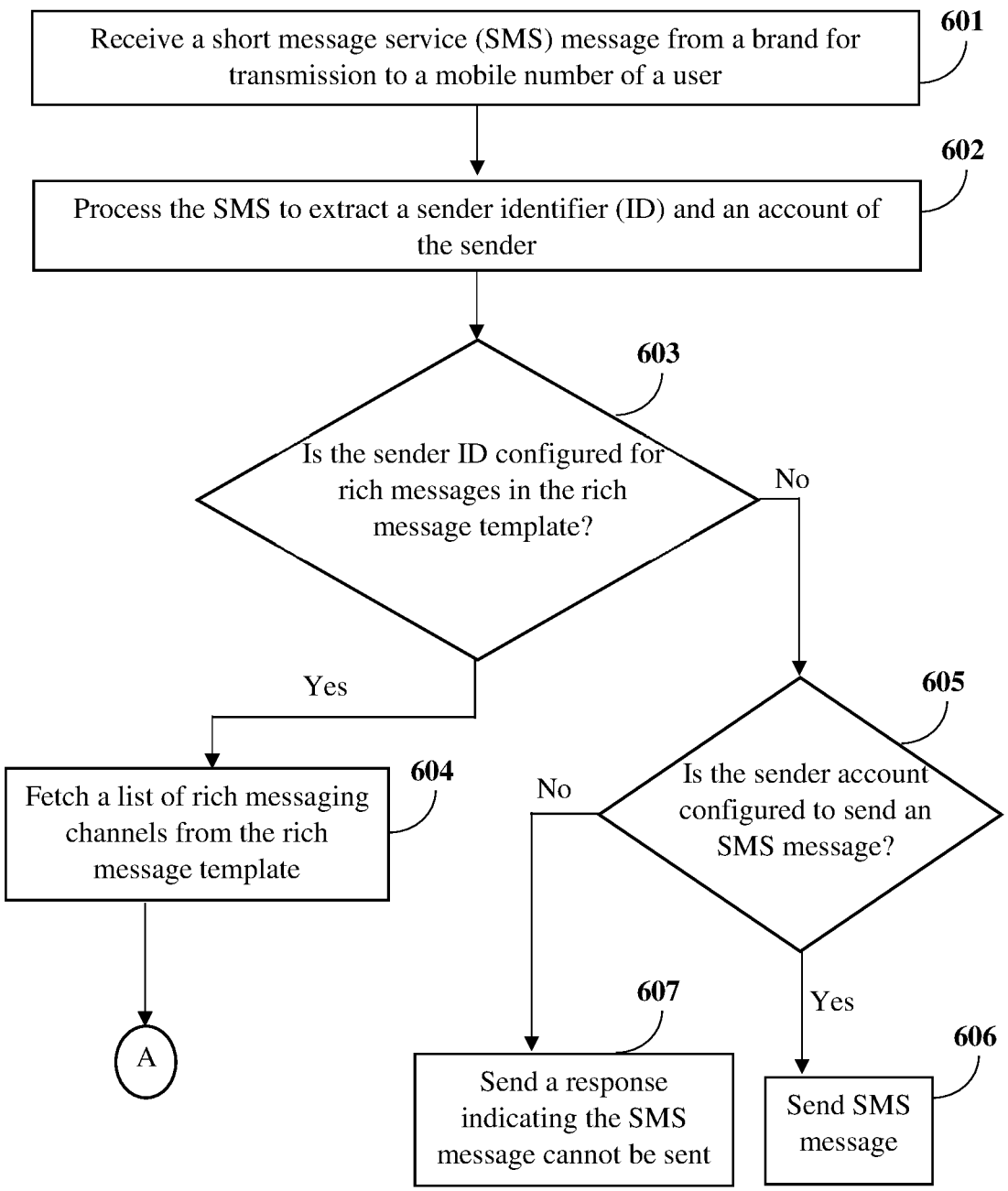
FIGS. 6A-6E illustrates a flowchart for creating and transmitting a rich message.
Figure 6B:
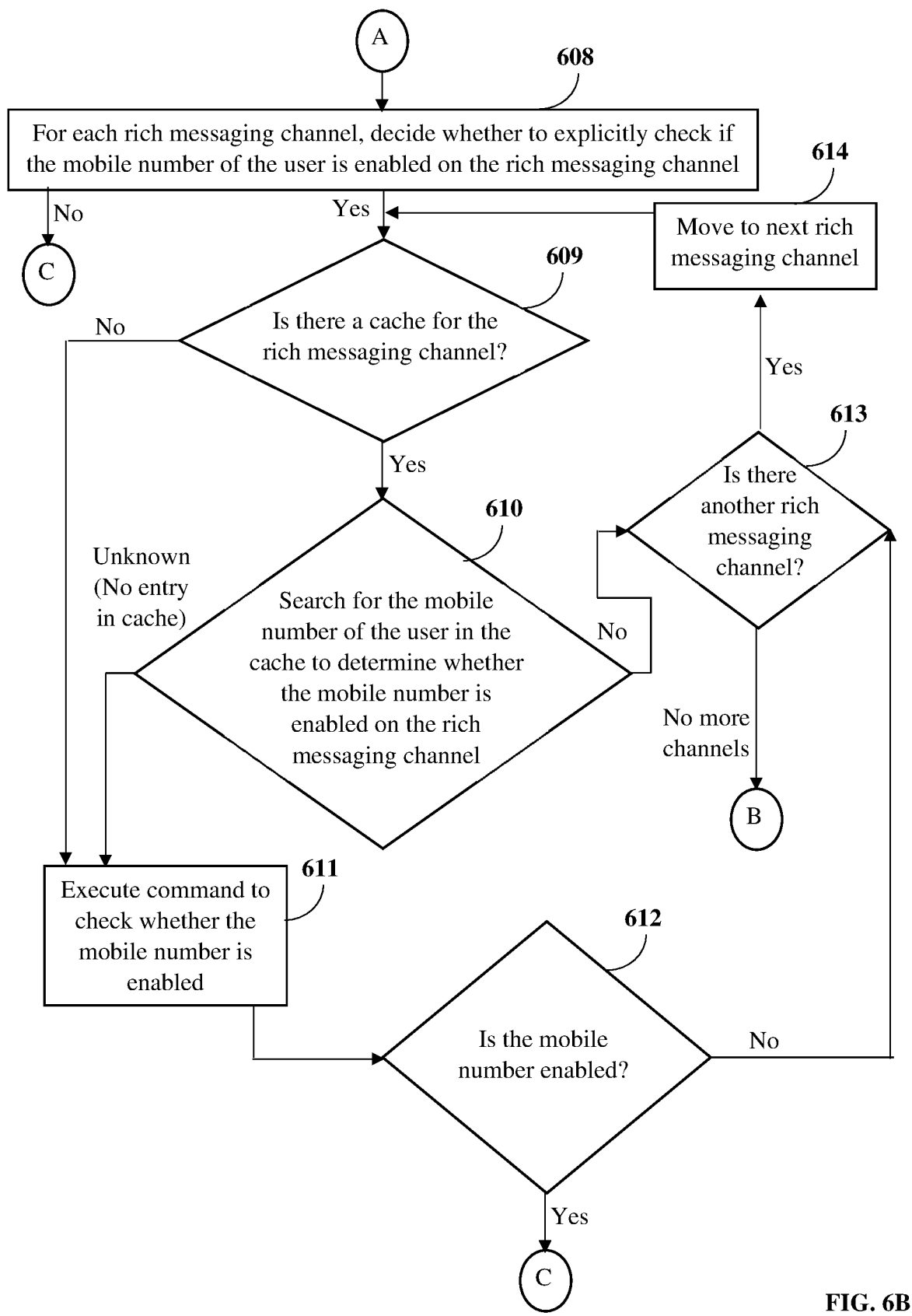
Figure 6C:
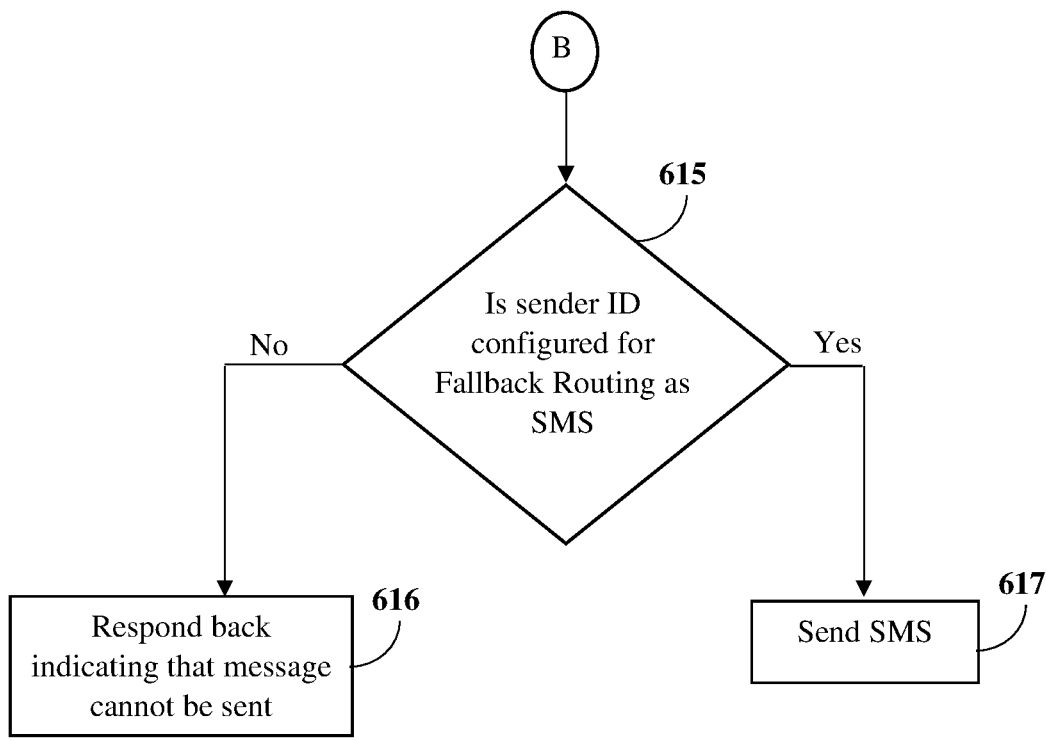
Figure 6D:
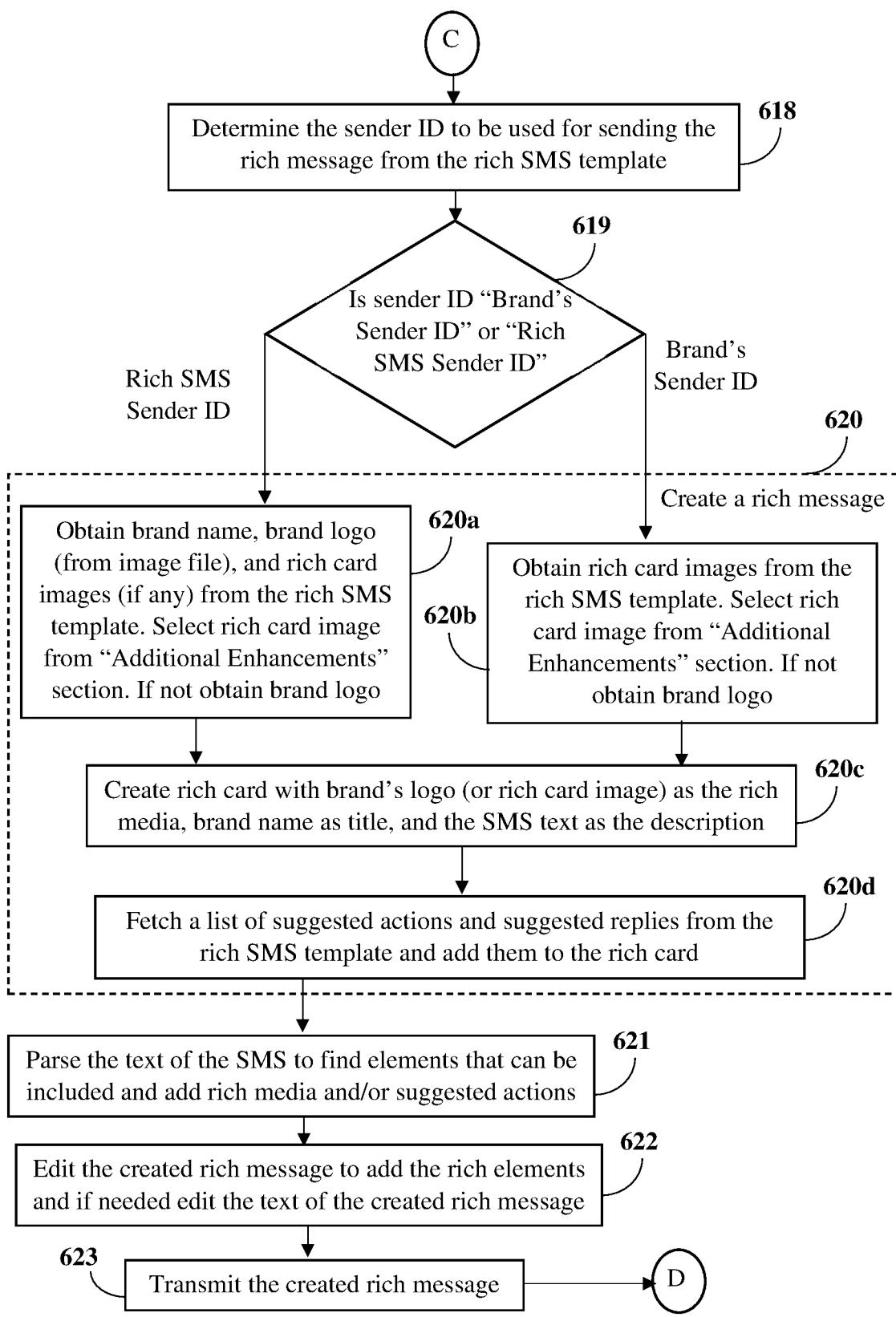
Figure 6E:
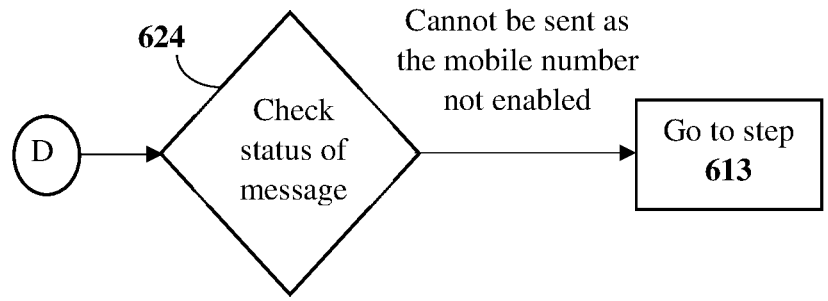

FIG. 5 exemplarily illustrates an architectural block diagram of an exemplary implementation of a system 5000 for creating and transmitting a rich message. The system 5000 disclosed herein is a computer system programmable using high-level computer programming languages. The system 5000 is accessible to a brand or a developer 301 on behalf of the brand via a network 5004 through a broad spectrum of technologies and devices such as personal computers with access to the internet, laptops, mobile computing devices, smart phones, tablet computing devices, servers, workstations, a portable electronic device, a network-enabled computing device, an interactive network-enabled communication device, any other suitable computing equipment, combinations of multiple pieces of computing equipment, etc. Furthermore, the system 5000 communicates with multiple messaging platforms 303 via a network 5004. The messaging platforms 303 comprise, for example, Rich Communication Services (RCS), WhatsApp® of WhatsApp LLC, iMessage® of Apple, Inc., Viber® of Viber Media SARL, Facebook® Messenger of Facebook, Inc., etc. Furthermore, the messaging platforms 303 are accessible to a user device 304 via a network 5004. The user device 304 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a portable electronic device, a network-enabled computing device, an interactive network-enabled communication device, an image capture device, any other suitable computing equipment, combinations of multiple pieces of computing equipment, etc. The user device 304 comprises a messaging client 304a implemented, for example, on the Android® platform of Google Inc., the iOS platform of Apple Inc., the Windows® platform of Microsoft Corporation, and other platforms. The messaging client 304a is configured to receive messages, for example, short message service (SMS) messages, rich messages, etc., via the network 5004. The messaging client 304a is, for example, the WhatsApp® instant messaging application of WhatsApp LLC, the iMessage® instant messaging application of Apple, Inc., Viber® of Viber Media SARL, Facebook® Messenger of Facebook, Inc., etc.

The system 5000 interfaces with the devices of the brand or developer 301 on behalf of the brand and the messaging platforms 303, and in turn, with the user device 304, and in an embodiment, with one or more database systems (not shown) and servers (not shown) to implement the rich short message service (SMS), and therefore more than one specifically programmed computing system is used for implementing the rich SMS. The network 5004 is, for example, one of the internet, satellite internet, a wireless network, a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

As exemplarily illustrated in FIG. 5, the system 5000 comprises at least one processor 5001, an application programming interface (API) 5002 configured for rich messages, and a non-transitory, computer-readable storage medium, for example, a memory unit 5003. As used herein, "non-transitory, computer-readable storage medium" refers to all computer readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The system 5000 further comprises the rich short message service (SMS) application (RSAPP) 302 configured to define computer program instructions executable by at least one processor 5001. The non-transitory, computer-readable storage medium, herein exemplarily referred to as the memory unit 5003, is configured to store the computer program instructions defined by the RSAPP 302. In an embodiment, the memory unit 5003 stores respective modules 302a, 302b, 302c, 302d, 302e, 302f, 302g, 302h, 302i, and 302j of the RSAPP 302 as exemplarily illustrated in FIG. 5.

The processor 5001 is operably and communicatively coupled to the memory unit 5003 for executing the computer program instructions defined by the modules, for example, 302a, 302b, 302c, 302d, 302e, 302f, 302g, 302h, 302i, etc., of the rich short message service (SMS) application (RSAPP) 302. The memory unit 5003 is a storage unit used for recording, storing, and reproducing data, program instructions, and applications. In an embodiment, the memory unit 5003 comprises a random-access memory (RAM) or another type of dynamic storage device that serves as a read and write internal memory and provides short-term or temporary storage for information and instructions executable by the processor(s) 5001. The memory unit 5003 also stores temporary variables and other intermediate information used during execution of the instructions by the processor 5001. In another embodiment, the memory unit 5003 further comprises a read-only memory (ROM) or another type of static storage device that stores firmware, static information, and instructions for execution by the processor 5001. The modules, for example, 302a, 302b, 302c, 302d, 302e, 302f, 302g, 302h, 302i, and 302j of the RSAPP 302, when loaded into the memory unit 5003 and executed by the processor 5001, transform the system 5000 into a specially-programmed, special purpose computing device configured to implement the functionality disclosed herein. The processor 5001 refers to one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 5001 is implemented as a processor set comprising, for example, a programmed microprocessor and a math or graphics co-processor. The RSAPP 302 is not limited to employing the processor 5001. In an embodiment, the RSAPP 302 employs a controller or a microcontroller.

The rich short message service (SMS) application (RSAPP) 302 defining computer program instructions, which when executed by the processor 5001, causes the at least one processor 5001 to manage actions associated with creating and transmitting a rich message. In an exemplary implementation illustrated in FIG. 5, the RSAPP 302 comprises a reception module 302a, a processing module 302b, a routing module 302c, a rich message creation module 302d, a transmitting module 302e, a response module 302f, a re-routing module 302g, a feedback module 302h, a billing module 302i, a database 302j, and a cache module 302k. The reception module 302a is configured to receive a request to send an SMS message from a brand or a developer 301 on behalf of the brand to a mobile number of a user.

The processing module 302b is configured to process the request to send the short message service (SMS) message. The routing module 302c is configured to determine whether the mobile number of the user is enabled on one or more of multiple rich messaging channels provided by the messaging platforms 303 by executing a channel specific command on each of the rich messaging channels for the mobile number of the user. For example, a rich communication services contacts capability check command is executed to determine if the the mobile number of the user is enabled for rich communication services (RCS). The rich messaging channels comprise, for example, Rich Communication Services (RCS), WhatsApp® of WhatsApp LLC, iMessage® of Apple, Inc., Viber® of Viber Media SARL, Telegram® of Telegram FZ-LLC, Facebook® Messenger of Facebook, Inc., Google Business Messages of Google LLC, Signal® Private Messenger of Signal Technology Foundation, etc. Upon determining that the mobile number of the user is enabled on one or more of the rich messaging channels, the rich message creation module 302d creates a rich message comprising a message and a brand identity with an optional verification mark. In an embodiment, the database 302j stores the created rich message. The database 302j is any storage area or medium that can be used for storing the rich messages and rich media contained in the rich messages. In an embodiment, the database 302j is any of a structured query language (SQL) database or a not only SQL (NoSQL) database. In an embodiment, the database 302j is a location on a file system. In another embodiment, the database 302j is configured to be remotely accessible by the rich SMS application (RSAPP) 302 in the system 5000 via the network 5004. In another embodiment, the database 302j is configured as a cloud-based database implemented in a cloud computing environment. The Cache module 302k is configured as a local cache, for example, a rich messaging cache, configured to store an enabled status for each mobile number based on a response received to an explicit or implicit capability check command for RCS or an equivalent command for other rich messaging channels. The transmitting module 302e is configured to transmit the created rich message to the mobile number of the user on the enabled rich messaging channel(s). Upon determining that the mobile number of the user is not enabled on the rich messaging channel(s), the routing module 302c confirms whether a setting specifies transmission of the received SMS message to the mobile number of the user. The transmitting module 302e is configured to transmit the received SMS message to the mobile number of the user.

In an embodiment, the routing module 302c is configured to determine whether the mobile number is enabled for one or more of multiple rich messaging platforms 303, and the rich message creation module 302d is configured to determine the type of the rich message to be transmitted to the mobile number via the rich messaging platforms 303, and to create the appropriate rich message. In another embodiment, the routing module 302c is configured to determine whether the mobile number of the user is enabled for rich communication services (RCS); the rich message creation module 302d is configured to create the RCS message; and the transmitting module 302e is configured to transmit the created RCS message to the mobile number of the user via the enabled RCS. In an embodiment, the routing module 302c executes the RCS contacts capability check command for the mobile number to determine whether the mobile number is enabled for RCS.

In an embodiment, the routing module 302c saves the enabled status of the mobile number for one or more of the rich messaging platforms 303 in a local cache, for example, a rich messaging cache, configured for one or more rich messaging channels, and an RCS cache configured for the RCS messaging channel. In an embodiment, an entry in the RCS cache comprises one entry for every unique mobile number, with the following exemplary attributes:

(1) Key of each entry in the RCS cache: Mobile number;
(2) Mandatory attribute stored in the entry for each key in the RCS cache: RCS enabled status (Enabled/Not Enabled); and
(3) Additional (optional) attributes stored in the entry for each key in the RCS cache comprise, for example:
a) Messaging as a Platform (MaaP) identifier (ID) of the RCS MaaP serving the mobile number;
b) Last timestamp when the RCS enabled status was known based on an explicit or implicit capability check; and
c) Expiry time of the cache entry.

In an embodiment, the routing module 302c searches for an entry of the mobile number of the user in the rich messaging cache or the RCS cache before executing the RCS capability check command. If there is no entry for the mobile number in the RCS cache, or if the entry for the mobile number has expired, then the RSAPP performs an explicit capability check or an implicit capability check.

In another embodiment, the routing module 302c is configured to determine whether the mobile number of the user is enabled for WhatsApp; the rich message creation module 302d is configured to create the WhatsApp message; and the transmitting module 302e is configured to transmit the created WhatsApp message to the mobile number of the user. In an embodiment, the routing module 302c executes the WhatsApp contacts command for the mobile number to determine whether the mobile number is enabled for WhatsApp. In another embodiment, the rich message creation module 302d and the transmitting module 302e are configured to create and transmit a standard short message service message to the mobile number of the user if the routing module 302c determines that the mobile number is not enabled for any of the rich messaging channels, for example, Rich Communication Services (RCS), WhatsApp, iMessage, Viber, etc. The transmitting module 302e transmits the rich message to the mobile number of the user over the network 5004. The transmitting module 302e delivers the rich message into a default messaging application, that is, the messaging client 304a deployed on the user device 304 with a subscriber identity module (SIM) that represents the mobile number of the user. In an embodiment, the transmitting module 302e delivers the rich message into a data messaging application 304a on the user device 304 that is registered to the mobile number of the user. In an embodiment, the routing module 302c saves the enabled status of the mobile number for one or more of the rich messaging platforms 303 in a local cache, for example, a rich messaging cache, configured for one or more rich messaging channels, and a WhatsApp cache configured for the WhatsApp® messaging channel. In an embodiment, an entry in the WhatsApp cache comprises one entry for every unique mobile number, with the following exemplary attributes:

(1) Key of each entry in the WhatsApp cache: Mobile number;
(2) Mandatory attribute stored in the entry for each key in the WhatsApp cache: WhatsApp enabled status (Enabled/Not Enabled); and
(3) Additional (optional) attributes stored in the entry for each key in the WhatsApp cache, for example:
a) Messaging as a Platform (MaaP) identifier (ID) of the WhatsApp MaaP serving the mobile number;
b) Last timestamp when the WhatsApp enabled status was known based on explicit or implicit capability check; and
c) Expiry time of the cache entry.

In an embodiment, the routing module 302c searches for an entry of the mobile number of the user in the rich messaging cache or the WhatsApp cache before executing the WhatsApp capability check command. If there is no entry for the mobile number in the WhatsApp cache, or if the entry for the mobile number has expired, then the RSAPP performs an explicit capability check or an implicit capability check.

The input for the creation and the transmission of the rich message is received from one of a rich short message service (SMS) application (RSAPP) application programming interface (API) 5002, an API configured for sending short message service (SMS) messages, a protocol configured for sending the SMS messages, an application configured for sending the SMS messages, an API configured for sending rich messages, a protocol configured for sending the rich messages, and an application configured for sending the rich messages. In an embodiment, the API 5002 receives an SMS message along with the mobile number of the user and an identifier of a rich message template created by the brand or the developer 301 on behalf of the brand. The routing module 302c determines whether the mobile number of the user is enabled for one or more of rich messaging platforms 303 and other data messaging applications, for example, Rich Communication Services (RCS), WhatsApp, iMessage, Viber, etc. The rich message creation module 302d translates the SMS message to a rich message based on the rich messaging platform 303 determined by the routing module 302c and the identified rich message template. The transmitting module 302e transmits the rich message to the mobile number via one or more of the rich messaging platforms 303 and other data messaging applications. In an embodiment, the routing module 302c relies on the transmitting module 302e to implicitly determine if the mobile number of the recipient is enabled on one or more of the rich messaging platforms 303.

In an embodiment, the application programming interface (API) 5002 receives a short message service (SMS) message from a SMS application programming interface (API). The reception module 302a receives the SMS message from the API 5002 and passes the SMS message to the processing module 302b. The processing module 302b parses the received SMS message and determines whether the mobile number of the user is enabled on one or more of the rich messaging channels, and determines a type of rich message to be transmitted to the mobile number via one or more of the rich messaging channels. The rich message creation module 302d creates a rich message if the mobile number of the user is enabled on one or more of the rich messaging channels. The transmitting module 302e transmits the created rich message to the user device 304 of the user via the enabled rich messaging channel(s). The routing module 302c transmits a standard SMS message if the received SMS message is identified as not enabled for one or more of the rich messaging channels.

The messaging client 304a on the user device 304 associated with the mobile number of the user receives the transmitted rich message as exemplarily illustrated in FIGS. 8A-13. The transmitting module 302e delivers the rich message from a trusted sender identifier (ID), for example, RichSMS as exemplarily illustrated in FIG. 13, or from a sender ID built by a brand that is sending the rich message, for example, "United Airlines", "ALDI", "MMA Connect", "Newark Museum", etc., as exemplarily illustrated in FIGS. 8B-8D, FIGS. 9B-9C, FIGS. 10B-10D, FIGS. 11B-11C, and FIG. 12B. In an embodiment, a service provider verifies the brand identity included in the rich message. In an embodiment, the rich message further comprises one or more of multiple interactive buttons. The interactive buttons comprise, for example, a suggested reply button, a suggested action button, and a brand-specific action button. The user responds to the brand or sends a user response to the brand by selecting the suggested reply button. The user executes an action on the user device 304 by selecting the suggested action button or the brand-specific action button. The response module 302f receives a selection of the suggested reply button, the suggested action button, or the brand-specific action button, from the user device 304 of the user. In an embodiment, the response module 302f is configured to receive a status message comprising, for example, one or more of a delivery receipt, a delivery failure, a read receipt, etc., from the messaging client 304a on the user device 304.

The feedback module 302h is configured to send a delivery status, a read status, timeouts, and the user's selection of a suggested reply and/or a suggested action to the brand or the developer 301 on behalf of the brand. The user conveys the suggested reply by selecting or tapping on the suggested reply button displayed on a graphical user interface (GUI) 304b of the messaging client 304a to communicate a response to the brand as exemplarily illustrated in FIGS. 11B-11C. The user conveys the suggested action by selecting or tapping on the suggested action button displayed on the GUI 304b of the messaging client 304a to take an action on the device, for example, make a phone call, open a website, share a location, etc., as exemplarily illustrated in FIG. 8C, FIG. 9C, and FIG. 13. In an embodiment, the reception module 302a is configured to receive the user's selections from the messaging client 304a of the user device 304 and pass the user's selections to the feedback module 302h. The feedback module 302h is configured to process an action corresponding to the status and the selections received from the reception module 302a and/or the response module 302f. In an embodiment, the feedback module 302h is configured to provide feedback to the brand about the selections received by the reception module 302a and/or the response module 302f, by sending a callback of the user replies and/or actions to the brand 301 over the application programming interface (API) 5002. The brand 301 is free to process the feedback received from the rich short message service (SMS) application (RSAPP) 302 about the user replies and/or actions, or take some other action in response to the user replies and/or actions. The feedback module 302h also provides feedback to the brand or the developer 301 on behalf of the brand about the delivery status and the read receipt of the rich message, to allow the brand to take an appropriate action. For example, if the rich message is read, the feedback module 302h informs the brand/developer 301 that the rich message has been read. In another embodiment, the feedback module 302h is configured to provide feedback to the brand/developer 301 about the messaging platforms 303 used to send the rich message to the mobile number of the user. In another embodiment, the feedback module 302*h* is configured to provide feedback to the brand/developer 301 when the routing module 302*c* determines that the mobile number is not enabled for any of the rich messaging channels, and the brand/developer 301 has not chosen the option to have the RSAPP 302 transmit a short message service (SMS) message as a standard SMS message to the mobile number of the user, thereby allowing the brand/developer 301 to take an alternative action, for example, sending the SMS message as the standard SMS message on its own.

The routing module 302*c* is configured to determine rich data messaging capabilities of multiple messaging platforms 303, and the rich message creation module 302*d* maps a request from the brand/developer 301 to messaging platform-specific capabilities to create the rich message and instruct the transmitting module 302*e* to transmit the created rich message to the user device 304. The rich message creation module 302*d* is configured to translate the request for a rich message into a rich message that can be delivered to the messaging platform(s) 303 determined by the routing module 302*c*, using information in a rich message template defined by the brand or the developer 301 on behalf of the brand. The response module 302*f* is configured to monitor the delivery of the rich message to the mobile number of the user, and user replies/actions in response to the rich message. The re-routing module 302*g* is configured to potentially deliver the rich message to the user via one or more additional messaging platforms when there is a delivery failure or a delay in delivery of the rich message to the mobile number of the user via a first messaging platform. The additional messaging platforms comprise, for example, alternative data messaging platforms and short message service platforms. In an embodiment, the re-routing module 302*g* is configured to transmit the rich message via multiple rich messaging channels to increase the overall chances of successful delivery of the rich message. In an example, the re-routing module 302*g* delivers the rich message to the mobile number of the user via the WhatsApp® messaging channel if the rich message is not delivered over the rich communication services (RCS) channel within a predetermined time interval.

In an embodiment, the re-routing module 302*g* delivers the rich message to the mobile number of the user as a standard short messaging service (SMS) message if the rich message cannot be delivered over any rich messaging platforms or rich messaging channels within a predetermined time interval. In another embodiment, the re-routing module 302*g* is configured to revoke the rich message from a first messaging platform before attempting to deliver the rich message over a second messaging platform. Revoking the rich message from the first messaging platform is helpful to avoid duplicate rich messages being received by the user, and in an embodiment, helps avoid additional charges for delivery over multiple messaging platforms. The second messaging platform is another data messaging platform or an SMS platform. In an embodiment, the re-routing module 302*g* uses the rich message creation module 302*d* and the transmitting module 302*e* to create and deliver the rich message to the user via the second messaging platform. In an embodiment, the re-routing module 302*g* is configured to monitor the delivery of the rich message to the mobile number of the user via the second messaging platform. The re-routing module 302*g* is further configured to deliver the rich message to the mobile number of the user via one or more of a third messaging platform and a fourth messaging platform if there is a delivery failure or a delay in the delivery of the rich message to the mobile number of the user via the second messaging platform. The rich message creation module 302*d* is configured to translate the SMS message to the rich message to be transmitted to the mobile number based on the selected second messaging platform, the third messaging platform, and the fourth messaging platform, and the rich message template defined by the brand or the developer 301 on behalf of the brand. In another embodiment, the re-routing module 302*g* is configured to revoke the rich message from other multiple rich messaging channels as soon as the rich message is delivered via one or more of multiple rich messaging channels.

The billing module 302*i* is configured to charge the brand/developer 301 a fee for creating and transmitting the rich message to the user device 304. Data messaging platforms, for example, Rich Communication Services (RCS), WhatsApp®, iMessage®, Viber®, etc., may charge a fee for application-to-person (A2P) messages, that could be at a premium or a fee lower than the fee for a short messaging service (SMS) message. Therefore, when the rich SMS application (RSAPP) 302 transmits the rich message to the mobile number of the user, the rich message would typically be charged an A2P message fee applicable to the data messaging platform used to send the rich message. Furthermore, some data messaging platforms may charge a per session fee in lieu of a per message fee when the user responds to the rich message. However, there may be a need to charge the rich message at a price different from the per A2P message fee or the per session fee charged for sending other A2P messages or for other sessions on the data messaging platforms. The processing module 302*b* keeps track of the number of rich messages sent and the suggested replies or suggested actions received, in the database 302*j*, and enables the billing module 302*i* to charge the rich message in a way that is different from standard A2P and session pricing, which helps in the implementation of flexible pricing for the rich messages sent by brands.

The processor 5001 of the system 5000 disclosed herein retrieves instructions defined by the reception module 302*a*, the processing module 302*b*, the routing module 302*c*, the rich message creation module 302*d*, the transmitting module 302*e*, the response module 302*f*, the re-routing module 302*g*, the feedback module 302*h*, the billing module 302*i*, from the memory unit 5003 for executing the respective functions disclosed above. The modules 302*a*, 302*b*, 302*c*, 302*d*, 302*e*, 302*f*, 302*g*, 302*h*, 302*i*, and 302*j* of the rich short message service (SMS) application (RSAPP) 302 are disclosed above as software executed by the processor 5001. In an embodiment, the modules 302*a*, 302*b*, 302*c*, 302*d*, 302*e*, 302*f*, 302*g*, 302*h*, 302*i*, and 302*j* of the RSAPP 302 are implemented completely in hardware. In another embodiment, the modules 302*a*, 302*b*, 302*c*, 302*d*, 302*e*, 302*f*, 302*g*, 302*h*, 302*i*, and 302*j* of the RSAPP 302 are implemented by logic circuits to carry out their respective functions disclosed above. In another embodiment, the system 5000 is also implemented as a combination of hardware and software including the application programming interface (API) 5002 and one or more processors, for example, 5001, that are used to implement the modules, for example, 302*a*, 302*b*, 302*c*, 302*d*, 302*e*, 302*f*, 302*g*, 302*h*, 302*i*, and 302*j* of the RSAPP 302.

For purposes of illustration, the disclosure herein refers to the modules 302*a*, 302*b*, 302*c*, 302*d*, 302*e*, 302*f*, 302*g*, 302*h*, 302*i*, and 302*j* of the RSAPP 302 being run locally on a single computer system 5000; however the scope of the RSAPP 302 and the method disclosed herein is not limited to the modules 302*a*, 302*b*, 302*c*, 302*d*, 302*e*, 302*f*, 302*g*, 302*h*, 302*i*, and 302*j* being run locally on a single computer system 5000 via an operating system and the processor(s) 5001, but extends to running the modules 302a, 302b, 302c, 302d, 302e, 302f, 302g, 302h, 302i, and 302j remotely over the network 5004 by employing a web browser and a remote server, a mobile phone, or other electronic devices. In an embodiment, one or more portions of the system 5000 disclosed herein are distributed across one or more computer systems (not shown) coupled to the network 5004.

The non-transitory, computer-readable storage medium, herein exemplarily referred to as the memory unit 5003, stores computer program codes comprising computer program instructions executable by at least one processor 5001 for creating and transmitting a rich message. The computer program codes comprise a first computer program code for receiving a request to send a short message service (SMS) message from a brand to a mobile number of a user and a second computer program code for processing the request to send the SMS message. The second computer program code comprises a third computer program code for determining whether the mobile number of the user is enabled on one or more of multiple rich messaging channels for the mobile number of the user. The third computer program code comprises a fourth computer program code for creating a rich message comprising a message and a brand identity with an optional verification mark; and a fifth computer program code for transmitting the created rich message to the mobile number of the user on the enabled rich messaging channel(s), where the fourth computer program code and the fifth computer program code are executed upon determining that the mobile number of the user is enabled on one or more of the rich messaging channels. The third computer program code further comprises a sixth computer program code for confirming whether a setting specifies transmission of the received SMS message to the mobile number of the user as a SMS message if the user is not enabled on one or more of the rich messaging channels; and an seventh computer program code for transmitting the received SMS message as a SMS message to the mobile number of the user, where the sixth computer program code and the seventh computer code are executed upon determining that the mobile number of the user is not enabled on one or more of the rich messaging channels.

The computer program codes further comprise an eighth computer program code for determining rich data messaging capabilities of multiple messaging platforms 303 and for mapping a request from the developer to messaging platform-specific capabilities; a ninth computer program code for transmitting the rich message to the user device 304; a tenth computer program code for monitoring the delivery of the rich message to the mobile number of the user; an eleventh computer program code for delivering the rich message to the mobile number of the user via one or more additional messaging platforms in case of a failure of the delivery or a delay in the delivery of the rich message to the mobile number of the user via a first messaging platform. The computer program codes further comprise a twelfth computer program code for concurrently sending the rich message over multiple rich messaging channels to increase chances of delivery of the rich message; and a thirteenth computer program code for revoking the rich message from other multiple rich messaging channels that are enabled as soon as the rich message is delivered via one of the rich messaging channels.

The computer program instructions of the computer program codes disclosed above implement the processes of various embodiments disclosed above and perform additional steps that may be required and contemplated for creating and transmitting a rich message. When the computer program instructions are executed by the processor(s) 5001, the computer program instructions cause the processor(s) 5001 to perform the steps of the method for creating and transmitting a rich message as disclosed in the descriptions of FIGS. 1-4 and FIGS. 6A-6E. In an embodiment, a single piece of computer program code comprising computer program instructions performs one or more steps of the method disclosed in the descriptions of FIGS. 1-4 and FIGS. 6A-6E. The processor(s) 5001 retrieves these computer program instructions and executes them.

A module, or an engine, or a unit, as used herein, refers to any combination of hardware, software, and/or firmware. As an example, a module, or an engine, or a unit includes hardware such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C, C++, C#, Java®, JavaScript®, Fortran, Ruby, Perl®, Python®, Visual Basic®, hypertext preprocessor (PHP), Microsoft® .NET, Objective-C®, the Swift™ programming language of Apple Inc., etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

FIGS. 6A-6E illustrates a flowchart for creating and transmitting a rich message. The rich short message service (SMS) application (RSAPP) receives 601 an SMS message from a brand or a developer on behalf of the brand, for transmission to a mobile number of a recipient, herein referred to as the "user". The RSAPP processes 602 the received SMS message to extract a sender identifier (ID) and an account of the sender. The RSAPP checks 603 whether the sender ID is configured for rich messages in the rich SMS template 1402, as illustrated in FIG. 14B. If the sender ID is configured for rich messages, the RSAPP fetches 604 a list of rich messaging channels from the rich SMS template 1402. If the sender ID is not configured for rich messages, the RSAPP checks 605 whether the sender account is configured to send an SMS message. If the sender account is configured to send the SMS message, the RSAPP sends 606 the SMS message. If the sender account is not configured to send the SMS message, the RSAPP sends 607 a response indicating the SMS message cannot be sent, to the brand. After fetching the list of rich messaging channels in step 604, the RSAPP determines 608 whether to explicitly check if the mobile number of the user is enabled on each rich messaging channel in the list. The RSAPP proceeds to step 618 if the mobile number is not enabled on any of the rich messaging channel in the list. The RSAPP performs the following steps for each rich messaging channel in the list. The RSAPP checks 609 whether there is a cache for the rich messaging channel. If there is a cache for the rich messaging channel, the RSAPP searches 610 for the mobile number of the user in the cache to determine whether the mobile number is enabled on the rich messaging channel. After step 610, if the mobile number is not enabled on the rich messaging channel the RSAPP proceeds to step 613. If there is no entry of the mobile number in the cache, the RSAPP executes 611 a command to check whether the mobile number is enabled for the rich messaging channel. At step 609, if there is no cache for the rich messaging channel, the RSAPP executes 611 the command to check whether the mobile number is enabled for the rich messaging channel. At step 609, if the mobile number of the user is not found in the cache configured for the rich messaging channel, the RSAPP checks 613 whether there is another rich messaging channel listed in the rich SMS template 1402. If there is another rich messaging channel listed in the rich SMS template 1402, the RSAPP moves 614 to the next rich messaging channel and repeats the step 609. At step 613, if there is no another rich messaging channel, the RSAPP executes a command to check 615 whether the sender ID is configured for fallback routing as SMS. If so, the RSAPP sends 617 a SMS to the mobile number of the user. If not, the RSAPP sends a response 616, to the brand, indicating that message cannot be sent.

After step 611, the RSAPP checks 612 whether the mobile number is enabled on the rich messaging channel. If the mobile number is enabled on the rich messaging channel, the RSAPP determines 618 the sender identifier (ID) to be used for sending the rich message from the rich message template 1402. If the mobile number is enabled on the rich messaging channel, the RSAPP proceeds to step 613. The RSAPP checks 619 whether the sender ID is brand's sender ID or rich SMS sender ID. After step 619, if the sender ID is sich SMS sender ID the RSAPP creates 620 a rich message by: a) obtaining 620*a* brand name, brand logo (from image file), and rich card images (if any) from the rich SMS template 1402. select rich card image from "Additional Enhancements" section. If a rich card image is not available, obtain brand logo; b) creating 620*c* rich card with brand's logo (or rich card image) as the rich media, brand name as title, and the SMS text as the description; and c) fetching 620*d* a list of suggested actions and suggested replies from the rich SMS template and add them to the rich card. If SenderId is Brand's ID, then RSAPP does no use Brand's Logo and will only use the rich card from the "Additional Enhancement" section. After step 619, if the sender ID brand's sender ID the RSAPP creates 620 a rich message by: a) obtaining 620*b* rich card images from the rich SMS template 1402. select rich card image from "Additional Enhancements" section. If a rich card image is not available, obtain brand logo; b) creating 620*c* rich card with brand's logo (or rich card image) as the rich media, brand name as title, and the SMS text as the description; and c) fetching 620*d* a list of suggested actions and suggested replies from the rich SMS template and add them to the rich card. If SenderId is Brand's ID, then RSAPP does no use Brand's Logo and will only use the rich card from the "Additional Enhancement" section.

In an embodiments, upon determining at step 619 to send the rich message from the brand's sender ID, the RSAPP creates a rich message comprising the following elements: (1) Text from the received SMS message; (2) Optional rich media, for example, an image, a video, etc., a rich card, or a carousel, based on the "Additional Enhancements"/"Images for Rich Cards" section in the rich SMS template 1402; (3) Optional rich media based on content of the received SMS; and (4) Optional suggested actions and suggested replies based on the content and/or the rich SMS template 1402. The RSAPP then transmits 623 the created rich message from the brand's sender ID to the mobile number of the user. Upon determining at step 619 to send the rich message from the Rich SMS sender ID, the RSAPP creates a rich message comprising the following elements: (1) Text from the received SMS message; (2) brand name and brand logo in the rich message template; (3) Optional rich media, for example, an image, a video, etc., a rich card, or a carousel, based on the "Additional Enhancements"/"Images for Rich Cards" section in the rich message template; (4) Optional rich media based on content of the received SMS; and (5) Optional suggested actions and suggested replies based on the content and/or the rich message template. The RSAPP then transmits 623 the created rich message from the Rich SMS sender ID to the mobile number of the user.

After step 620, the RSAPP parses 621 the text of the received SMS to find elements that can be included to add rich media and/or suggested actions. The RSAPP edits 622 the created rich message in step 620 to to add the rich elements and if needed edit the text of the created rich message. The RSAPP transmits 623 the created rich message to the mobile number of the user. After step 623, the RSAPP checks 624 status of transmission of the created rich message. If the mobile number of the user is not enabled on one or more of the rich messaging channels, the status response indicates that the mobile number of the user is not enabled on the rich messaging channel(s) and the RSAPP proceeds to step 613.

Figure 7:
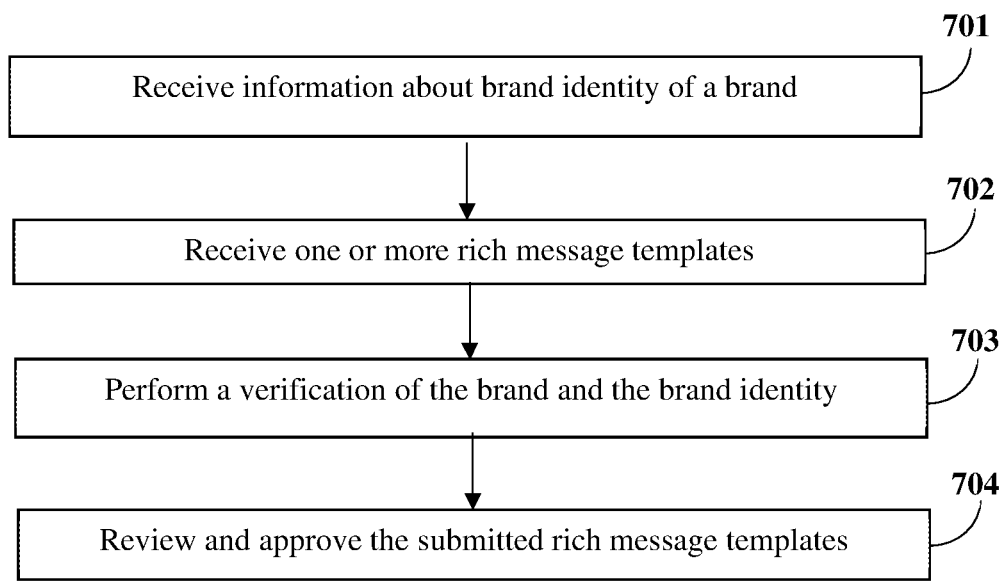
FIG. 7 exemplarily illustrates a flowchart of an embodiment of a method for registering a brand or a developer on behalf of the brand with a rich short message service (SMS) application provider for a rich SMS.

FIG. 7 exemplarily illustrates a flowchart of an embodiment of a method for registering a brand or a developer on behalf of the brand with a rich short message service (SMS) application (RSAPP) provider for a rich SMS. The RSAPP provider is an entity that manages an instance of the RSAPP and offers the RSAPP as a service to brands and developers. In an embodiment, there are one or more RSAPP providers that offer the rich SMS to brand enterprises or developers. A brand enterprise or a developer on behalf of the brand registers for the rich SMS with the RSAPP provider. As part of the registration, the RSAPP provider receives 701 information about the brand identity of the brand submitted by the brand enterprise or the developer. The brand identity comprises, for example, one or more of a brand name, a brand icon, a brand logo. The brand may also submit a privacy policy and terms of use to the RSAPP provider. The brand enterprise, the brand, or the developer specifies to the RSAPP provider one or more rich message templates to be used for sending rich messages.

The rich short message service (SMS) application (RSAPP) receives 702 the rich message template(s) submitted by the brand enterprise, the brand, or the developer. The rich message template comprises configuration details, for example, one or more of a sender identifier (Sender ID) and/or a sender mask (SenderMask) used by the brand to send SMS messages to users that need to be considered for rich messaging, a list of rich messaging channels to consider to send the rich messages, the Sender ID for each of the rich messaging channels, a configuration parameter indicating the following exemplary conditions of delivery of rich messages over a rich messaging channel: (a) delivery of all SMS messages received by the RSAPP from the specified Sender ID and/or SenderMask; (b) delivery of only a subset of messages that match a pattern/regular expression as specified in the rich messaging template; (c) delivery to only a subset of users in one or more countries or one or more carriers; and (d) delivery of only a subset of messages sent during a predefined date range, or on predefined days of the week, or during predefined hours of the day.

In an embodiment, the rich message template varies for different data messaging applications, for example, Rich Communication Services (RCS), WhatsApp®, iMessage®, Viber®, etc., based on the capabilities of the underlying platforms. In another embodiment, the rich message template varies for different use cases for sending the rich messages over the same platform, for example, confirming a banking transaction, logging into a bank account on the web, and logging into a mobile application (app) of a bank. The rich short message service (SMS) application (RSAPP) performs 703 a verification of the brand and the brand identity. In an embodiment, verification of the brand and the brand identity includes the following: 1. Verifying that the information provided in the Organization Details (exemplarity illustrated in FIG. 14A) such as Name of the brand, their website, Privacy Policy are valid and belong to the brand that is sending the messages; 2. Verifying that the brand logo specified in the Rich Message Template (exemplarily illustrated in FIG. 14B) is owned by the Brand; and 3. Meet any other channel specific checks required for brand verification, for example, having verified Facebook Business Manager Account for WhatsApp channel. The method for verifying the brand and the brand identity has been provided merely for explanation and are in no way to be construed as limiting of the embodiment disclosed herein.

The RSAPP reviews and approves 704 the submitted rich message templates. As part of the review, in an embodiment, the RSAPP provider ensures that the rich message and the fallback SMS message, if any, are one of notifications, promotional messages, transaction messages, and other notifications from the brand. The brand or the developer can specify one of the approved rich message templates to be used, at the time of sending the rich messages. The RSAPP sends the rich messages using the specified and approved rich message template to the mobile number or the user device of the user. In an embodiment, the brand or the developer optionally adds two or more interactive buttons to the specified rich message template. A selection of the interactive buttons results in a callback to the brand. In another embodiment, the rich message template is simplified to be a mapping of the Sender ID or SenderMask for the SMS and the Sender ID of one or more rich messaging channels.

Figure 8A:
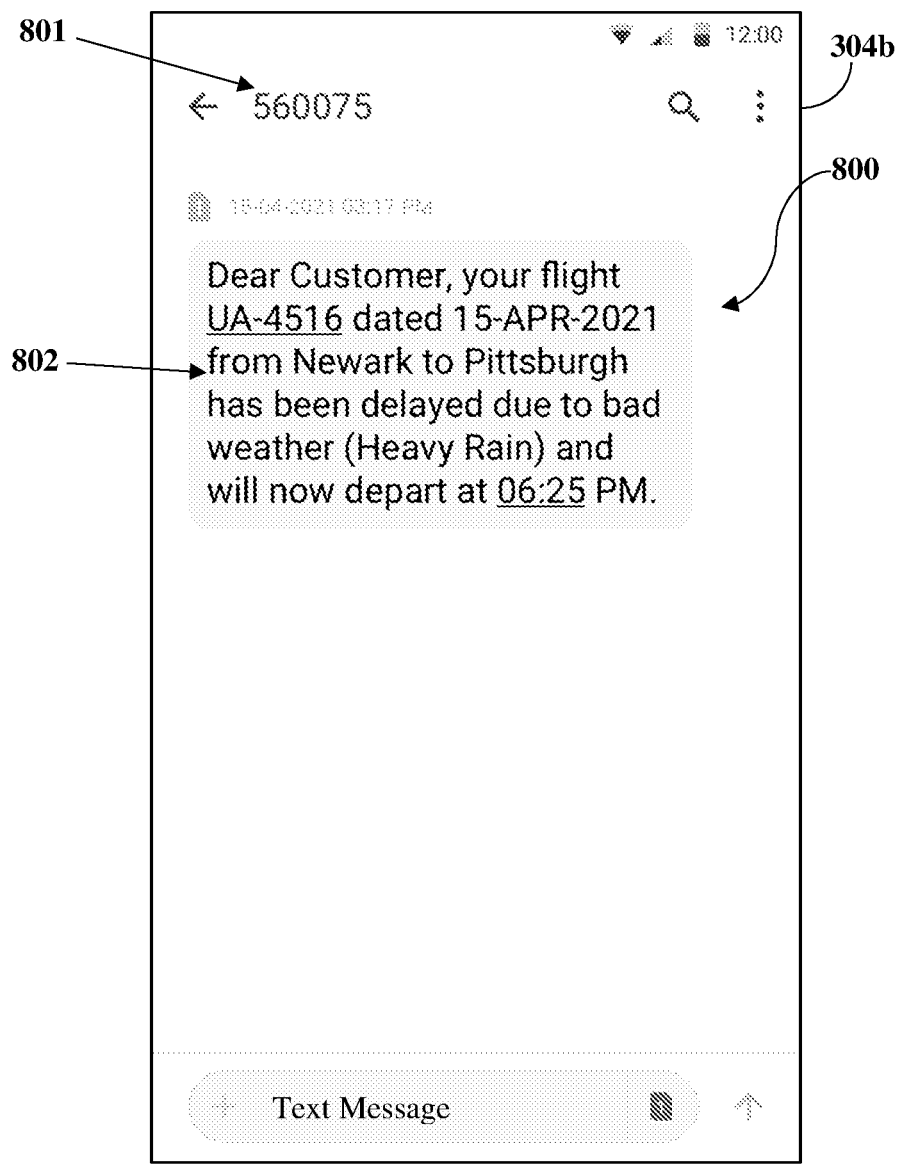
FIG. 8A exemplarily illustrates a screenshot of a graphical user interface rendered by a messaging client on a user device, displaying a short message service message received from a short number to a mobile number of a user.

FIG. 8A exemplarily illustrates a screenshot of a graphical user interface (GUI) 304b rendered by a messaging client on a user device, displaying a short message service (SMS) message 800 received from a short number 801 to a mobile number of a user. Consider an example where a brand, for example, United Airlines, sends an SMS message 800 comprising a text description 802 regarding flight details, for example, flight number, date, time, boarding point, destination, etc., of a flight of a user, to the rich SMS application (RSAPP) for creating and transmitting a rich message to a mobile number of a user. The RSAPP receives a request to send the SMS message 800 from the brand to the mobile number of the user. The RSAPP processes the received SMS message 800, determines whether the mobile number is enabled for rich communication services (RCS), and creates a rich message to be transmitted to the mobile number via RCS. The RSAPP transmits the created rich message to the mobile number of the user via one or more of the enabled rich communication services (RCS) channels. In an embodiment, the RSAPP transmits a basic rich message to the mobile number of the user, with the SMS text description 802 from the brand's Sender ID 803, for example, United Airlines, along with a brand icon 804 and a verification mark 805. The GUI 304b rendered by the messaging client on the user device displays the basic rich message to the user as exemplarily illustrated in FIG. 8B. The brand icon 804 is shown along with each basic rich message transmitted to the mobile number of the user. The verification mark 805, for example, a checkmark, disposed next to one or more of the brand sender ID 803, the brand name, the brand icon, and the brand logo, indicates that the brand is verified and can be trusted by the recipient of the rich message. The transmitted rich message shows the description of one of the Sender ID 803 or the brand 804 as exemplarily illustrated in FIG. 8B.

Figure 8C:
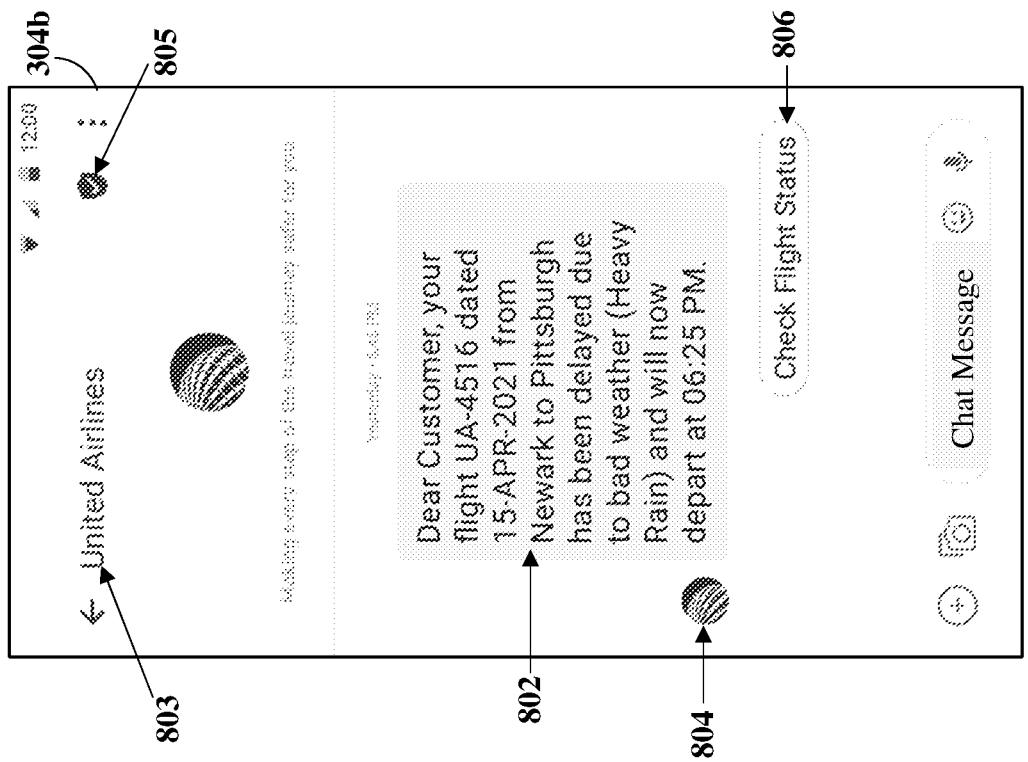
FIG. 8C exemplarily illustrates a screenshot of the graphical user interface rendered by the messaging client on the user device, displaying an embodiment of the rich message received by the user via the rich messaging channel from the verified sender ID of the brand.
Figure 8B:
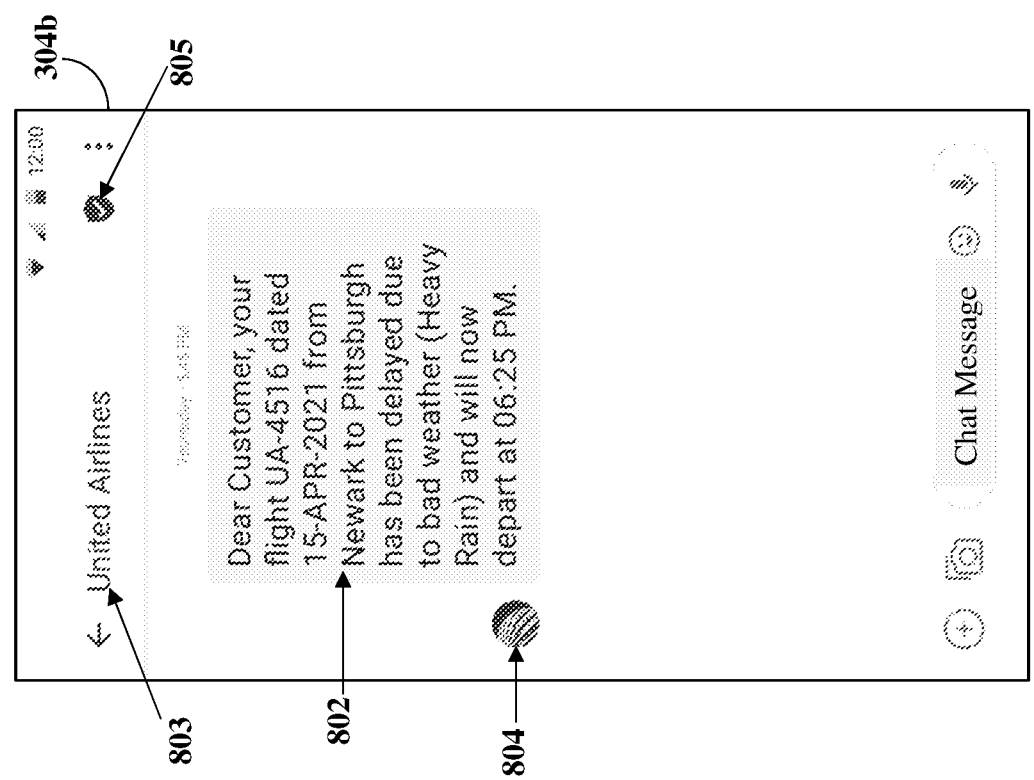
FIG. 8B exemplarily illustrates a screenshot of the graphical user interface rendered by the messaging client on the user device, displaying a rich message received by the user via a rich messaging channel from a verified sender identifier (ID) of a brand.
Figure 8D:
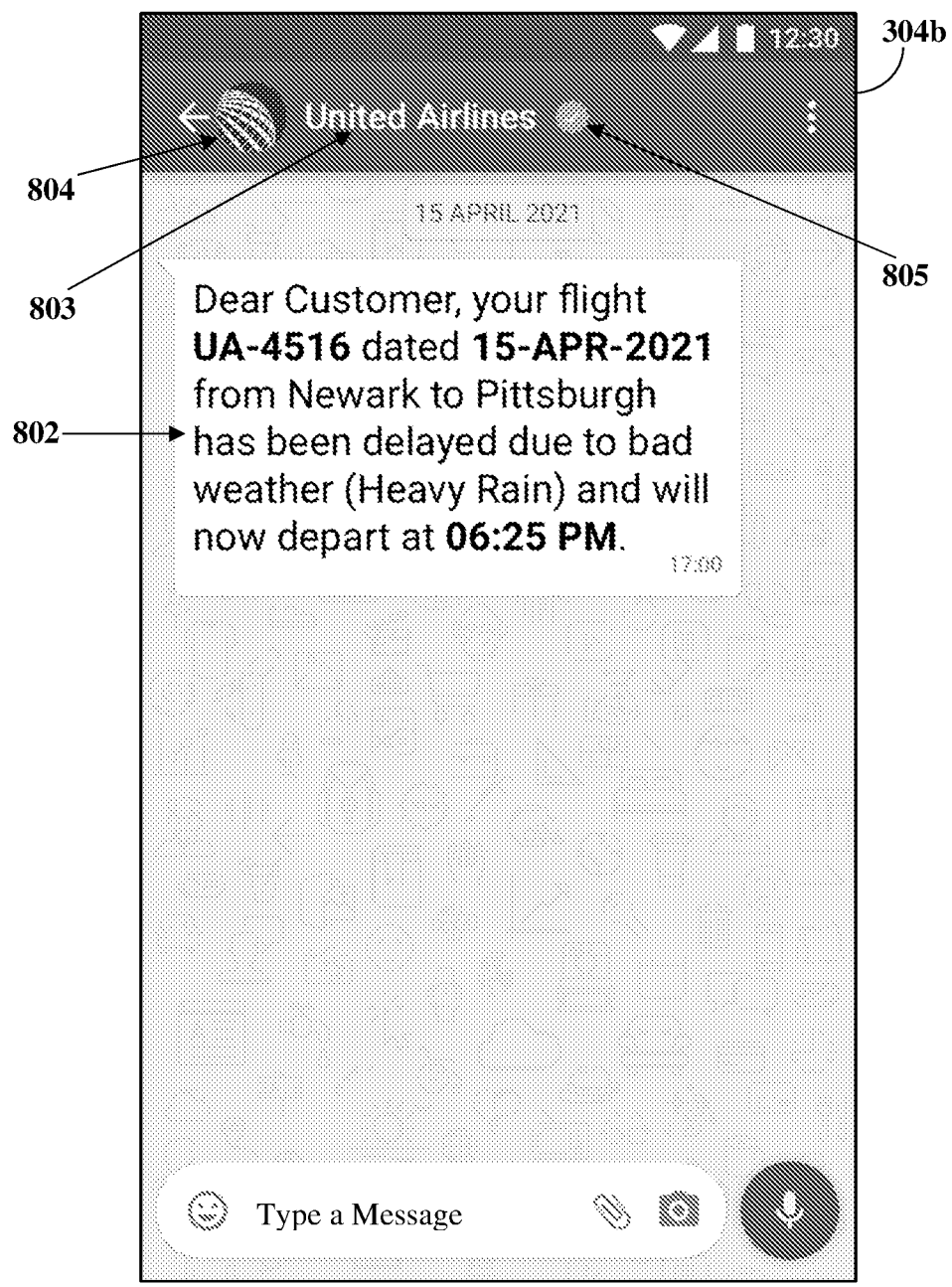
FIG. 8D exemplarily illustrates a screenshot of the graphical user interface rendered by the messaging client on the user device, displaying an embodiment of the rich message transmitted to the mobile number of the user via another messaging channel from the verified sender ID of the brand.

In another embodiment, the rich SMS application (RSAPP) transmits a rich message comprising a suggested action button "Check Flight Status" 806 to the mobile number of the user as exemplarily illustrated in FIG. 8C. Clicking the suggested action button "Check Flight Status" 806 opens a website with a flight status of the flight, for example, "UA-4516", extracted from the text description 802 of the received SMS message 800. In another embodiment, the RSAPP implements "Check Flight Status" as a suggested reply where a reply is sent back to the brand or a developer on behalf of the brand. The brand or the developer responds back to the user with the details of the flight status in another message. In another embodiment, the RSAPP transmits a rich message as a basic rich message to the user with the SMS text description 802 from the brand's Sender ID 803 along with the brand icon 804 and the verification mark 805 via the WhatsApp® messaging application as exemplarily illustrated in FIG. 8D.

Figure 9A:
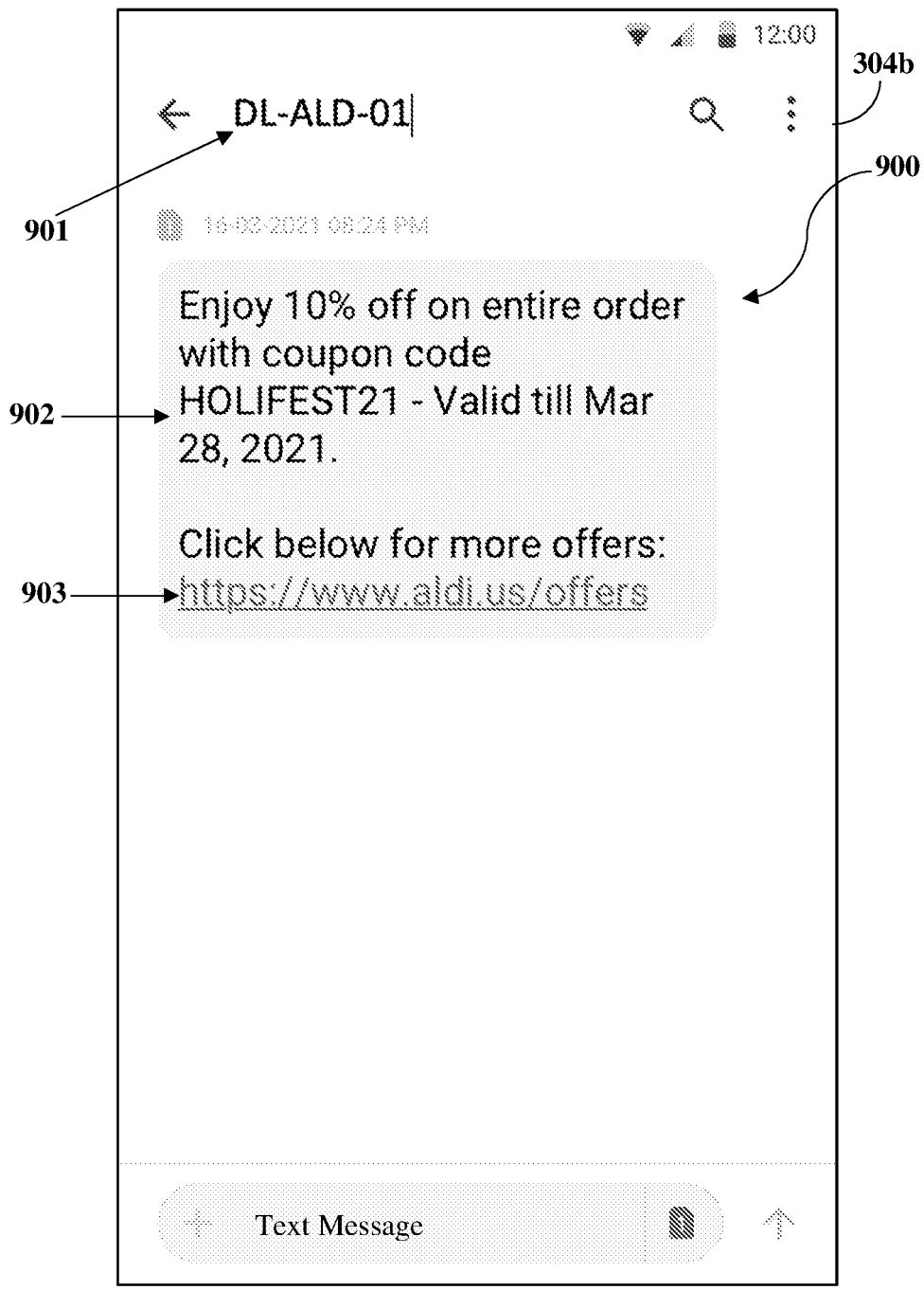
FIG. 9A exemplarily illustrates a screenshot of a graphical user interface rendered by a messaging client on a user device, displaying an embodiment of a short message service message received from a sender mask to a mobile number of a user.
Figure 9C:
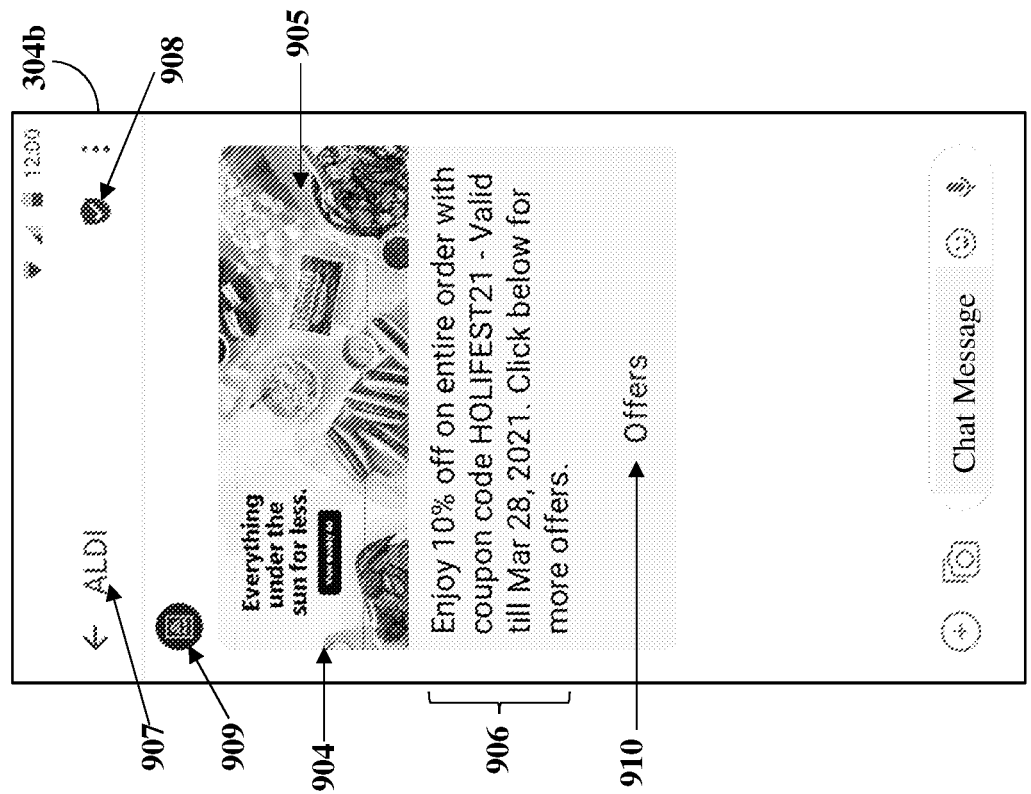
FIG. 9C exemplarily illustrates a screenshot of the graphical user interface rendered by the messaging client on the user device, displaying another embodiment of the rich message received by the user via the rich messaging channel from the verified sender ID of the brand.
Figure 9B:
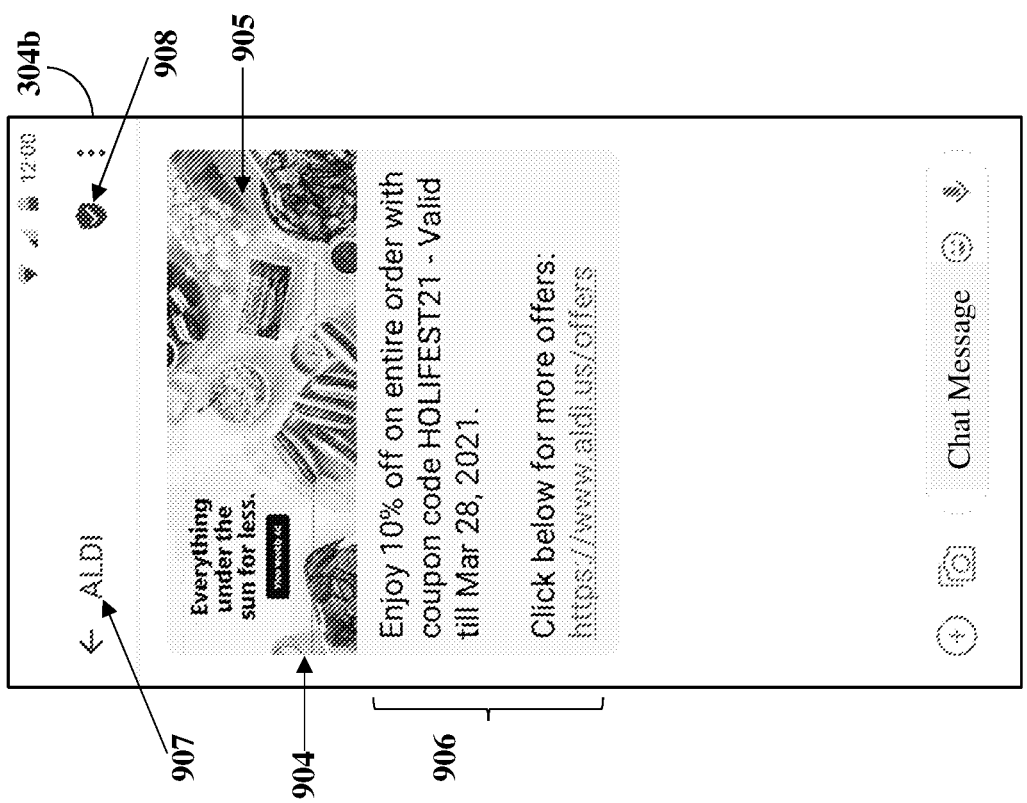
FIG. 9B exemplarily illustrates a screenshot of the graphical user interface rendered by the messaging client on the user device, displaying an embodiment of a rich message received by the user via a rich messaging channel from a verified sender ID of a brand.

FIG. 9A exemplarily illustrates a screenshot of a graphical user interface (GUI) 304b rendered by a messaging client on a user device, displaying an embodiment of a short message service (SMS) message 900 received from a sender mask 901, for example, "DL-ALD-01", to a mobile number of a user. Consider an example where a brand, for example, ALDI, sends an SMS message 900 comprising a text description 902 regarding an offer and a uniform resource locator (URL) link 903 to the brands offers page, to the rich SMS application (RSAPP) for creating and transmitting a rich message to a mobile number of a user. The RSAPP receives a request to send the SMS message 900 from the brand to the mobile number of the user. The RSAPP processes the received SMS message 900, determines whether the mobile number is enabled for rich communication services (RCS), and creates a rich message to be transmitted to the mobile number via RCS if the mobile number is enabled for RCS. The RSAPP transmits the created rich message to the mobile number of the user via a rich communication services (RCS) channel from a sender ID, for example, "ALDI", specified by the brand in a rich message template 1402, for example, a rich SMS template, exemplarily illustrated in FIG. 14B. In an embodiment, the RSAPP converts the text description 902 of the SMS message 900, herein referred to as "SMS text", into a rich card 904 with an image 905 representing the brand and with the SMS text 902 sent as text 906 accompanying the rich card 904 along with the URL link as exemplarily illustrated in FIG. 9B. As exemplarily illustrated in FIG. 9B, the text 906 comprises the entire SMS message 900 shown in FIG. 9A. The RSAPP determines the image 905 for the rich card 904 based on the criteria and location specified by the brand in the rich message template 1402 exemplarily illustrated in FIG. 14B. For example, an image selected from the uniform resource locator (URL) link "www.aldi.us/images/weekly-ad.jpg" is used for 60% of the messages in a round robin arrangement as specified by the brand in the rich message template 1402 exemplarily illustrated in FIG. 14B. Use of "Image for Rich Card" collected in the rich message template 1402 is exemplarily illustrated in FIGS. 9B-9C, FIGS. 11B-11C, and FIG. 12B. The RSAPP transmits the rich message to the mobile number of the user from the brand Sender ID 907 along with a verification mark 908. The RSAPP selects the image 905 representing the brand from a pool of images configured in the rich message template 1402. In another embodiment, the the RSAPP sends the SMS text 902 along with an image representing the brand, and the image is not derived from the SMS message 900, as exemplarily illustrated in FIGS. 8B-8C, and FIG. 13. The image representing the brand is provided by the brand or the developer of the brand in the 'brand logo' section of the rich message template 1402 as exemplarily illustrated in FIG. 14B. In another embodiment, the RSAPP send the SMS text 902 along with an image representing the brand, and the image is derived from the SMS message 900, as exemplarily illustrated in FIGS. 10B-9D. In FIGS. 10B-10D, image of a boarding pass is derived from the URL link in FIG. 10A.

In another embodiment, in the creation of the rich message, the rich short message service (SMS) application (RSAPP) converts the text description 902 of the SMS message 900 into a rich card 904 with an image 905 representing the brand and with the text description 902 of the SMS message 900 sent as the text 906 accompanying the rich card 904. Furthermore, the RSAPP converts the uniform resource locator (URL) link from the text description 902 in the SMS message 900 into a suggested action button "Offers" 910 in the rich message as exemplarily illustrated in FIG. 9C. The RSAPP transmits the rich message to the user from the brand Sender ID 907, for example, ALDI, along with a brand icon 909 and a verification mark 908 as exemplarily illustrated in FIG. 9C.

Figure 10A:
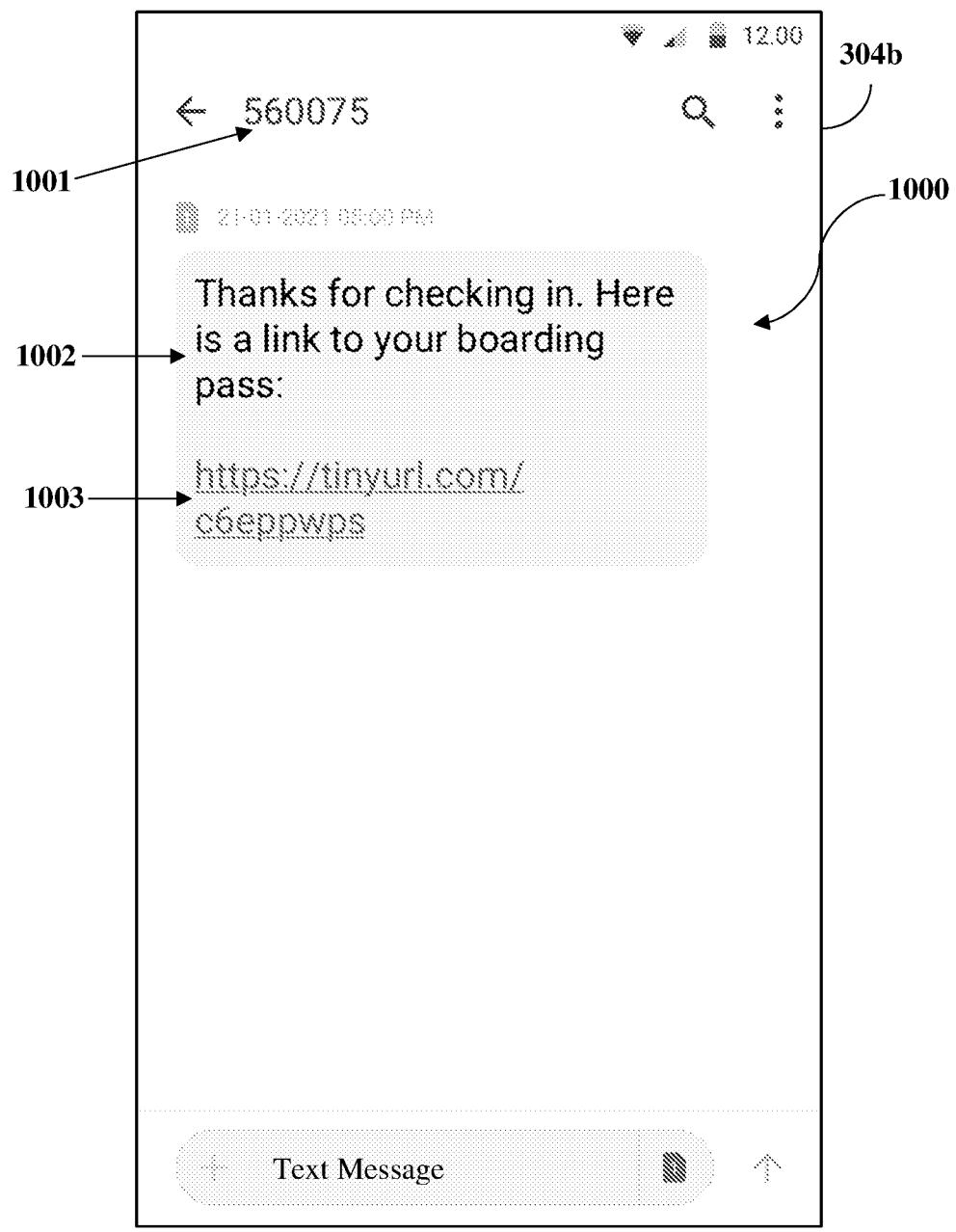
FIG. 10A exemplarily illustrates a screenshot of a graphical user interface rendered by a messaging client on a user device, displaying another embodiment of a short message service message received from a short number to a mobile number of a user.
Figure 10C:
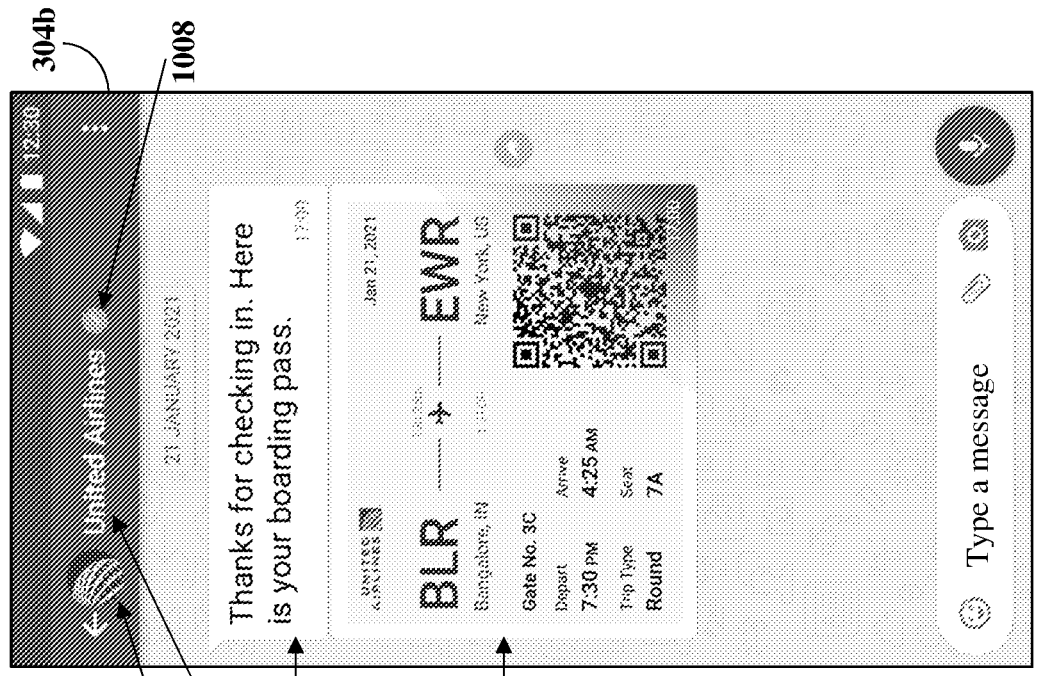
FIG. 10C exemplarily illustrates a screenshot of the graphical user interface rendered by the messaging client on the user device, displaying another embodiment of the rich message transmitted to the mobile number of the user via another messaging channel from the verified sender ID of the brand.
Figure 10B:
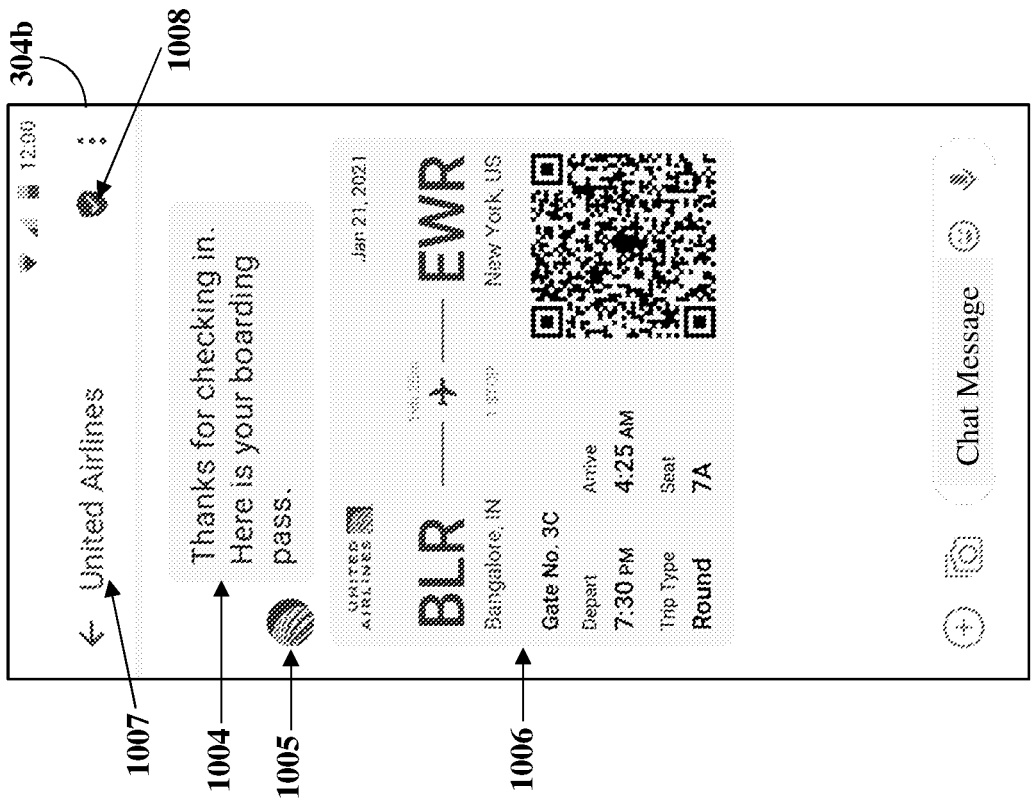
FIG. 10B exemplarily illustrates a screenshot of the graphical user interface rendered by the messaging client on the user device, displaying another embodiment of a rich message received by the user via a rich messaging channel from a verified sender ID of a brand.
Figure 10D:
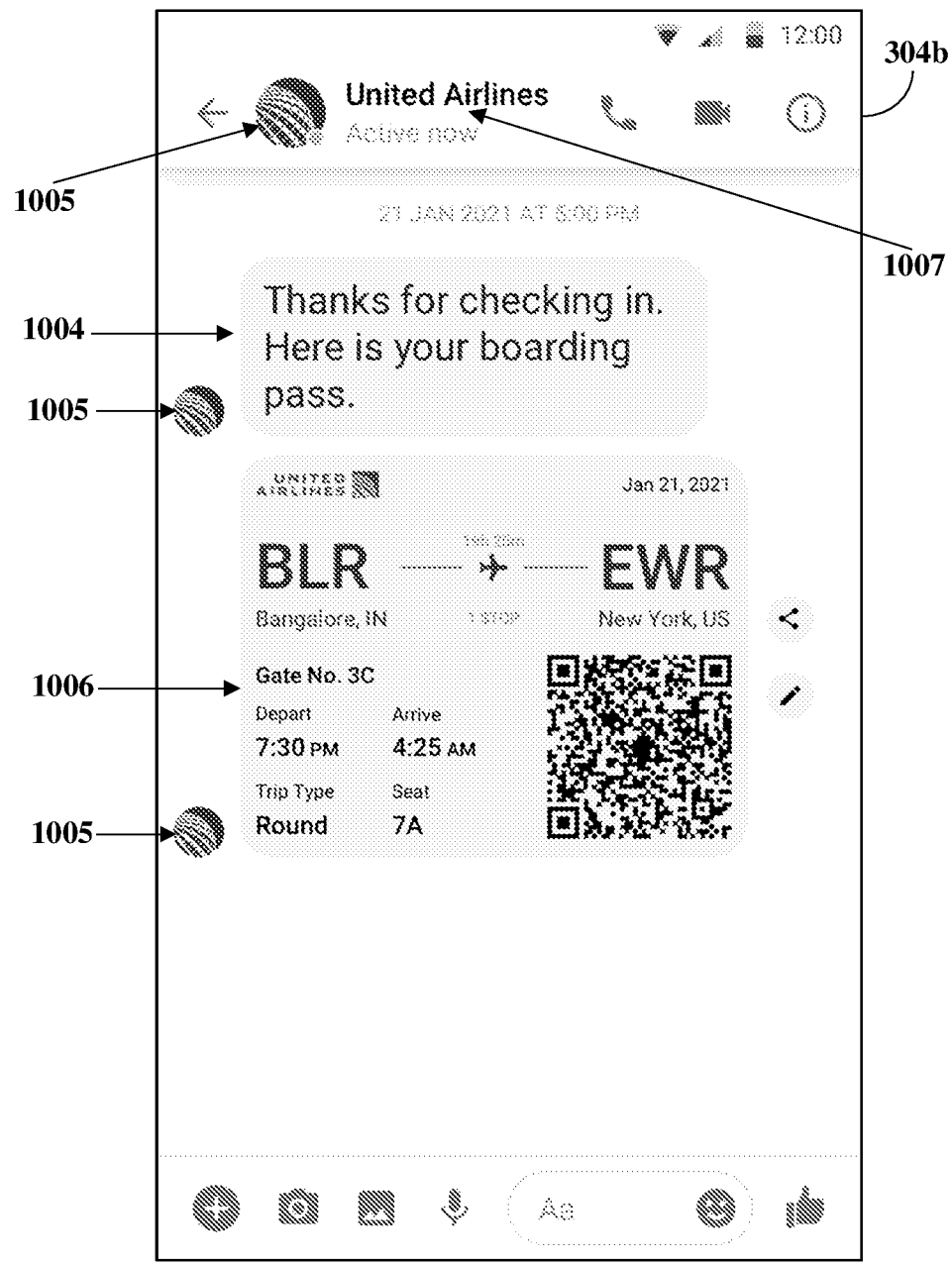
FIG. 10D exemplarily illustrates a screenshot of the graphical user interface rendered by the messaging client on the user device, displaying another embodiment of the rich message transmitted to a user profile linked to the mobile number of the user via another messaging channel from a sender ID of the brand.

FIG. 10A exemplarily illustrates a screenshot of a graphical user interface (GUI) 304b rendered by a messaging client on a user device, displaying another embodiment of a short message service (SMS) message 1000 received from a short number 1001 to a mobile number of a user. Consider an example where a brand, for example, United Airlines, sends an SMS message 1000 comprising a text description 1002 regarding checking into a flight and a uniform resource locator (URL) link 1003 to a boarding pass, to the rich SMS application (RSAPP) for creating and transmitting a rich message to a mobile number of a user. The RSAPP receives a request to send the SMS message 1000 from the brand to the mobile number of the user. The RSAPP processes the received SMS message 1000, determines whether the mobile number is enabled for rich communication services (RCS), and creates a rich message to be transmitted via RCS if the mobile number is enabled for RCS. The RSAPP transmits the created rich message to the mobile number of the user via one or more enabled rich communication services (RCS) channels. In an embodiment, the RSAPP transmits the text description 1002 of the SMS message 1000 as an SMS message 1004 along with a brand icon 1005, and replaces the URL link 1003 in the text description 1002 of the SMS message 1000 with an image 1006 of the boarding pass as exemplarily illustrated in FIG. 10B. The RSAPP transmits the rich message comprising the SMS message 1004 with the brand icon 1005 and the image 1006 to the mobile number of the user from the brand Sender ID 1007, for example, United Airlines, along with a verification mark 1008.

In another embodiment, the rich short message service (SMS) application (RSAPP) transmits the created rich message to the mobile number of the user via the WhatsApp® messaging application. The RSAPP transmits the text description 1002 of the SMS message 1000 as an SMS message 1004, and replaces the uniform resource locator (URL) link 1003 in the text description 1002 of the SMS message 1000 with an image 1006 of the boarding pass as exemplarily illustrated in FIG. 10C. The RSAPP transmits the rich message comprising the SMS message 1004 and the image 1006 to the mobile number of the user from the brand Sender ID 1007, for example, United Airlines, along with a brand icon 1005 and a verification mark 1008.

In another embodiment, the rich short message service (SMS) application (RSAPP) transmits the created rich message to the mobile number of the user via Facebook® Messenger. The RSAPP transmits the text description 1002 of the SMS message 1000 as an SMS message 1004 along with a brand icon 1005, and replaces the uniform resource locator (URL) link 1003 in the text description 1002 of the SMS message 1000 with an image 1006 of the boarding pass along with a brand icon 1005 as exemplarily illustrated in FIG. 10D. The RSAPP transmits the rich message comprising the SMS message 1004 with the brand icon 1005 and the image 1006 with the brand icon 1005 to the mobile number of the user from the brand Sender ID 1007, for example, United Airlines, along with the brand icon 1005.

Figure 11A:
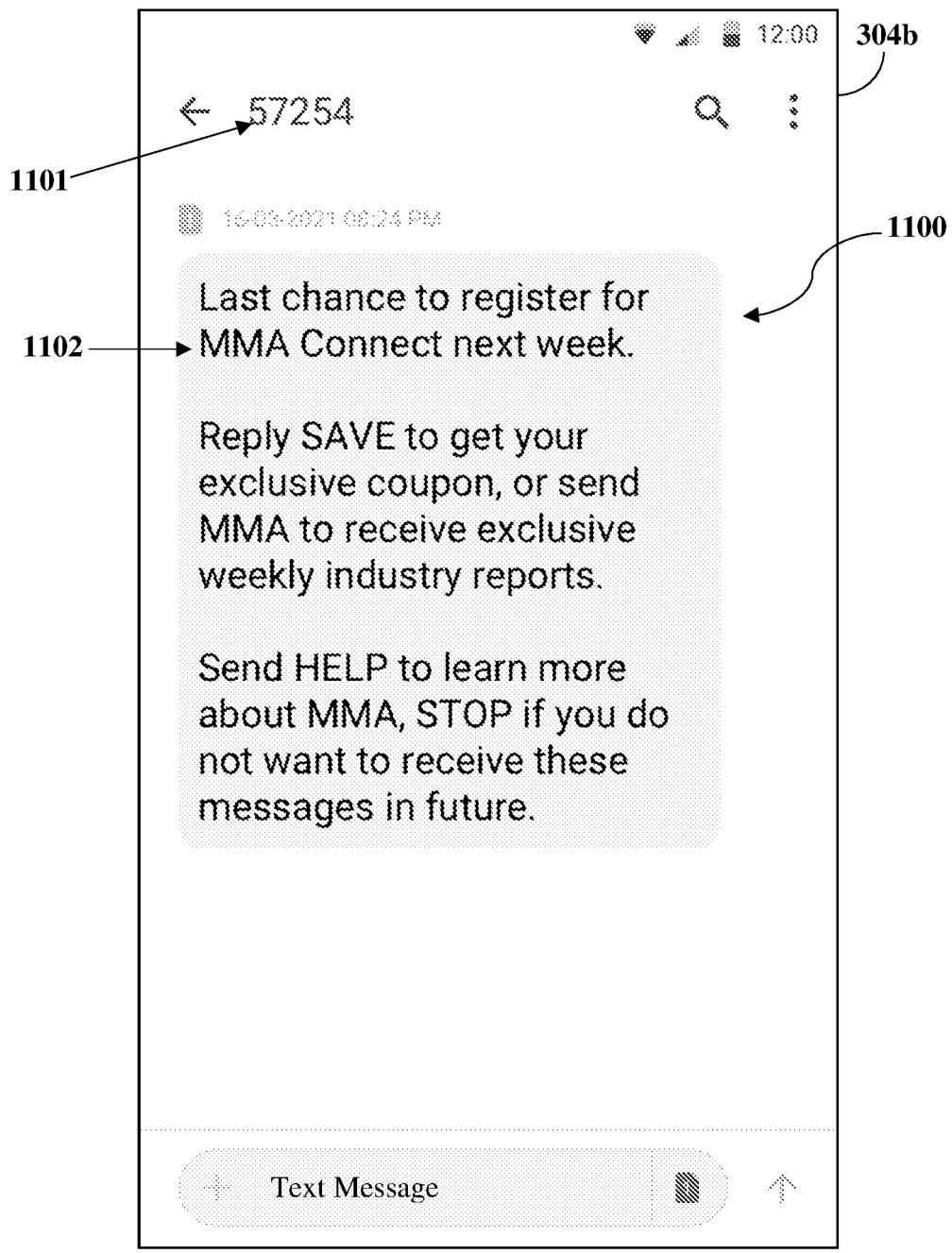
FIG. 11A exemplarily illustrates a screenshot of a graphical user interface rendered by a messaging client on a user device, displaying another embodiment of a short message service message received from a short number to a mobile number of a user.

FIG. 11A exemplarily illustrates a screenshot of a graphical user interface (GUI) 304b rendered by a messaging client on a user device, displaying another embodiment of a short message service (SMS) message 1100 received from a short number 1101 to a mobile number of a user. Consider an example where a brand, for example, Mobile Marketing Association (MMA), sends an SMS message 1100 comprising a text description 1102 regarding a last chance to register for MMA connect along with reply keywords, to the rich SMS application (RSAPP) for creating and transmitting a rich message to a mobile number of a user. The RSAPP receives a request to send the SMS message 1100 from the brand to the mobile number of the user. The RSAPP processes the received SMS message 1100, determines whether the mobile number is enabled for rich communication services (RCS), and creates a rich message to be transmitted to the mobile number via RCS if the mobile number is enabled for RCS. The RSAPP transmits the created rich message to the mobile number of the user via rich communication services (RCS). In the creation of the rich message, the RSAPP converts the text description 1102 of the SMS message 1100 into a rich card 1103 with an image 1104 representing the brand and the text description 1102 of the SMS message 1100 sent as the text 1105 accompanying the rich card 1103 as exemplarily illustrated in FIG. 11B. The rich message further comprises suggested reply buttons 1106, for example, "SAVE", "MMA", "HELP", "STOP", etc., added thereinto for the reply keywords extracted from the text description 1102 of the SMS message 1100 as exemplarily illustrated in FIG. 11B. The RSAPP selects the image 1104 from a rich message template submitted by the brand. In an embodiment, the RSAPP extracts the image 1104 from the text description 1102 of the SMS message 1100 shown in FIG. 11A. In an embodiment, the RSAPP transmits the rich message to the mobile number of the user from the brand Sender ID 1107, for example, MMA Connect, along with a verification mark 1108 as exemplarily illustrated in FIG. 11B. In another embodiment, the RSAPP transmits the rich message to the mobile number of the user from the brand Sender ID 1107 without a verification mark as exemplarily illustrated in FIG. 11C.

Figure 12A:
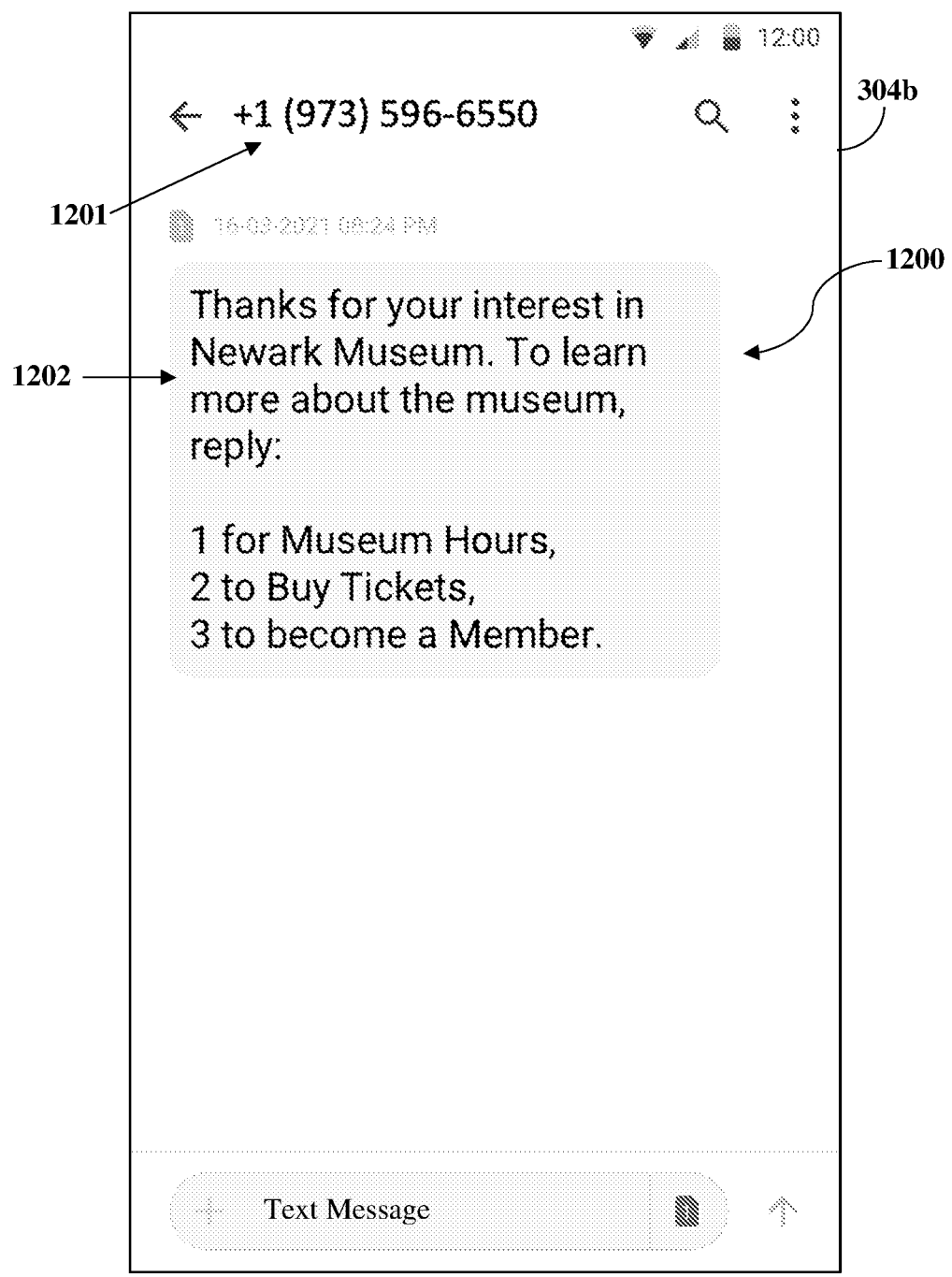
FIG. 12A exemplarily illustrates a screenshot of a graphical user interface rendered by a messaging client on a user device, displaying another embodiment of a short message service message received from a long number to a mobile number of a user.

FIG. 12A exemplarily illustrates a screenshot of a graphical user interface (GUI) 304*b* rendered by a messaging client on a user device, displaying another embodiment of a short message service (SMS) message 1200 received from a long number 1201 to a mobile number of a user. Consider an example where a brand, for example, Newark Museum, sends an SMS message 1200 comprising a text description 1202 with a welcome text from the Newark Museum and a text menu including: "1 for Museum Hours", "2 to Buy Tickets", and "3 to become a Member", to the rich SMS application (RSAPP) for creating and transmitting a rich message to a mobile number of a user. The RSAPP receives a request to send the SMS message 1200 from the brand to the mobile number of the user. The RSAPP processes the received SMS 1200, determines whether the mobile number is enabled for rich communication services (RCS), and creates a rich message to be transmitted via RCS if the mobile number is enabled for RCS. The RSAPP transmits the created rich message to the mobile number of the user via one or more enabled rich communication services (RCS) channels. In the creation of the rich message, the RSAPP converts the text description 1202 of the SMS message 1200 into a rich card 1203 with an image 1204 representing the brand and with the welcome text sent as the text accompanying the rich card 1203, and replaces the text menu with suggested reply buttons 1205, for example, Museum Hours, Buy Tickets, and Become a Member, as exemplarily illustrated in FIG. 12B. The RSAPP transmits the rich message to the mobile number of the user from the brand Sender ID 1206, for example, Newark Museum, along with a verification mark 1207 as exemplarily illustrated in FIG. 12B.

FIG. 13 exemplarily illustrates a screenshot of a graphical user interface rendered by a messaging client on a user device, displaying an embodiment of rich messages received by a user from a verified sender ID 1301, for example, the sender ID "RichSMS", with a brand identity of each brand sending their rich message. FIG. 13 exemplarily illustrates a rich message comprising a rich card 1302, a verification mark 1303, and a brand logo 1304 of each brand, for example, United Airlines and ALDI, sending the rich message. The rich message further comprises suggested action buttons, for example, "Check Flight Status" 1305 and "Offers" 1306 configured to allow the user to execute an action, for example, check status of a flight, view offers, etc.

Figure 14A:
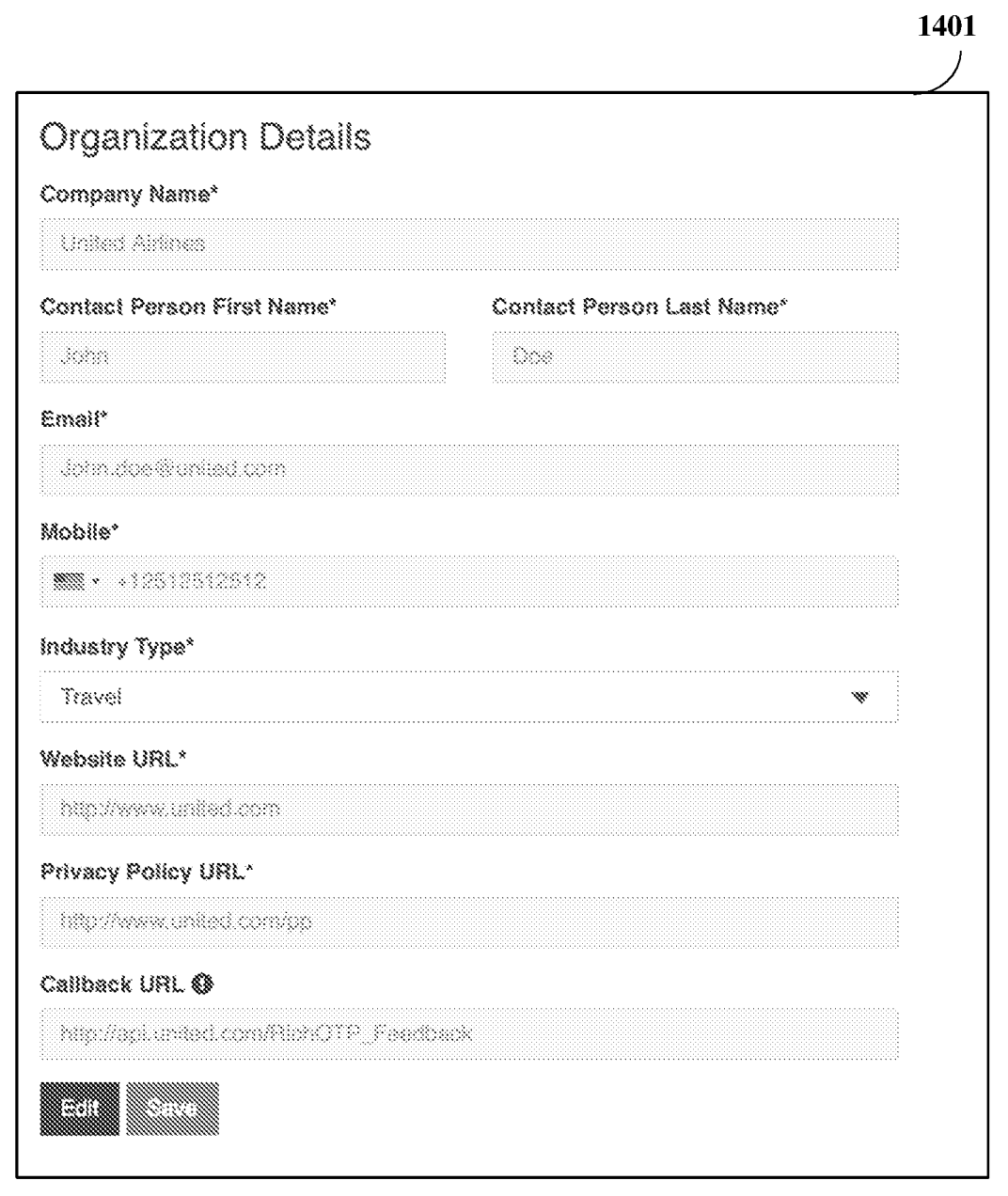

FIGS. 14A-14C exemplarily illustrate screenshots of user interfaces 1401, 1402, and 1403 provided by a rich short message service (SMS) application (RSAPP) provider for rich SMS registration. A brand or a developer on behalf of the brand registers for the rich SMS for the brand by submitting brand details comprising, for example, a company name, a last name and a first name of a contact person, an electronic mail (email) address, a mobile number, industry type, a website uniform resource locator (URL), a privacy policy URL, a callback URL, etc., on the user interface 1401 exemplarily illustrated in FIG. 14A. After registration, the brand or the developer submits rich message details, for example, a brand name, a brand icon, a brand logo, etc., to the RSAPP provider. A rich card image tab and a display name tab (not shown) enables the brand or the developer to edit and save an image, for example, the brand logo, the brand icon, etc. In an embodiment, the brand or the developer registers for the rich SMS by submitting information about the brand identity of the brand. The brand or the developer specifies one or more rich message templates 1402 as exemplarily illustrated in FIG. 14B, to be used by the RSAPP for sending rich messages to users. Each rich template 1402 comprises multiple elements. For example, a rich message template 1402 for rich communication services (RCS) comprises: brand name, brand logo, SMS senders' details comprising sender ID type and sender ID, rich messaging senders' details comprising rich messaging channel and sender ID, fall back routing, and additional enhancements such as images for rich cards, suggested actions, etc., as exemplarily illustrated in FIG. 14B. The SMS senders' details section of the rich message template 1402 allows the brand, for example, ALDI, or the developer on behalf of the brand, to specify the sender ID type, for example, short code, sender mask, etc., and the sender ID, for example, "32043", "DL-ALD-01", etc., respectively, to be used by the RSAPP for transmitting an SMS message to a mobile number of a user. The rich messaging senders' details section of the rich message template 1402 allows the brand/developer to specify one or more rich messaging channels, for example, RCS, WhatsApp, etc., and the sender ID, for example, "ALDI <aldi_us@maap.dotgo.com>", "ALDI <+1-912-321-6239>", etc., respectively, to be used by the RSAPP for transmitting the rich message to the mobile number of the user. While specifying the sender ID, the brand/developer specifies two parts—the sender ID shown to the user and the internal address used by the rich messaging channel. For example, for RCS, the sender ID "ALDI <aldi_us@maap.dotgo.com>" includes "ALDI", that is the sender ID to be shown to the user, and "aldi_us@maap.dotgo.com", that is the internal address for the sender ID, exemplarily enclosed within angle brackets "<" and ">". The fallback routing section of the rich message template 1402 allows the brand/developer to confirm a setting: "Send as SMS if user not enabled on any Rich Messaging Channel?", specifying transmission of the received SMS to the mobile number of the user if the user is not enabled on any rich messaging channels.

A brand or a developer on behalf of the brand specifies account configuration and fallback routing on the user interface 1403 exemplarily illustrated in FIG. 14A. The account configuration section allows the brand/developer to specify the Account ID, for example, "Messaging Partner ABC". The fallback routing section allows the brand/developer to confirm a setting: "Send as SMS if Sender ID not configured in Rich SMS Template?", specifying transmission of the received SMS to the mobile number of the user if the sender ID is not configured in the rich SMS template.

In an example, the rich short message service (SMS) application (RSAPP) receives a request to send an SMS message from a short code "32043" or a sender mask "DL-ALD-01" to a mobile number of a user. The RSAPP processes the SMS message in the received request and creates the rich message. While creating the rich message, the RSAPP selects an image for a rich card from a rich card file based on criteria specified by the brand/developer in the rich message template 1402 as exemplarily illustrated in FIG. 14B. For example, the RSAPP selects an image from the uniform resource locator (URL) link "www.aldi.us/images/low-prices.jpg" for use in 40% of the messages in a round robin arrangement as specified by the brand/developer in the rich message template 1402 exemplarily illustrated in FIG. 14B. Furthermore, the RSAPP includes suggested action buttons in the rich message if the SMS message comprises keywords. In an embodiment, the brand/developer defines keywords and assigns an action type and a value to the keyword, as exemplarily illustrated in FIG. 14B. The action types comprise, for example, opening a URL, dialing a phone number, etc. The RSAPP transmits the created rich message from the sender ID specified by the brand/developer in the rich message template 1402, to the mobile number of the user using a messaging platform, for example, Rich Communication Services (RCS), WhatsApp®, or other messaging platforms.

Furthermore, in an embodiment, the elements in the rich message template are configured to be modified based on the rich messaging channel, for example, RCS, iMessage®, WhatsApp®, Viber®, Telegram®, Facebook® Messenger, Google Business Messages, Signal®, etc., used to send the rich message. For example, some of the elements of the rich message template may be common to all rich channels, for example, RCS, iMessage®, WhatsApp®, Viber®, Telegram®, Facebook® Messenger, Google Business Messages, Signal®, etc., whereas other elements may have values that are different and specific to a particular channel depending on the type of the rich messaging channel used to send the rich message. The rich short message service (SMS) application (RSAPP) provider performs a verification of the brand and the brand identity. The RSAPP provider also reviews and approves the submitted rich message templates. The brand or the developer specifies the approved rich message templates to be used by the RSAPP for sending rich messages. The RSAPP sends rich messages using the specified and approved rich message templates to the user device. Furthermore, the brand or the developer can add multiple rich message templates to the RSAPP, for use by the RSAPP in sending the rich messages to the mobile number of the user.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the method and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. Various aspects of the embodiments disclosed herein are implemented as programmed elements, or non-programmed elements, or any suitable combination thereof.

Where databases are described such as the database 302j exemplarily illustrated in FIG. 5, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments herein extend to all functionally equivalent structures, methods, systems, and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A method employing a rich short message service application defining computer program instructions executable by at least one processor for creating and transmitting a rich message, said method comprising:

receiving a request to send a short message service message from a brand to a mobile number of a user;

processing said request to send said short message service message, comprising:

determining whether said mobile number of said user is enabled on one or more of a plurality of rich messaging channels for said mobile number of said user;

upon determining that said mobile number of said user is enabled on said one or more of said rich messaging channels, performing steps comprising:

creating said rich message comprising a message and a brand identity; and transmitting said created rich message to said mobile number of said user on said enabled one or more of said rich messaging channels;

upon determining that said mobile number of said user is not enabled on said one or more of said rich messaging channels, performing steps comprising:

confirming whether a setting specifies transmission of said received short message service message to said mobile number of said user as a short message service message if said mobile number of said user is not enabled on said one or more of said rich messaging channels; and transmitting said received short message service message as a short message service message to said mobile number of said user.

2. The method of claim 1, further comprising delivering said created rich message from one of a trusted sender identifier and a sender identifier of said brand.

3. The method of claim 1, wherein said rich message further comprises one or more of a plurality of interactive buttons, wherein said interactive buttons comprise a suggested reply button, a suggested action button, and a brand-specific action button, wherein selection of said suggested reply button using a user device of said user allows said user to respond to said brand, and wherein selection of one of said suggested action button and said brand-specific action button allows said user to execute an action on said user device.

4. The method of claim 1, further comprising one of a brand enterprise and a developer registering for a rich short message service with a service provider, wherein said registration comprises:

receiving, by said service provider, information about said brand identity from said brand enterprise; and verifying, by said service provider, said brand identity.

5. The method of claim 4, wherein said one of brand enterprise and said developer specifies to said service provider one of a plurality of rich message templates to be used for sending rich messages, wherein said rich messages are sent by said service provider to a user device of said user using said specified one of said rich message templates.

6. The method of claim 1 executed using one or more of an application programming interface configured for sending a short message service message, a protocol configured for sending said short message service message, an application configured for sending said short message service message, an application programming interface configured for sending said rich message, a protocol configured for sending said rich message, and an application configured for sending said rich message.

7. The method of claim 1, further comprising:

determining whether said mobile number of said user is enabled for rich communication services; and determining whether said mobile number of said user is enabled for one or more of a plurality of messaging applications, wherein one of said instant messaging applications is the WhatsApp instant messaging application.

8. The method of claim 1, further comprising:

determining whether said mobile number of said user is linked to one of a user profile and a chatbot created by one of said brand and a messaging platform; and transmitting said created rich message to one of said user profile and said chatbot of said brand on one or more of a plurality of messaging platforms, wherein said messaging platforms comprise Facebook Messenger, Google Business Messages, and Apple Business Chat, and wherein said user profile is a part of a profile stored by one or more entities comprising Facebook, Google, and Apple.

9. The method of claim 1, further comprising selecting said one or more of said rich messaging channels based on one or more of a plurality of parameters comprising:

size of said short message service message;

capabilities of a plurality of messaging platforms;

cost of sending said short message service message via said one or more of said rich messaging channels in terms of standard pricing and dynamic pricing based on traffic patterns;

history of a recipient of said short message service message in terms of message delivery status and time, message read status and time, and user response; and maintenance of consistency by sending said short message service message on a single rich messaging channel instead of switching between said plurality of rich messaging channels.

10. The method of claim 1, further comprising enhancing said rich message through one or more of a plurality of automatic enhancements comprising:

replacing uniform resource locator links within said short message service message with one or more of an image, a video, and other rich media; and automatically adding one of suggested replies and suggested actions to said short message service message based on content of said short message service message.

11. The method of claim 1, further comprising monitoring delivery of said created rich message to said mobile number of said user, wherein said monitoring comprises delivering said created rich message to said mobile number of said user via one or more additional messaging platforms in case of one of a failure of said delivery and a delay in said delivery of said created rich message to said mobile number of said user via a first messaging platform, and wherein said one or more additional messaging platforms comprise one of alternative data messaging platforms and short message service platforms.

12. The method of claim 1, further comprising concurrently sending said created rich message over said plurality of rich messaging channels that are enabled to increase chances of delivery of said created rich message.

13. A system for creating and transmitting a rich message, said system comprising:

a non-transitory, computer-readable storage medium configured to store computer program instructions executable by at least one processor;

said at least one processor communicatively coupled to said non-transitory, computer-readable storage medium; and a rich short message service application defining said computer program instructions, which when executed by said at least one processor, cause said at least one processor to:

receive a request to send a short message service message from a brand to a mobile number of a user;

process said request to send said short message service message, comprising:

determining whether said mobile number of said user is enabled on one or more of a plurality of rich messaging channels for said mobile number of said user;

upon determining that said mobile number of said user is enabled on said one or more of said rich messaging channels, performing steps comprising:

creating said rich message comprising a message and a brand identity; and transmitting said created rich message to said mobile number of said user on said enabled one or more of said rich messaging channels;

upon determining that said mobile number of said user is not enabled on said one or more of said rich messaging channels, performing steps comprising:

confirming whether a setting specifies transmission of said received short message service message to said mobile number of said user as a short message service message if said mobile number of said user is not enabled on said one or more of said rich messaging channels; and transmitting said received short message service message as a short message service message to said mobile number of said user.

14. The system of claim 13, wherein one or more of said computer program instructions defined by said rich short message service application, when executed by said at least one processor, cause said at least one processor to deliver said rich message from one of a trusted sender identifier and a sender identifier of said brand.

15. The system of claim 13, wherein said rich message further comprises one or more of a plurality of interactive buttons, wherein said interactive buttons comprise a suggested reply button, a suggested action button, and a brand-specific action button, wherein selection of said suggested reply button on a user device of said user allows said user to respond to said brand, and wherein selection of one of said suggested action button and said brand-specific action button allows said user to execute an action on said user device.

16. The system of claim 13, further comprising one of a brand enterprise and a developer registering for a rich short message service with a service provider, and wherein said registration comprises:

receiving, by said service provider, information about said brand identity from said brand enterprise; and verifying, by said service provider, said brand identity.

17. The system of claim 16, wherein said one of brand enterprise and said developer specifies to said service provider one of a plurality of rich message templates to be used for sending rich messages, wherein said rich messages are sent by said service provider to a user device of said user using said specified one of said rich short message service templates.

18. The system of claim 13, wherein said rich short message service application is executed using one or more of an application programming interface configured for sending a short message service message, a protocol configured for sending said short message service message, an application configured for sending said short message service message, an application programming interface configured for sending said rich message, a protocol configured for sending said rich message, and an application configured for sending said rich message.

19. The system of claim 13, wherein one or more of said computer program instructions defined by said rich short message service application, when executed by said at least one processor, cause said at least one processor to:

determine whether said mobile number of said user is enabled for rich communication services; and determine whether said mobile number of said user is enabled for one or more of a plurality of messaging applications, wherein one of said messaging applications is the WhatsApp instant messaging application.

20. The system of claim 13, wherein one or more of said computer program instructions defined by said rich short message service application, when executed by said at least one processor, cause said at least one processor to:

determine whether said mobile number of said user is linked to one of a user profile and a chatbot created by one of said brand and a messaging platform; and transmit said created rich message to one of said user profile and said chatbot of said brand on one or more of a plurality of messaging platforms, wherein said messaging platforms comprise Facebook Messenger, Google Business Messages, and Apple Business Chat, and wherein said user profile is a part of a profile stored by one or more entities comprising Facebook, Google, and Apple.

21. The system of claim 13, wherein one or more of said computer program instructions defined by said rich short message service application, when executed by said at least one processor, cause said at least one processor to select said one or more of said rich messaging channels based on one or more of a plurality of parameters comprising:

size of said short message service message;

capabilities of a plurality of messaging platforms;

cost of sending said short message service message via said one or more of said rich messaging channels in terms of standard pricing and dynamic pricing based on traffic patterns;

history of a recipient of said short message service message in terms of message delivery status and time, message read status and time, and user response; and maintenance of consistency by sending said short message service message on a single rich messaging channel instead of switching between said plurality of rich messaging channels.

22. The system of claim 13, wherein one or more of said computer program instructions defined by said rich short message service application, when executed by said at least one processor, cause said at least one processor to enhance said rich message through one or more of a plurality of automatic enhancements comprising:

replacing uniform resource locator links within said short message service message with one or more of an image, a video, and other rich media; and automatically adding one of suggested replies and suggested actions to said short message service message based on content of said short message service message.

23. The system of claim 13, where one or more of said computer program instructions defined by said rich short message service application, when executed by said at least one processor, cause said at least one processor to monitor delivery of said created rich message to said mobile number of said user, wherein said monitoring comprises delivering said created rich message to said mobile number of said user via one or more additional messaging platforms in case of one of a failure of said delivery and a delay in said delivery of said created rich message to said mobile number of said user via a first messaging platform, and wherein said one or more additional messaging platforms comprise one of alternative data messaging platforms and short message service platforms.

24. The system of claim 13, wherein one or more of said computer program instructions defined by said rich short message service application, when executed by said at least one processor, cause said at least one processor to concurrently send said created rich message over said plurality of rich messaging channels that are enabled to increase chances of delivery of said created rich message.

* * * * *